(12) United States Patent
Miyakoshi et al.

(10) Patent No.: US 10,160,291 B2
(45) Date of Patent: Dec. 25, 2018

(54) VEHICLE AIR CONDITIONING APPARATUS

(75) Inventors: Ryo Miyakoshi, Isesaki (JP); Kenichi Suzuki, Isesaki (JP); Hidenori Takei, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 895 days.

(21) Appl. No.: 13/981,061

(22) PCT Filed: Jan. 11, 2012

(86) PCT No.: PCT/JP2012/050377
§ 371 (c)(1),
(2), (4) Date: Jul. 22, 2013

(87) PCT Pub. No.: WO2012/098966
PCT Pub. Date: Jul. 26, 2012

(65) Prior Publication Data
US 2013/0291577 A1 Nov. 7, 2013

(30) Foreign Application Priority Data

| Jan. 21, 2011 | (JP) | 2011-010674 |
| Feb. 25, 2011 | (JP) | 2011-040131 |
| Feb. 25, 2011 | (JP) | 2011-040133 |

(51) Int. Cl.
*B60H 1/00* (2006.01)
*B60H 1/22* (2006.01)
(Continued)

(52) U.S. Cl.
CPC ....... *B60H 1/2215* (2013.01); *B60H 1/00007* (2013.01); *B60H 1/00392* (2013.01);
(Continued)

(58) Field of Classification Search
CPC ............ B60H 1/00007; B60H 1/00392; B60H 1/00428; B60H 11/1891
See application file for complete search history.

(56) References Cited

U.S. PATENT DOCUMENTS 4,311,188 A * 1/1982 Kojima .............. B60H 1/00864
165/202
4,507,932 A * 4/1985 Suzuki ................. B60H 1/3207
62/180

(Continued)

FOREIGN PATENT DOCUMENTS

CN 101522448 9/2009
JP 05-229334 9/1993
(Continued)

OTHER PUBLICATIONS

Office Action dated May 8, 2017 which issued in the corresponding Chinese Patent Application No. 2015103956789.9.
(Continued)

*Primary Examiner* — Kun Kai Ma
(74) *Attorney, Agent, or Firm* — Cozen O'Connor

(57) ABSTRACT

A vehicle air conditioning apparatus is provided that can extend the mileage of a vehicle by reducing the power consumed by the operation of a compressor and a heater. When a required quantity of heating Q_req is acquired, the minimum power sharing ratio between quantity of heat release Q_hpof a water-refrigerant heat exchanger 22 and quantity of heat release Q_htrof a water heater 32 is calculated, which allows the power consumption W_total to be minimized, and a compressor 21 and the water heater 32 is operated based on the result of the calculation.

5 Claims, 39 Drawing Sheets

(51) Int. Cl.
  *B60L 1/00* (2006.01)
  *B60L 1/02* (2006.01)
  *B60L 11/18* (2006.01)
  *B60H 1/32* (2006.01)
  *G05B 19/042* (2006.01)

(52) U.S. Cl.
  CPC ..... *B60H 1/00428* (2013.01); *B60H 1/00764* (2013.01); *B60H 1/00785* (2013.01); *B60H 1/00807* (2013.01); *B60H 1/00864* (2013.01); *B60H 1/00885* (2013.01); *B60H 1/00899* (2013.01); *B60H 1/00907* (2013.01); *B60H 1/2218* (2013.01); *B60H 1/2221* (2013.01); *B60H 1/3223* (2013.01); *B60H 1/3227* (2013.01); *B60L 1/003* (2013.01); *B60L 1/02* (2013.01); *B60L 11/1861* (2013.01); *G05B 19/042* (2013.01); *B60H 2001/325* (2013.01); *B60H 2001/3261* (2013.01); *B60H 2001/3272* (2013.01); *B60L 2240/12* (2013.01); *B60L 2240/34* (2013.01); *B60L 2240/36* (2013.01); *B60L 2240/665* (2013.01); *B60L 2240/68* (2013.01); *B60L 2240/80* (2013.01); *B60L 2250/12* (2013.01); *B60L 2250/16* (2013.01); *G05B 2219/2614* (2013.01); *Y02T 10/705* (2013.01); *Y02T 10/7005* (2013.01); *Y02T 10/7044* (2013.01); *Y02T 10/7291* (2013.01); *Y02T 10/88* (2013.01); *Y02T 90/16* (2013.01)

(56) References Cited

U.S. PATENT DOCUMENTS

| | | | | |
|---|---|---|---|---|
| 5,157,932 | A * | 10/1992 | Noji | B60H 1/00964 236/78 D |
| 5,301,515 | A * | 4/1994 | Iritani | B60H 1/00392 454/121 |
| 5,501,267 | A * | 3/1996 | Iritani | B60H 1/00007 165/11.1 |
| 5,544,493 | A * | 8/1996 | Suzuki | B60H 1/321 62/133 |
| 5,586,448 | A | 12/1996 | Ikeda et al. | |
| 5,605,051 | A * | 2/1997 | Iritani | B60H 1/3211 62/160 |
| 5,641,016 | A * | 6/1997 | Isaji | B60H 1/00007 165/43 |
| 5,782,102 | A * | 7/1998 | Iritani | B60H 1/00021 62/197 |
| 6,040,561 | A * | 3/2000 | Murty | B60H 1/00392 219/494 |
| 6,070,650 | A * | 6/2000 | Inoue | B60H 1/00428 165/202 |
| 6,237,681 | B1 | 5/2001 | Takano et al. | |
| 6,430,951 | B1 * | 8/2002 | Iritani | B60H 1/00021 62/160 |
| 7,096,935 | B2 | 8/2006 | Ieda et al. | |
| 8,314,364 | B2 | 11/2012 | Brust et al. | |
| 2003/0050150 | A1 * | 3/2003 | Tanaka | B60H 1/03 477/62 |
| 2003/0217559 | A1 * | 11/2003 | Ieda | B60H 1/00428 62/230 |
| 2004/0164171 | A1 * | 8/2004 | Eisenhour | B60H 1/00064 236/49.3 |
| 2006/0172188 | A1 * | 8/2006 | Okuda | B60L 3/0046 429/120 |
| 2006/0270333 | A1 * | 11/2006 | Hirai | B60H 1/00849 454/75 |
| 2012/0247746 | A1 * | 10/2012 | Sakajo | B60H 1/00392 165/202 |
| 2013/0068443 | A1 * | 3/2013 | Yen | B60H 1/00392 165/253 |

FOREIGN PATENT DOCUMENTS

| | | |
|---|---|---|
| JP | 07-052636 | 2/1995 |
| JP | 7-55297 | 3/1995 |
| JP | 08-197937 | 8/1996 |
| JP | 9-318207 | 12/1997 |
| JP | 10-160303 | 6/1998 |
| JP | 2000-142094 | 5/2000 |
| JP | 2000-313224 | 11/2000 |
| JP | 2003-335127 | 11/2003 |
| JP | 2004-198027 | 7/2004 |
| JP | 2005-045866 | 2/2005 |
| JP | 2009-280020 | 12/2009 |
| JP | 2010-95229 | 4/2010 |
| JP | 2010-234905 | 10/2010 |
| JP | 2010-254291 | 11/2010 |
| JP | 2011-255772 | 12/2011 |

OTHER PUBLICATIONS

Office Action dated Nov. 1, 2016 which issued in the corresponding Chinese Patent Application No. 201510395678.9.

Office Action dated Oct. 7, 2016 which issued in the corresponding German Patent Application No. 11 2012 000 522.8.

* cited by examiner

VEHICLE AIR CONDITIONING APPARATUS

RELATED APPLICATIONS

This is a U.S. national stage of International application No. PCT/JP2012/050377 filed on Jan. 11, 2012.

CROSS-REFERENCES TO RELATED APPLICATIONS

This application claims the benefit of Japanese Patent Application No. 2011-010674, filed Jan. 21, 2011, Japanese Patent Application No. 2011-040131, filed Feb. 25, 2011, and Japanese Patent Application No. 2011-040133, filed Feb. 25, 2011, which are incorporated herein by reference.

TECHNICAL FIELD

The present invention relates to a vehicle air conditioning apparatus applicable to, for example, electric cars.

BACKGROUND ART

Conventionally, this sort of vehicle air conditioning apparatus includes: a compressor driven by an engine as a power source of a vehicle; a radiator provided outside the vehicle interior; and a heat exchanger provided inside the vehicle interior. With this vehicle air conditioning apparatus, a cooling operation is performed by: releasing the heat from the refrigerant discharged from the compressor in the radiator; absorbing the heat into the refrigerant in the heat exchanger; and supplying the air subjected to a heat exchange with the refrigerant in the heat exchanger to the vehicle interior. In addition, such a conventional vehicle air conditioning apparatus includes a heater core and perform a heating operation by: releasing the exhaust heat from the cooling water used to cool the engine in the heater core; and blowing the air subjected to a heat exchange with the cooling water in the heater core to the vehicle interior. Moreover, such a conventional vehicle air conditioning apparatus performs a heating and dehumidifying operation by: cooling the air to be supplied to the vehicle interior to a required absolute temperature in the heat exchanger for dehumidification; heating the cooled and dehumidified air in the heat exchanger to a desired temperature in the heater core; and blowing the heated air to the vehicle interior.

The above-mentioned vehicle air conditioning apparatus uses the exhaust heat from the engine as a heat source to heat the air for a heating operation, or a heating and dehumidifying operation. Generally, an electric car uses an electric motor as a power source, and it is difficult to acquire the exhaust heat that can heat the air to be supplied to the vehicle interior by using the electric motor without an engine. Therefore, the above-mentioned vehicle air conditioning apparatus is not applicable to electric cars.

To address this issue, a vehicle air conditioning apparatus has been known in the art, as applicable to electric cars. The vehicle air conditioning apparatus includes a refrigerant circuit having an electric compressor, an indoor heat exchanger and an outdoor heat exchanger; and an electric heater, and perform a heating operation to heat the vehicle interior by using either or both the heat radiated from the indoor heat exchanger by driving the compressor and the heat radiated from the heater (see, for example, Patent Literature Also, another vehicle air conditioning apparatus has been known in the art, as applicable to electric cars. The vehicle air conditioning apparatus includes: an electric compressor; a heat medium heating radiator that releases the heat from refrigerant to heat the heat medium; an air cooling heat exchanger that absorbs the heat into the refrigerant to cool the air blowing to the vehicle interior side; an outdoor heat exchanger that is provided outside the vehicle interior and that performs a heat exchange between the outdoor air and the refrigerant to release the heat from the refrigerant or absorb the heat into the refrigerant; a heat medium circuit that allows the heat medium heated in the heat medium heating radiator to flow through; an air heating radiator that releases the heat from the heat medium flowing through the heat medium circuit to heat the air blowing to the vehicle interior; and a heat medium heater that heats the heat medium flowing through the heat medium circuit by electric power (see, for example, Patent Literature 2). This vehicle air conditioning apparatus performs a heating operation by: releasing the heat from the refrigerant discharged from the compressor in the heat medium heating radiator; and absorbing the heat into the refrigerant after the heat release in the outdoor heat exchanger. Moreover, this vehicle air conditioning apparatus performs a heating and dehumidifying operation by: releasing the heat from the refrigerant discharged from the compressor in the heat medium heating radiator; and absorbing the heat into the refrigerant after the heat release in the air cooling heat exchanger and the outdoor heat exchanger. With this vehicle air conditioning apparatus, the heat medium heater can heat the heat medium circulating in the heat medium circuit.

With the vehicle air conditioning apparatus, if the heating operation is performed while the outdoor air temperature is low, the evaporating temperature of the refrigerant drops in the outdoor heat exchanger, so that a frost is likely to be formed on the outdoor heat exchanger. If a frost is formed on the outdoor heat exchanger, the outdoor heat exchanger cannot acquire required quantity of heat. This causes a decrease in the performance of the heating operation.

To address this issue, a vehicle air conditioning apparatus has been known in the art, which performs a defrost operation to remove a frost formed on the outdoor heat exchanger (see, for example, Patent Literature 1).

CITATION LIST

Patent Literature

PTL1: Japanese Patent Application Laid-Open No. HEI7-52636
PTL2: Japanese Patent Application Laid-Open No. HEI8-197937

SUMMARY OF INVENTION

Technical Problem

With such a vehicle air conditioning apparatus applicable to electric cars, the electric power for driving the vehicle is used to operate the compressor and the heater. Therefore, if the air-conditioning load is large, most of the electric power for driving the vehicle is consumed to operate the compressor, and therefore the mileage of the vehicle is likely to drop.

It is therefore an object of the present invention to provide a vehicle air conditioning apparatus that can extend the mileage of a vehicle by reducing the power consumption to operate the compressor and the heater.

In a case in which the outdoor air temperature is low, the vehicle air conditioning apparatus applicable to electric cars uses the heat medium heater to secure the required quantity of heat, because the outdoor heat exchanger cannot acquire the sufficient quantity of heat. However, the heat medium heater consumes a large amount of electric power, and therefore, if the heat medium heater is operated for heating for a long time, most of the electric power for driving the vehicle is consumed by the heat medium heater. As a result, the mileage of the vehicle is likely to drop.

It is therefore an object of the present invention to provide a vehicle air conditioning apparatus that can prevent the mileage of the vehicle from dropping by reducing the use of the heat medium heater as far as possible.

When the vehicle air conditioning apparatus is applied to an electric car, the power consumption by performing a defrost operation is higher than a normal heating operation. Therefore, if a defrost operation is performed while the vehicle is running, the electric power for driving the vehicle is used by the defrost operation, and therefore the mileage of the vehicle drops. Then, if the defrost operation is performed while the battery power for driving the vehicle and for a heating operation is insufficient, the vehicle might become impossible to run before arriving at the destination because the battery power is consumed for the defrost operation.

It is therefore an object of the present invention to provide a vehicle air conditioning apparatus that can extend the mileage of the vehicle by reducing the power consumption to perform the defrost operation when the battery power becomes insufficient while the vehicle is running.

Solution to Problem

In order to achieve the above described objects, the vehicle air conditioning apparatus according to the present invention includes: a refrigerant circuit including an electric compressor, an indoor heat exchanger and an outdoor heat exchanger, the indoor heat exchanger being configured to release heat by operating the compressor; and an electric heater configured to release heat, wherein a vehicle interior can be heated by at least one of the heat released from the indoor heat exchanger and the heat released from the heater, the vehicle air conditioning apparatus further including: a minimum power sharing ratio calculation part configured to calculate a sharing ratio of operation between the compressor and the heater, the sharing ratio allowing power consumption to be minimized when required quantity of heating for a heating operation is acquired; and a first control part configured to control the compressor and the heater based on a result of a calculation by the minimum power sharing calculation part.

Therefore, it is possible to control to operate the compressor and the heater at the sharing ratio that allows the power consumption to be minimized, and consequently to acquire the required quantity of heating with the minimum power consumption.

In addition, in order to achieve the above described objects, the vehicle air conditioning apparatus according to the present invention includes: a compressor configured to compress and discharge refrigerant; a heat medium heating radiator configured to release heat from the refrigerant and heat the heat medium; an air cooling heat exchanger configured to absorb the heat into the refrigerant and to cool air blowing to a vehicle interior; an outdoor heat exchanger provided outside the vehicle interior and configured to release the heat from or absorb the heat into the refrigerant by performing a heat exchange between the refrigerant and outdoor air; a heat medium circuit configured to allow the heat medium heated by the heat medium heating radiator to flow through; an air heating radiator configured to release heat from the heat medium flowing through the heat medium circuit and to heat the air blowing to the vehicle interior; and a heat medium heater configured to be able to heat the heat medium flowing through the heat medium circuit by electric power, wherein: a heating operation is performed by releasing the heat from the refrigerant discharged from the compressor in the heat medium heating radiator and absorbing the heat into the refrigerant after the heat release in the outdoor heat exchanger; a heating and dehumidifying operation is performed by releasing the heat from the refrigerant discharged from the compressor in the heat medium heating radiator and absorbing the heat into the refrigerant after the heat release in the air cooling heat exchanger and the outdoor heat exchanger; and the heat medium heater can heat the heat medium flowing through the heat medium circuit, the vehicle air conditioning apparatus further including: a heat medium temperature estimating part configured to estimate a temperature of the heat medium that is heated by the heat medium heating radiator and flows through the heat medium circuit; an insufficient-quantity-of-heat calculation part configured to calculate an insufficient quantity of heat during one of the heating operation and the heating and dehumidifying operation, based on a result of an estimation by the heat medium temperature estimating part; and a heat medium heater control part configured to control the heat medium heater, based on the insufficient quantity of heat calculated by the insufficient-quantity-of-heat calculation part.

Therefore, it is possible to operate the heat medium heater according to the insufficient quantity of heat calculated by the insufficient-quantity-of-heat calculation part, and consequently to compensate for only the insufficient heat release in the heat medium heating radiator by operating the heat medium heater.

In addition, in order to achieve the above described objects, the vehicle air conditioning apparatus according to the present invention includes: a compressor configured to compress and discharge refrigerant; an indoor heat exchanger provided in a vehicle interior; and an outdoor heat exchanger provided outside the vehicle interior, wherein the vehicle interior is heated by releasing heat from the refrigerant discharged from the compressor in the indoor heat exchanger, and absorbing the heat into the refrigerant in the outdoor heat exchanger, the vehicle air conditioning apparatus further including: a frost formation determination part configured to determine whether or not a frost is formed on the outdoor heat exchanger; a defrost part configured to perform a defrost operation to remove the frost formed on the outdoor heat exchanger when the frost formation determination part determines that the frost is formed on the outdoor heat exchanger; a battery power detection part configured to detect a power of a battery that supplies power for driving a vehicle and for performing a heating operation; a defrost restriction part configured to restrict the defrost part from performing the defrost operation when the power of the battery detected by the battery power detection part is a predetermined level or lower; a charge determination part configured to determine whether or not the battery is being charged; and a cancellation part configured to cancel the restriction on the performing of the defrost operation by the defrost restriction part when the charge determination part determines that the battery is being charged.

Therefore, the defrost operation is not performed when the power of the battery is a predetermined level or lower but is performed when the battery is being charged. As a result, when becoming insufficient while the vehicle is running, the power of the battery is used for running the vehicle.

Advantageous Effect of the Invention

According to the present invention, the quantity of heat required for a heating operation can be obtained with the minimum power consumption, and therefore it is possible to reduce the electric power consumed by the heating operation or heating and dehumidifying operation. As a result, it is possible to extend the mileage of the vehicle.

In addition, according to the present invention, only an insufficient quantity of heat release in the heat medium heating radiator is compensated by operating the heat medium heater. By this means, it is possible to minimally operate the heat medium heater to reduce the power consumption for driving the vehicle. As a result, it is possible to prevent the mileage of the vehicle from dropping.

Moreover, according to the present invention, when the battery power becomes insufficient while the vehicle is running, it is possible to effectively use the battery power in order to drive the vehicle. Therefore, it is possible to extend the mileage of the vehicle.

DESCRIPTION OF EMBODIMENTS

FIG. 1 to FIG. 8 show Embodiment 1 of the present invention.

Figure 1:
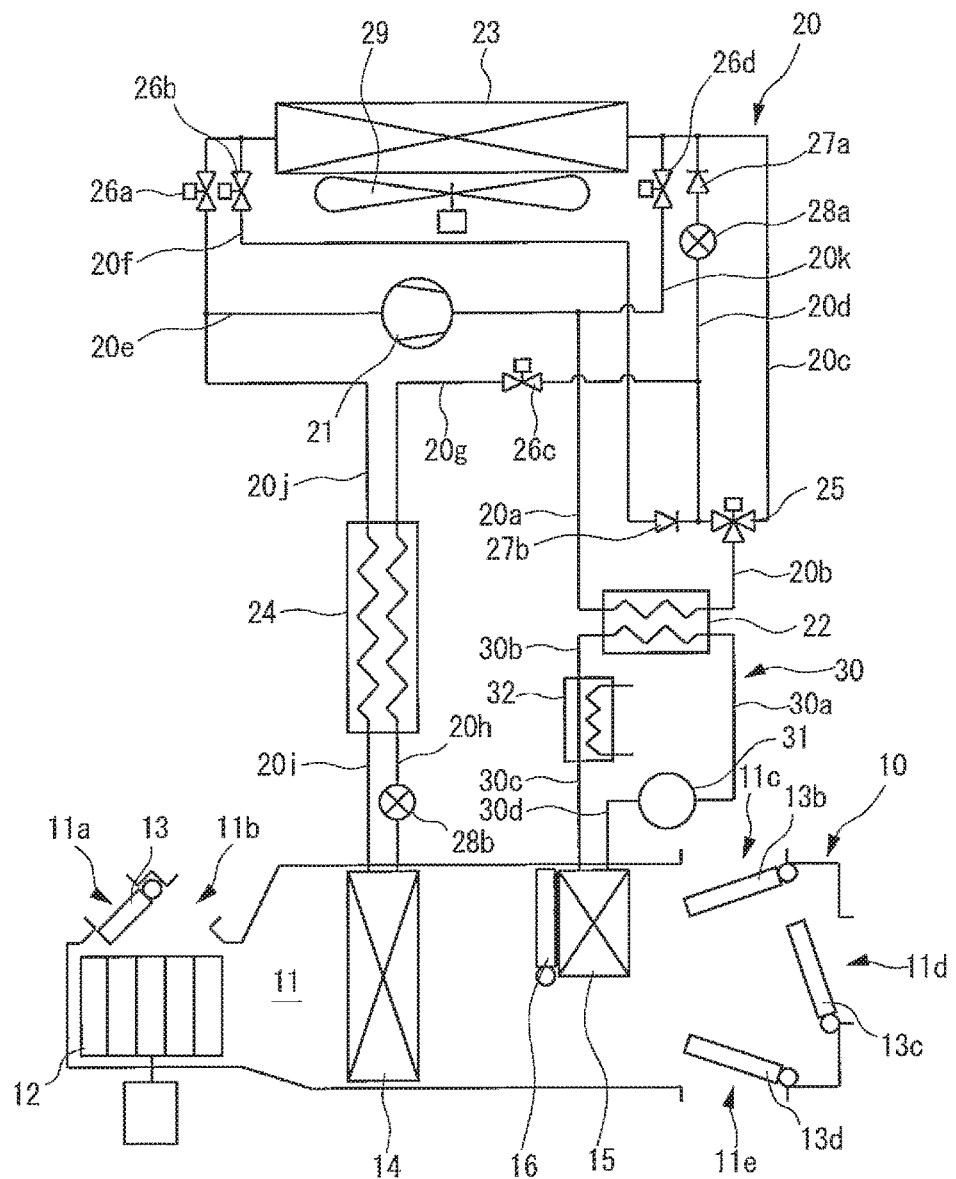
FIG. 1 is a schematic view showing a vehicle air conditioning apparatus according to Embodiment 1 of the present invention.

The vehicle air conditioning apparatus according to the present invention is applicable to an electric car that is run by electric power and that is driven by the electric power of a battery to be used to run the electric car. As shown in FIG. 1, this vehicle air conditioning apparatus includes an air conditioning unit 10 provided in the vehicle interior, and a refrigerant circuit 20 and a water circuit 30 that are formed across the vehicle interior and the outdoor.

The air conditioning unit 10 includes an air flow passage 11 that allows the air to be supplied to the vehicle interior to pass through. An outdoor air inlet 11a and an indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, a foot outlet 11c, a vent outlet 11d and a defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

An indoor fan 12 such as a sirocco fan configured to allow the air to flow through the air flow passage 11 from end to end is provided in the first end side of the air flow passage 11. This indoor fan 12 is driven by the electric motor 12a.

Also, in the first end side of the air flow passage 11, an inlet switching damper 13 configured to open one of the outdoor air inlet 11a and the indoor air inlet 11b and to close the other. This inlet switching damper 13 is driven by the electric motor 13a. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

Outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage and are opened and closed by the electric motor 13e. Here, when the outlet switching dampers 13b, 13c and 13d open the foot outlet 1c, close the bent outlet 11d and slightly open the defroster outlet 11e, most of the air flowing through the air flow passage 11 blows out of the foot outlet 11 and the remaining air blows out of the defroster outlet 11e. This mode is referred to as "foot mode." Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 1c and the vent outlet 11d, and close the defroster outlet 11e, the air flowing through the air flow passage 11 blows out of the foot outlet 11c and the vent outlet 11d. This mode is referred to as "bi-level mode." Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and a heat exchanger and a radiator which will be described later, are arranged and configured such that the temperature of the air blowing out of the foot outlet 11c is higher than the temperature of the air blowing out of the vent outlet 11d.

A heat exchanger 14 is provided in the air flow passage 11 in the downstream of the air flow from the indoor fan 12. The heat exchanger 14 is configured to cool and dehumidify the air flowing through the air flow passage 11. In addition, a radiator 15 is provided in the air flow passage 11 in the downstream of the air flow from the heat exchanger 14. The radiator 15 is configured to heat the air flowing through the air flow passage 11. The heat exchanger 14 is a heat exchanger that is constituted by fins and tubes and that is configured to perform heat exchange between the refrigerant flowing through the refrigerant circuit 20 and the air flowing through the air flow passage 11. Meanwhile, the radiator 15 is a heat exchanger that is constituted by fins and tubes and that is configured to perform heat exchange between the water flowing through the water circuit 30 and the air flowing through the air flow circuit 11.

An air mix damper 16 is provided between the heat exchanger 14 and the radiator 15 in the air flow passage 11 and is configured to control the percentage of the air to be heated, which is flowing through the air flow passage 11. The air mix damper 16 is driven by the electric motor 16a. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening degree is 0%, and, on the other hand, when the air mix damper 16 opens the upstream side of the radiator 15 and closes the portion other than the radiator 15, the opening degree is 100%.

The refrigerant circuit 20 includes: the heat exchanger 14; a compressor 21 configured to compress refrigerant; a water-refrigerant heat exchanger 22 configured to perform a heat exchange between the refrigerant and the water flowing through the water circuit 30; an outdoor heat exchanger 23 configured to perform a heat exchange between the refrigerant and the outdoor air; an indoor heat exchanger 24 configured to perform a heat exchange between the refrigerant flowing into the heat exchanger 14 and the refrigerant flowing out of the heat exchanger 14; a three-way valve 25 configured to switch the passage of the refrigerant; first to fourth solenoid valves 26a to 26d; first and second check valves 27a and 27b; and first and second expansion valves 28a and 28b configured to decompress the refrigerant. These components are connected to each other by a copper pipe or an aluminum pipe. The compressor 21 and the outdoor heat exchanger 23 are disposed outside the vehicle interior. The compressor 21 is driven by the electric motor 21a. The outdoor heat exchanger 23 is provided with an outdoor fan 29 configured to perform heat exchange between the outdoor air and the refrigerant when the vehicle stops. The outdoor fan 29 is driven by the electric motor 29a.

To be more specific, one side of the water-refrigerant heat exchanger 22 into which the refrigerant flows is connected to one side of the compressor 21 from which the refrigerant is discharged to form the refrigerant flow passage 20a. In addition, the input side of the outdoor heat exchanger 23 into which the refrigerant flows is connected to the output side of the water-refrigerant heat exchanger 22 from which the refrigerant is discharged, thereby to form the refrigerant flow passage 20b. The refrigerant flow passage 20b is provided with the three-way valve 25. The one side of the three-way valve 25 from which the refrigerant is discharged and another side from which the refrigerant is discharged are parallel to one another and are connected to the input side of the outdoor heat exchanger 23 into which the refrigerant flows and thereby to form the refrigerant flow passages 20c and 20d. The refrigerant flow passage 20d is provided with the first expansion valve 28a and the first check valve 27a in the order from the upstream of the flow of the refrigerant. The input side of the compressor 21 into which the refrigerant is sucked and the part of the refrigerant flow passage 20d between the three-way valve 25 and the first expansion valve 28a are connected in parallel to the output side of the outdoor heat exchanger 23 from which the refrigerant is discharged, thereby to form the refrigerant flow passage 20e and 20f. The refrigerant flow passage 20e is provided with the first solenoid valve 26a. The refrigerant flow passage 20f is provided with the second solenoid valve 26b and the second check valve 27b in the order from the upstream of the flow of the refrigerant. The input side of the interior heat exchanger 24 into which high-pressure refrigerant flows is connected to the part of the refrigerant flow passage 20d between the three-way valve 25 and the first expansion valve 28a, thereby to form the refrigerant flow passage 20g. The refrigerant passage 20g is provided with the third solenoid valve 26c. The input side of the heat exchanger 14 into which the refrigerant flow is connected to the output side of the indoor heat exchanger 24 from which the high-pressure refrigerant is discharged, thereby to provide the refrigerant flow passage 20h. The refrigerant flow passage 20h is provided with the second expansion valve 28b. The input side of the indoor heat exchanger 24 into which low-pressure refrigerant flows is connected to the output side of the heat exchanger 14 from which the refrigerant is discharged, thereby to form the refrigerant flow passage 20i. The part of the refrigerant flow passage 20e between the first solenoid valve 26a and the input side of the compressor 21 into which the refrigerant is sucked is connected to the output side of the indoor heat exchanger 24 from which the low-pressure refrigerant is discharged, thereby to provide the refrigerant flow passage 20j. The input side of the outdoor heat exchanger 23 into which the refrigerant flows is connected to the refrigerant flow passage 20a, thereby to provide the refrigerant flow passage 20k. The refrigerant flow passage 20k is provided with the fourth solenoid valve 26d.

The water circuit 30 includes the radiator 15, the water-refrigerant heat exchanger 22, a pump 31 configured to pump the water as heat medium and a water heater 32 such as an electric heater configured to heat water by electric power. These components are connected by a copper pipe or an aluminum pipe. To be more specific, the input side of the water-refrigerant heat exchanger 22 into which water flows is connected to output side of the pump 31 from which the water is discharged, thereby to form a water flow passage 30a. The input side of the water heater 32 into which the water flows is connected to the output side of the water-refrigerant heat exchanger 22 from which the water is discharged, thereby to from a water flow passage 30b. The input side of the radiator 15 into which the water flows is connected to the output side of the water heater 32 from which the water is discharged, thereby to form a water flow passage 30c. The input side of the pump 31 into which the water is sucked is connected to the output side of the radiator 15 from which the water flows, thereby to from a water flow passage 30d. The pump 31 is driven by the electric motor 31a.

The vehicle air conditioning apparatus also includes a controller 40 that controls the temperature and the humidity of the vehicle interior to be the preset temperature and humidity.

The controller 40 includes a CPU, a ROM and a RAM. In the controller, upon receiving an input signal from a device connected to the input side, the CPU reads the program stored in the ROM according to the input signal, stores the state detected by the input signal on the RAM and transmits an output signal to a device connected to the output side.

Figure 2:
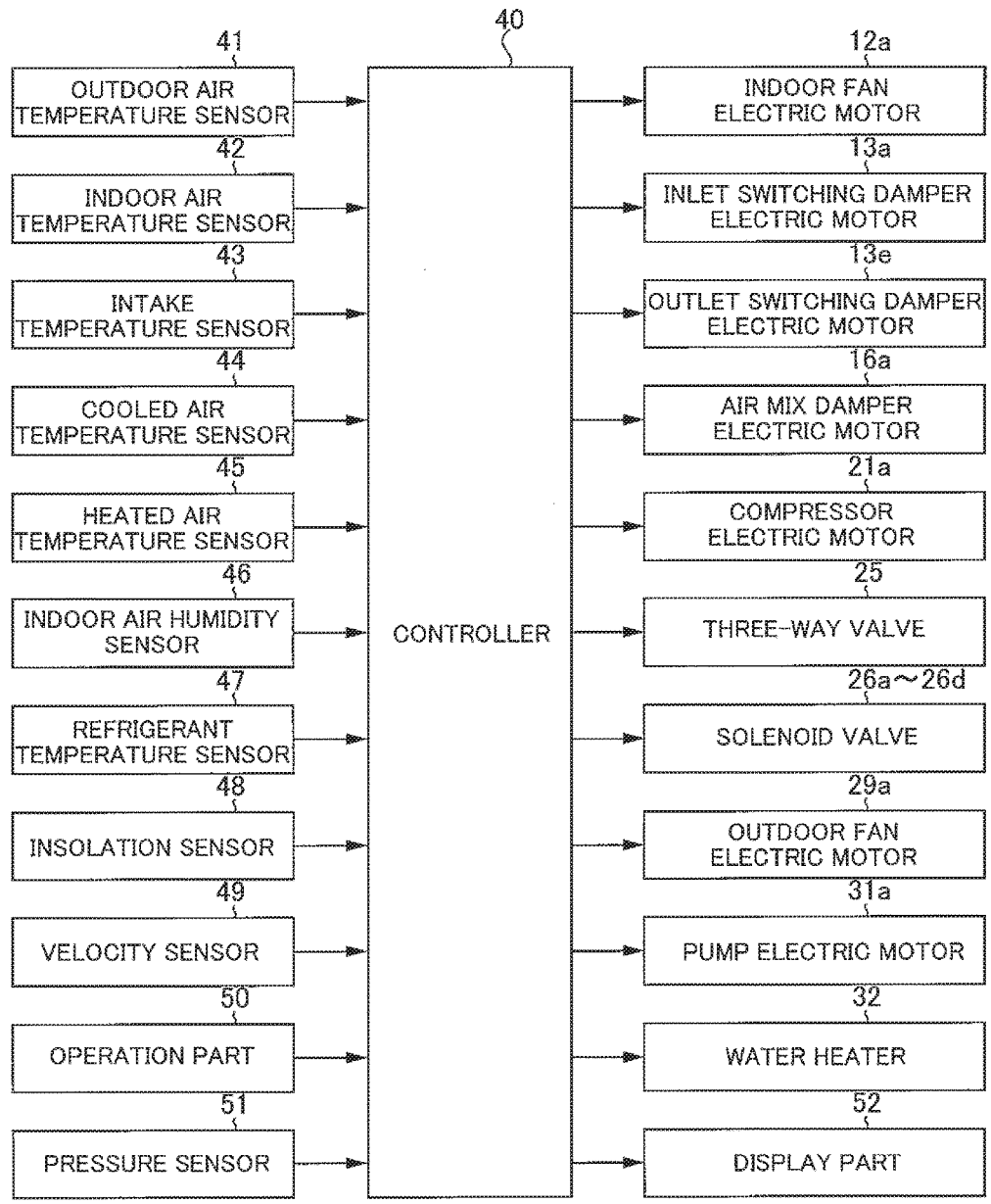
FIG. 2 is a block diagram showing a control system.

As shown in FIG. 2, an outdoor air temperature sensor 41 configured to detect temperature Tam outside the vehicle interior; an indoor air temperature sensor 42 configured to detect temperature Tr in the vehicle interior; an intake temperature sensor 43 configured to detect temperature Ti of the air flowing into the air flow passage 11; a cooled air temperature sensor 44 configured to detect temperature Te of the air having been cooled in the heat exchanger 14; a heated air temperature sensor 45 configured to detect temperature Tc of the air having been heated in the radiator 15; an indoor air humidity sensor 46 configured to detect humidity Th in the vehicle interior; a refrigerant temperature sensor 47 configured to detect temperature Thex of the refrigerant after the heat exchange in the outdoor heat exchanger 23; an insolation sensor 48 such as a photo sensor configured to detect amount of insolation Ts; a velocity sensor 49 configured to detect velocity V of the vehicle; an operation part 50 configured to set modes regarding to target setting temperature Tset and the switching of the operation; and a pressure sensor 51 configured to detect pressure Pd in the high-pressure side of the refrigerant circuit 20 are connected to the input side of the controller 40.

As shown in FIG. 2, an electric motor 12a for driving the indoor fan 12; an electric motor 13a for driving the inlet switching damper 13; an electric motor 13e for driving the outlet switching dampers 13b, 13c and 13d; an electric motor 16a for driving the air mix damper 16; an electric motor 21a for driving the compressor 21; the three-way valve 25; the first to fourth solenoid valves 26a, 26b, 26c and 26d; an electric motor 29a for driving the outdoor fan 29; an electric motor 31a for driving the pump 31; the water heater 32; and a display part 52 such as a liquid crystal display configured to display the indoor air temperature Tr or information on such as an operation state are connected to the output side of the controller 40.

The vehicle air conditioning apparatus having the above-described configuration performs cooling operation, cooling and dehumidifying operation, heating operation, first heating and dehumidifying operation, second heating and dehumidifying operation and defrost operation. Now, each operation will be explained.

First, the cooling operation will be explained. In the refrigerant circuit 20, the flow passage of three-way valve is set to the refrigerant flow passage 20c side; the second and third solenoid valves 26b and 26c open and the first and fourth solenoid valves 26a and 26d are closed; and the compressor 21 is operated. Meanwhile, the operation of the pump 31 is stopped in the water circuit 30.

Figure 3:
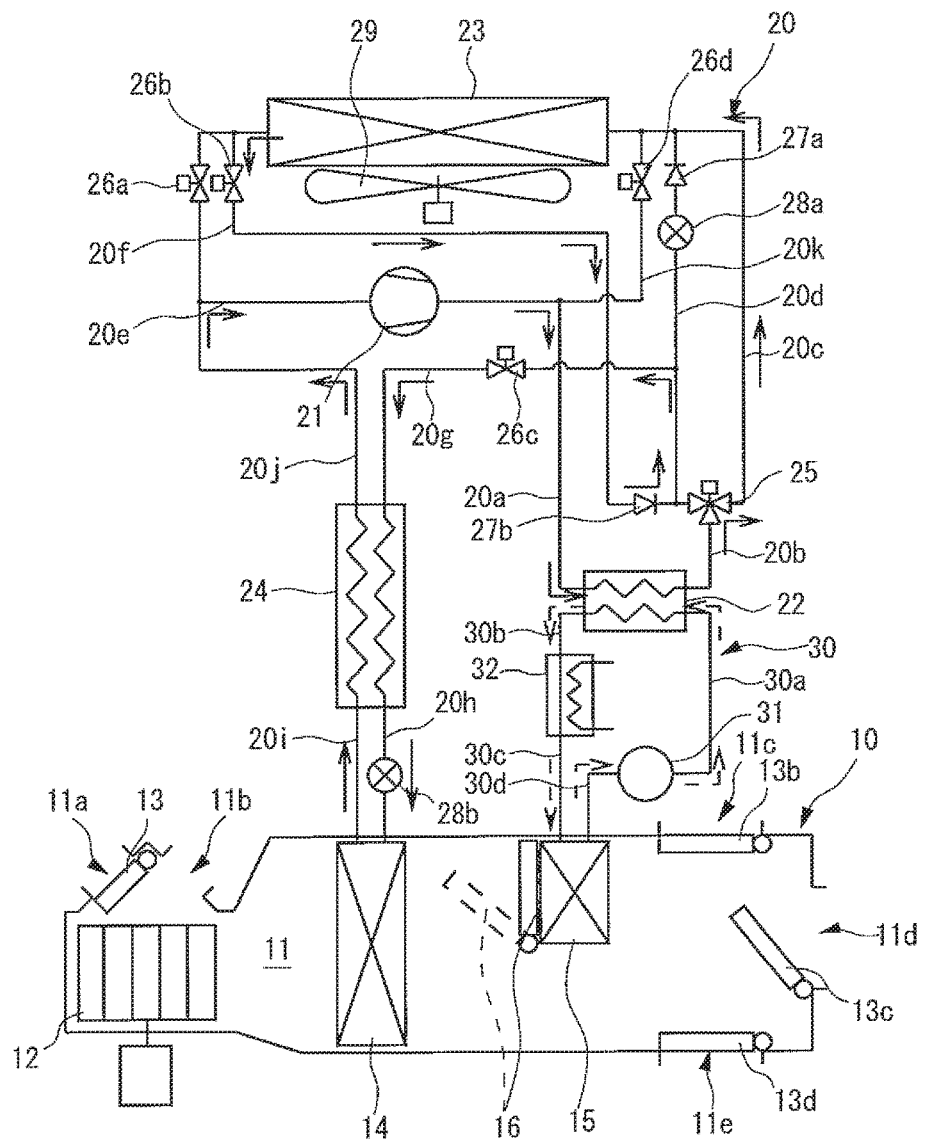
FIG. 3 is a schematic view showing the vehicle air conditioning apparatus performing a cooling operation and a cooling and dehumidifying operation.

By this means, as shown in FIG. 3, the refrigerant discharged from the compressor 21 flows through in this order: the refrigerant flow passage 20a; the water-refrigerant heat exchanger 22; water-refrigerant flow passages 20b and 20c; the outdoor heat exchanger 23, the refrigerant flow passages 20f, 20d and 20g, the high-pressure side of the internal heat exchanger 24; the refrigerant flow passage 20h; the heat exchanger 14; the refrigerant flow passage 20i; the low-pressure side of the internal heat exchanger 24; and the refrigerant flow passages 20j and 20e, and is sucked into the compressor 21. The refrigerant flowing through the refrigerant circuit 20 releases the heat in the outdoor heat exchanger 23 and absorbs the heat in the heat exchanger 14. Since the pump 31 is stopped in the cooling operation, heat is not released from refrigerant in the water-refrigerant heat exchanger 22.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air is the target air-blowing temperature TAO of the air to blow out of the outlets 11c, 11d and 11e in order to set the temperature of the vehicle interior to target setting temperature Tset. Then, the air at temperature Tset blows to the vehicle interior.

Next, the cooling and dehumidifying operation will be explained. In the refrigerant circuit 20, like the cooling operation, the flow passage of the three-way valve 25 is set to the refrigerant flow passage 20c side; the second and third solenoid valves 26b and 26c open and the first and fourth solenoid valves 26a and 26d are closed; and the compressor 21 is operated. In the water circuit 30, the pump 31 is operated.

By this means, as shown in FIG. 3, the refrigerant discharged from the compressor 21 flows through in the same way as in the cooling operation. The refrigerant flowing through the refrigerant circuit 20 releases the heat in the water-refrigerant heat exchanger 22 and the outdoor heat exchanger 23, and absorbs the heat in the heat exchanger 14.

In addition, the water discharged from the pump 31 flows through in this order: the water-refrigerant heat exchanger 22, the water heater 32; and the radiator 15 as indicated by the chain line of FIG. 3, and is sucked into the pump 31. The water flowing through the water circuit 30 absorbs the heat in the water-refrigerant heat exchanger 22 and releases the heat in the radiator 15.

In this case, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subject to heat exchange with the water which releases the heat in the radiator 15, and therefore heated. As a result, the air at the target air-blowing temperature TAO blows to the vehicle interior.

Next, the heating operation will be explained. In the refrigerant circuit 20, the flow passage of the three-way valve 25 is set to the refrigerant flow passage 20d side; the first solenoid valve 26a opens and the second to fourth solenoid valves 26b to 26d are closed: and the compressor 21 is operated. In the water circuit 30, the pump 31 is operated.

Figure 4:
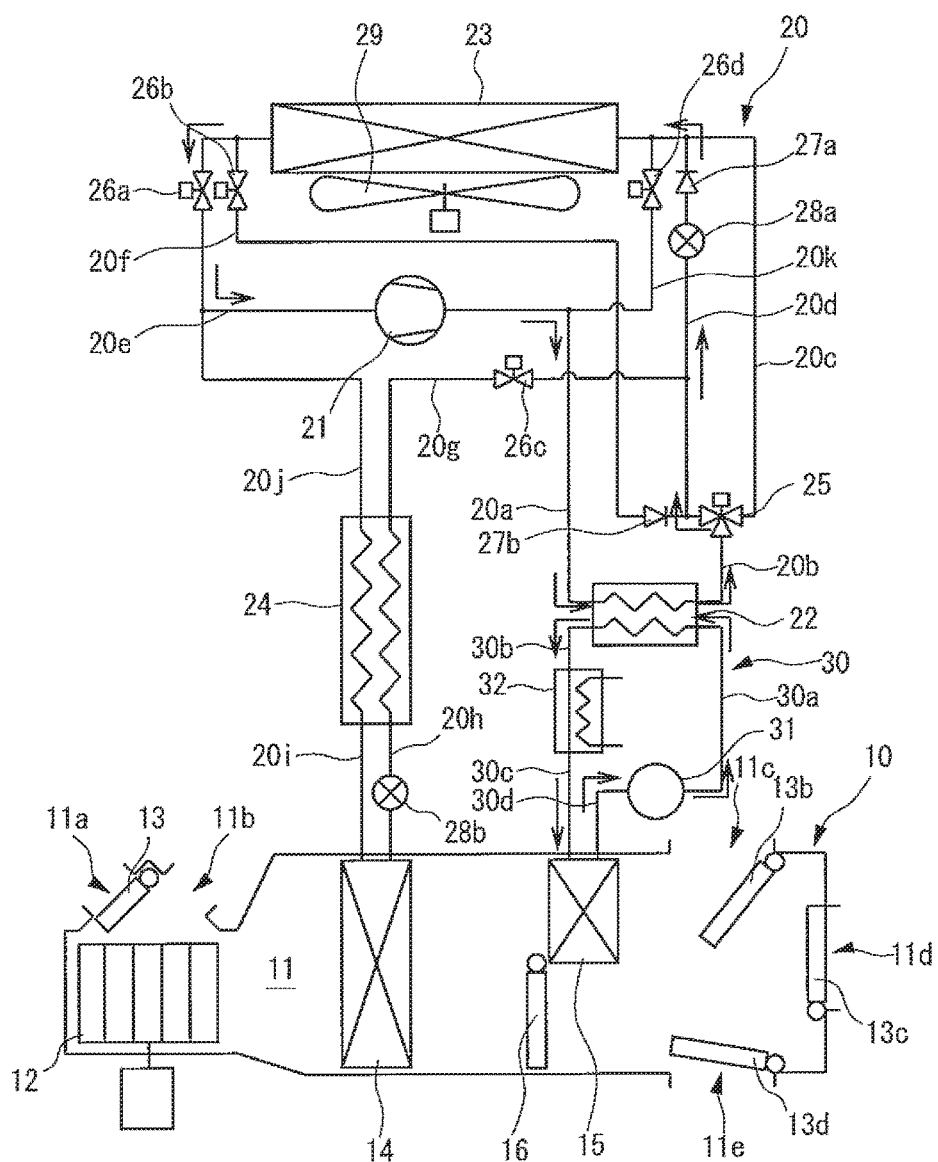
FIG. 4 is a schematic view showing the vehicle air conditioning apparatus performing a heating operation.

By this means, as shown in FIG. 4, the refrigerant discharged from the compressor 21 flows through this order: the refrigerant flow passage 20a; the water-refrigerant heat exchanger 22; the refrigerant flow passages 20b and 20d; the outdoor heat exchanger 23; and the refrigerant flow passage 22e, and is sucked into the compressor 21. The refrigerant flowing through the refrigerant circuit 20 releases the heat in the water-refrigerant heat exchanger 22 and absorbs the heat in the outdoor heat exchanger 23.

Meanwhile, as shown in FIG. 4, the water discharged from the pump 31 flows through in this order: the water-refrigerant heat exchanger 22; the water heater 32; and the radiator 15, and is sucked into the pump 31. The water flowing through the water circuit 30 absorbs the heat in the water-refrigerant heat exchanger 22 and releases the heat in the radiator 15.

In this case, in the air conditioning unit 10, the indoor fan 12 is operated to flow the air through the air flow passage 11, and the flowing air is not subject to a heat exchange with the refrigerant in the heat exchanger 14, but is subjected to a heat exchange with the water in the radiator 15 and therefore is heated. As a result, the air at the target air-blowing temperature TAO blows to the vehicle interior.

Next, the first heating and dehumidifying operation will be explained. In the refrigerant circuit 20, the flow passage of the three-way valve 25 is set to the refrigerant flow passage 20d side; the first and third solenoid valves 26a and 26c open and the second and fourth solenoid valves 26b and 26d are closed; and the compressor 21 is operated. Meanwhile, the pump 31 is operated in the water circuit 30.

Figure 5:
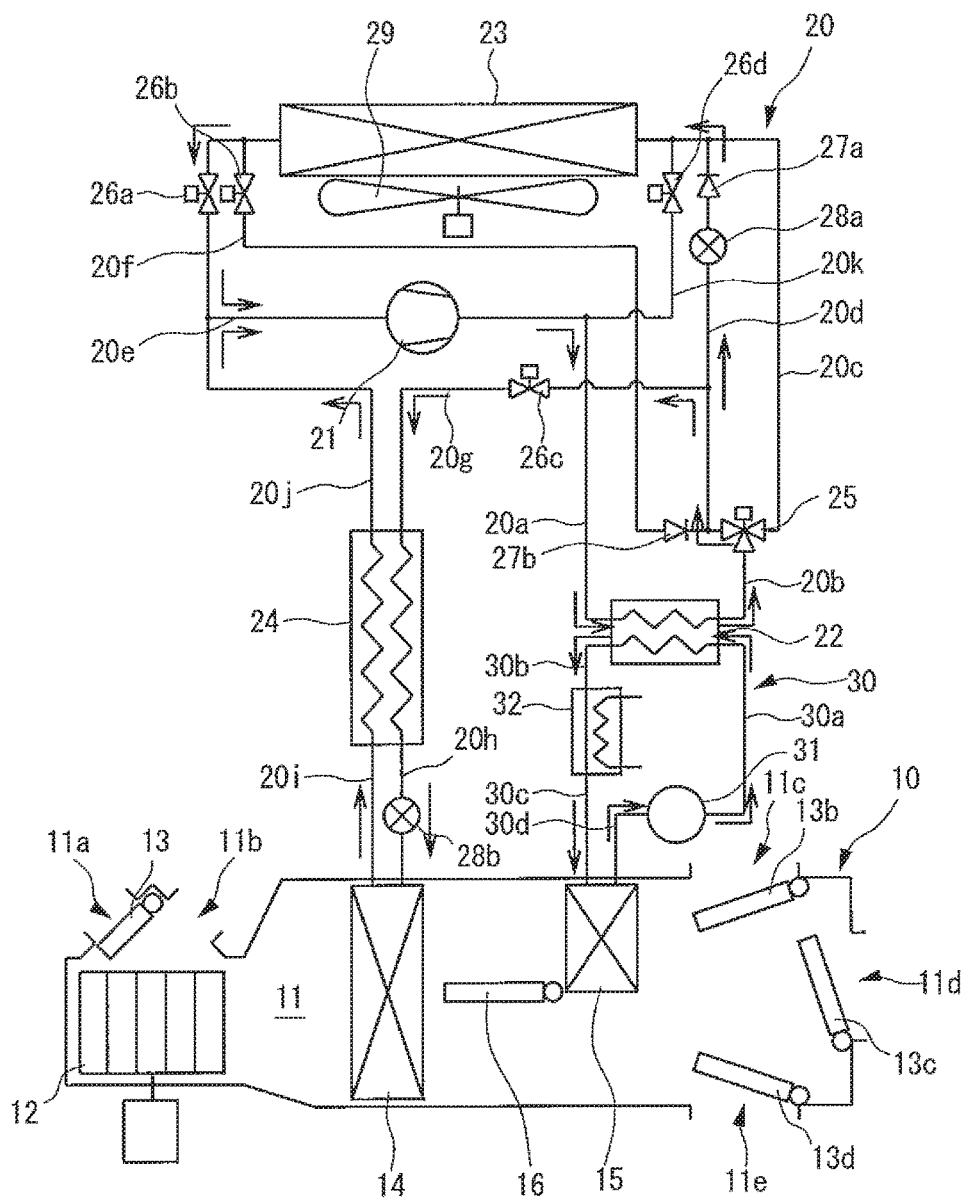
FIG. 5 is a schematic view showing the vehicle air conditioning apparatus performing a first heating and dehumidifying operation.

By this means, as shown in FIG. 5, the refrigerant discharged from the compressor 21 flows through in this order: the refrigerant flow passage 20a; the water-refrigerant heat exchanger 22; and the refrigerant flow passages 20b and 20d. Part of the refrigerant flowing through the refrigerant flow passage 20d flows through in this order: the outdoor heat exchanger 23; and the refrigerant flow passage 20e, and is sucked into the compressor 21. In addition, remaining refrigerant flowing through the refrigerant flow passage 20d flows through in this order: the refrigerant flow passage 20g; the high-pressure side of the interior heat exchanger 24; the refrigerant flow passage 20h; the heat exchanger 14; the refrigerant flow passage 20i; the low-pressure side of the interior heat exchanger 24; and the refrigerant flow passages 20j and 20e, and is sucked into the compressor 21. The refrigerant flowing through the refrigerant circuit 20 releases the heat in the water-refrigerant heat exchanger 22 and absorbs the heat in the heat exchanger 14 and the outdoor heat exchanger 23.

Meanwhile, as shown in FIG. 5, the water discharged from the pump 31 flows through in this order: the water-refrigerant heat exchanger 22; the water heater 32; and the radiator 15, and is sucked into the pump 31. The water flowing through the water circuit 30 absorbs the heat in the water-refrigerant heat exchanger 22 and releases the heat from the radiator 15.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the water in the radiator 15 and heated. As a result, the air at the target air-blowing temperature TAO blows into the vehicle interior.

Next, the second heating and dehumidifying operation will be explained. In the refrigerant circuit 20, the flow passage of the three-way valve 25 is set to the refrigerant flow passage side 20*d*; the third solenoid valve 26*c* opens and the first, second and fourth solenoid valves 26*a*, 26*b* and 26*d* are closed; and the compressor 21 is operated. Meanwhile, the pump 31 is operated in the water circuit 30.

Figure 6:
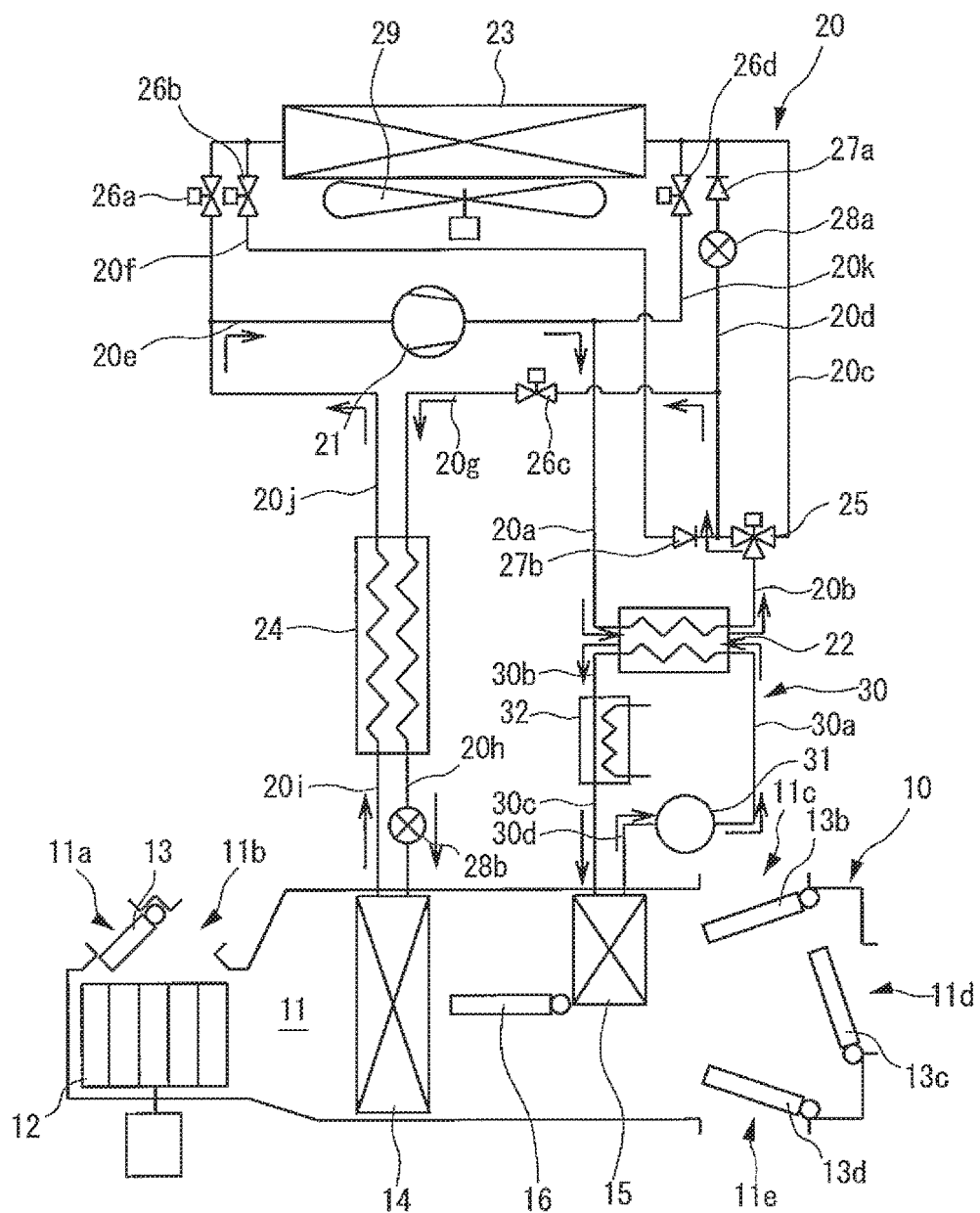
FIG. 6 is a schematic view showing the vehicle air conditioning apparatus performing a second heating and dehumidifying operation.

By this means, as shown in FIG. 6, the refrigerant discharged from the compressor 21 flows through in this order: the refrigerant flow passage 20*a*; the water-refrigerant heat exchanger 22; the refrigerant flow passages 20*b*, 20*d* and 20*g*; the high-pressure side of the interior heat exchanger 24; the refrigerant flow passage 20*h*; the heat exchanger 14; the refrigerant flow passage 20*i*; the low-pressure side of the interior heat exchanger 24; and the refrigerant flow passages 20*j* and 20*e*, and is sucked into the compressor 21. The refrigerant flowing through the refrigerant circuit 20 releases the heat in the water-refrigerant heat exchanger 22 and absorbs the heat in the heat exchanger 14.

Meanwhile, as shown in FIG. 6, the water discharged from the pump 31 flows through in this order: the water-refrigerant heat exchanger 22; the water heater 32; and the radiator 15, and is sucked into the pump 31. The water flowing through the water circuit 30 absorbs the heat in the water-refrigerant heat exchanger 22 and releases the heat in the radiator 15.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified in the same way as in the first heating and dehumidifying operation. Part of the air dehumidified in the heat exchanger 14 is subjected to a heat exchange with the water in the radiator 15, and therefore heated. As a result, the air at the target air-blowing temperature TAO blows to the vehicle interior.

Next, the defrost operation will be explained. In the refrigerant circuit 20, the flow passage of the three-way valve 25 is set to the refrigerant flow passage 20*d* side; the first and fourth solenoid valves 26*a* and 26*d* open and the second and third solenoid valves 26*b* and 26*c* are closed; and the compressor 21 is operated. Meanwhile, the pump 31 is operated in the water circuit 30.

Figure 7:
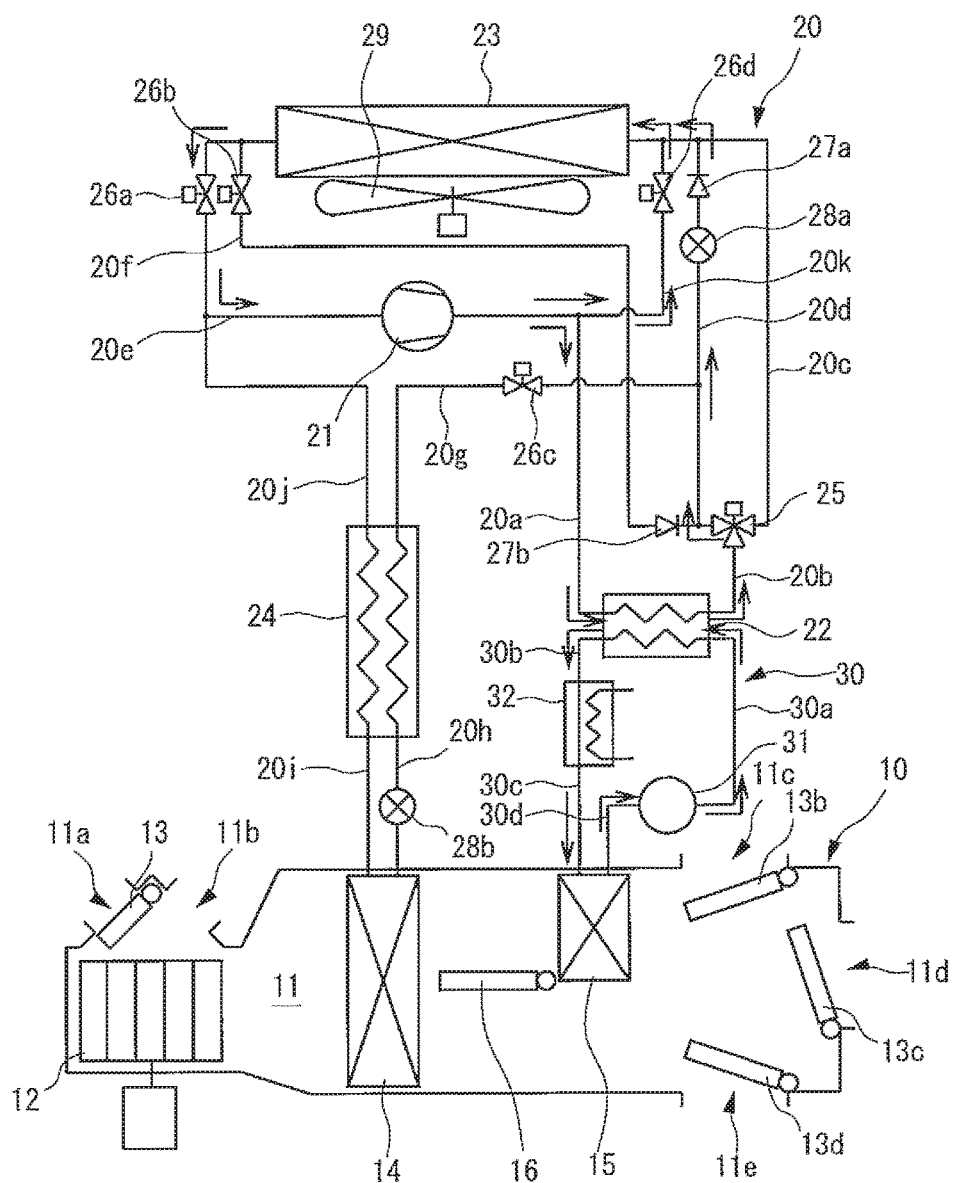
FIG. 7 is a schematic view showing the vehicle air conditioning apparatus performing a defrost operation.
Figure 8:
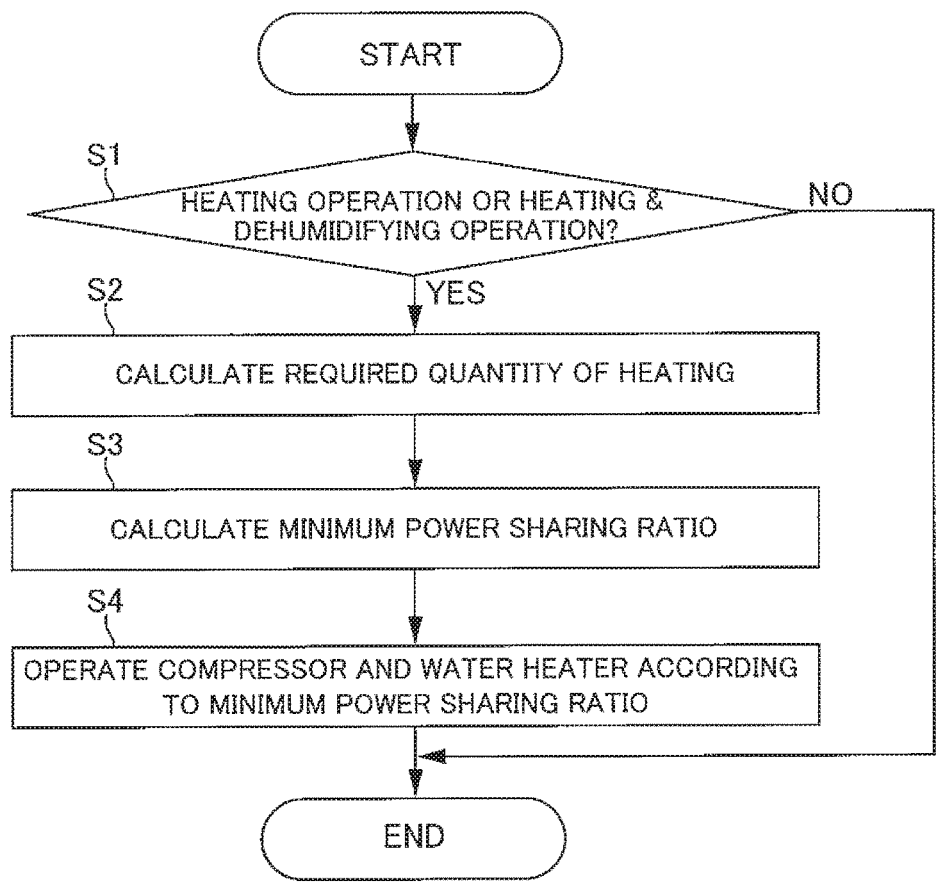
FIG. 8 is a flowchart showing a process to control quantity of heating.

By this means, as shown in FIG. 7, part of the refrigerant discharged from the compressor 21 flows through in this order: the refrigerant flow passage 20*a*; the water-refrigerant heat exchanger 22; the refrigerant flow passages 20*b* and 20*d*, and flows into the outdoor heat exchanger 23. In addition, the remaining refrigerant discharged from the compressor 21 flows through the refrigerant flow passages 20*a* and 20*k* and flows into the outdoor heat exchanger 23. The refrigerant flowing out of the outdoor heat exchanger 23 flows through the refrigerant flow passage 20*e*, and is sucked into the compressor 21. The refrigerant flowing through the refrigerant circuit 20 releases the heat in the radiator 15, and at this time, absorbs the heat in the outdoor heat exchanger 23.

Meanwhile, as shown in FIG. 7, the water discharged from the pump 31 flows through in this order: the water-refrigerant heat exchanger 22, the water heater 32; and the radiator 15, and is sucked into the pump 31. The water flowing through the water circuit 30 absorbs the heat in the water-refrigerant heat exchanger 22, and releases the heat in the radiator 15.

In this case, in the air conditioning unit 10, the indoor fan 12 is operated to flow the air through the air flow passage 11. The flowing air is not subjected to a heat exchange with the refrigerant in the heat exchanger 14, but is subjected to a heat exchange with the water which releases the heat in the radiator 15, and therefore is heated and then blows to the vehicle interior.

While the automatic switch of the operation part 50 is turned on, the controller 40 performs an operation switching control process to switch among the cooling operation, the cooling and dehumidifying operation, the heating operation, the first heating and dehumidifying operation, the second heating and dehumidifying operation, and the defrost operation, based on indoor and outdoor environmental conditions, such as temperature.

In each operation switched by the operation switching control process, the controller 40 switches among the foot mode, the vent mode and the bi-level mode according to the target air-blowing temperature TAO. To be more specific, when the target air-blowing temperature TAO is high, for example, 40 degrees centigrade, the controller 40 sets the foot mode. Meanwhile, when the target air-blowing temperature TAO is low, for example, lower than 25 degrees centigrade, the controller sets the vent mode. Moreover, when the target air-blowing temperature TAO is the temperature between the temperature for the foot mode and the temperature for the vent mode, the controller 40 sets the bi-level mode.

The controller 40 switches the mode of the outlets 11*c*, 11*d* and 11*e* by using the outlet switching dampers 13*b*, 13*c* and 13*d*, and controls the opening degree of the air mix damper 16 in order to set the temperature of the air blowing out of the outlets 11*c*, 11*d*, and 11*e* to the target air-blowing temperature TAO.

Moreover, in the heating operation or the heating and dehumidifying operation, the controller 40 performs a quantity-of-heating control process to control quantity of heat release Q_hp of the refrigerant and quantity of heat release Q_htr of the water heater 32 in the water-refrigerant heat exchanger 22, in order to set the temperature of the air blowing to the vehicle interior. Now, the operation of the controller 40 in this process will be explained with reference to the flowchart shown in FIG. 8.

(Step S1)

In step S1, the CPU determines whether the operation is the heating operation or the heating and dehumidifying operation. When determining that the operation is one of the heating operation and the heating and dehumidifying operation, the CPU moves the step to step S2. Meanwhile, determining that the operation is neither the heating operation nor the heating and dehumidifying operation, the CPU ends the quantity-of-heating control process.

(Step S2)

When determining that that the operation is one of the heating operation and the heating and dehumidifying operation in the step S1, the CPU calculates required quantity of heating Qreq based on outdoor air temperature Tam, temperature Te of the air having been cooled in the heat exchanger 14 (in case of the heating operation, temperature Ti of the air flowing into the air flow passage 11) and the target air-blowing temperature TAO.

(Step S3)

In step S3, the CPU calculates a minimum power sharing ratio, which is the sharing ratio between the quantity of heat release Q_hp of the water-refrigerant heat exchanger 22 and the quantity of heat release Q_htr of the water heater 32 that allows the power consumption to be minimized when the required quantity of heating Q_req calculated in the step 2 is outputted. A method of calculating this minimum power sharing ratio will be described later.

(Step S4)

In step S4, the CPU operates the compressor 21 and the water heater 32 according to the minimum power sharing ratio k calculated in the step S3, and ends the quantity-of-heating control process. In this case, the quantity of heat release Q_hp of the refrigerant in the water-refrigerant heat exchanger 22 and the quantity of heat release Q_htr of the water heater 32 are calculated based on the required quantity of heating Q_req and the minimum power sharing ratio k ($0 \leq k \leq 1$), (Q_hp=k×Qreq, Q_htr=(1−k)×Qreq).

Now, the method of calculating the minimum power sharing ratio k in the step S3 will be explained.

A coefficient of performance (hereinafter referred to as COP) related to the heating capability of the water-refrigerant heat exchanger 22 varies according to the number of rotations Nc of the compressor 21, the outdoor air temperature Tam and the target air-blowing temperature TAO. The COP can be read from a table in which the COP is associated with each of the number of rotations Nc of the compressor 21, the outdoor air temperature Tam and the target air-blowing temperature Tam. The table in which the COP is associated with each item is obtained by, for example, experiments, simulations by a computer and so forth.

The quantity of heat release Q_hp of the water-refrigerant heat exchanger 22 constantly increases and decreases according to the increase and decrease of the number of rotations of the compressor 21.

Moreover, power consumption W_htr of the water heater 32 constantly increases and decreases according to the increase and decrease of the quantity of heat release Q_htr. Meanwhile, power consumption W_hp of the water-refrigerant heat exchanger 22 is obtained by dividing the quantity of heat release Q_hp by the COP (W_hp=Q_hp/COP).

Therefore, the minimum power sharing ratio k is the sharing ratio between the water-refrigerant heat exchanger 22 and the water heater 32 when the total power consumption W_total of the power consumption W_hp and the power consumption W_htr is minimized on the condition that the total quantity of heat release Q_total of the quantity of heat release Q_hp and the quantity of heat release Q_htr satisfies the quantity of heat release Q_req.

The minimum power sharing ratio k varies according to the required quantity of heating Q_req, the outdoor air temperature Tam and the target air-blowing temperature TAO. The minimum power sharing ratio k is determined based on a table in which the minimum power sharing ratio k is associated with each of the required quantity of hearing Q_req, the outdoor air temperature Tam and the target air-blowing temperature TAO. The table in which the minimum power sharing ratio k is associated with each item is obtained by, for example, experiments, simulations by a computer and so forth.

As described above, with the vehicle air conditioning apparatus according to the present embodiment, when the required quantity of heating Q_req is acquired, the minimum power sharing ratio k between the quantity of heat release Qhp of the water-refrigerant heat exchanger 22 and the quantity of heat release Q_htr of the water heater 32 is calculated, which allows the power consumption W_total to be minimized, and the compressor 21 and the water heater 32 are controlled according to the result of the calculation. By this means, the required output of the heating operation can be obtained with the minimum power consumption, and therefore it is possible to reduce the power consumption of the heating operation or the heating and dehumidifying operation. As a result, it is possible to extend the mileage of the vehicle.

Figure 9:
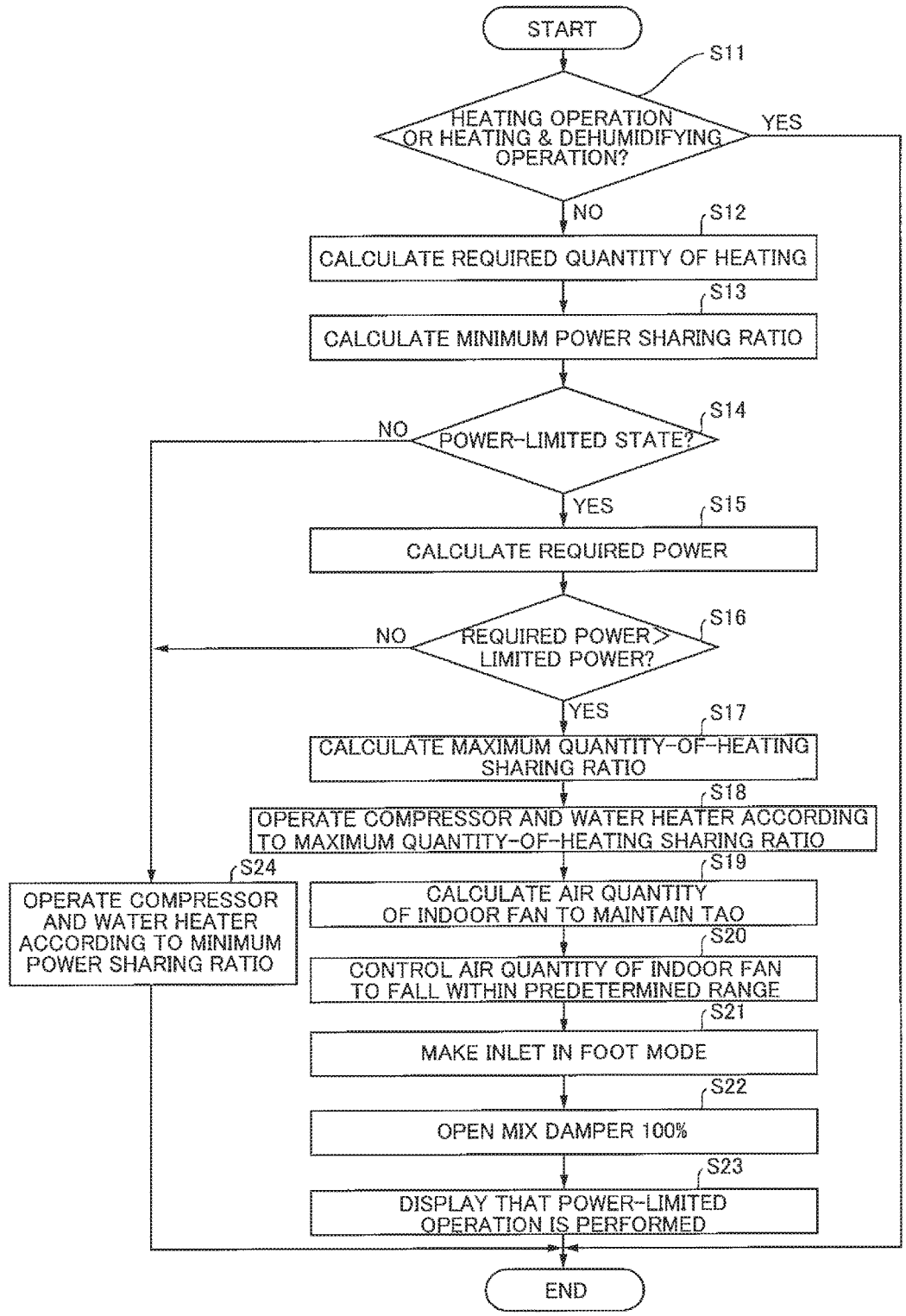
FIG. 9 is a flowchart showing a process to control power-limited operation according to Embodiment 2 of the present invention.

FIG. 9 shows Embodiment 2 of the present invention. Here, the same components are assigned the same reference numerals as in Embodiment 1.

This vehicle air conditioning apparatus is configured to perform power-limited operation to limit the supplied power W_total to the value equal to or lower than predetermined limited power Wlim_AC, when the battery power to be used to drive the vehicle is equal to or lower than a predetermined level.

During the power-limited operation, the controller 40 of this vehicle air conditioning apparatus performs a power-limited operation control process that can provide the maximum quantity of heat release within the range of the limited power Wlim_AC. Now, the operation of the controller 40 in this process will be explained with reference to the flowchart shown in FIG. 9.

(Step S11)

In step S11, the CPU determines whether the operation is the heating operation or the heating and dehumidifying operation. When determining that the operation is one of the heating operation and the heating and dehumidifying operation, the CPU moves the step to step S12. On the other hand, when determining that the operation is neither the heating operation nor the heating and dehumidifying operation, the CPU ends this power-limited operation control process.

(Step 12)

In step the S11, when determining that the operation is one of the heating operation and the heating and dehumidifying operation, the CPU calculates the required quantity of heating Q_req based on the outdoor air temperature Tam, the temperature Te of the air having been cooled in the heat exchanger 14 (in case of the heating operation, the temperature Ti of the air flowing into the air flow passage 11) and the target air-blowing temperature TAO in step S12.

(Step S13)

In step S13, the CPU calculates the minimum power sharing ratio k, which is the sharing ratio between the quantity of heat release Q_hp of the water-refrigerant heat exchanger 22 and the quantity of heat release Q_htr that allows the power consumption to be minimized when the required quantity of heating Q_req calculated in the step 2 is outputted. The method of calculating the minimum power sharing ratio is the same as in the step S3 of Embodiment 1.

(Step S14)

In step S14, the CPU determines whether or not the limited-power operation is being performed. When determining that the limited-power operation is being performed, the CPU moves the step to step S15. On the other hand, when determining that the power-limited operation is not performed, the CPU moves the step to step S24.

(Step 15)

When determining that the limited-power operation is being performed in the step S14, the CPU, in step 15, calculates required power W_req for the operation at the minimum power sharing ratio calculated in the step S13.

(Step S16)

In step S16, the CPU determines whether or not the power W_req calculated in the step S15 is greater than the limited power Wlim_AC. When determining that the power W_req is greater than the limited power Wlim_AC, the CPU moves the step to step S17. On the other hand, when determining that the power W_req is equal to or smaller than the limited power Wlim_AC, the CPU moves the step to the step S24.

(Step S17)

When determining that the required power W_req is greater than the limited power Wlim_AC in the step 16, the CPU calculates maximum quantity-of-heating sharing ratio k', which is the sharing ratio between the power consumption W_hp of the compressor 21 and the power consumption W_htr of the water heater 32 that allows the quantity of heating to be maximized at the limited power Wlim_AC. The method of calculating this maximum quantity-of-heating sharing ratio k' will be described later.

(Step S18)

In step S18, the CPU operates the compressor 21 and the water heater 32 according to the maximum quantity-of-heating sharing ratio k' calculated in the step S17. In this case, the power consumption W_hp of the compressor 21 and the power consumption W_htr of the water heater 32 are calculated based on the limited power Wlim_AC and the maximum quantity-of-heating sharing ratio k', (0≤k'≤1) (W_hp=k'×Wlim_AC, W_htr=(1−k')×Wlim_AC).

(Step S19)

In step S19, the CPU calculates the air quantity of the indoor fan 12 that can maintain the target air-blowing temperature TAO at the total quantity of heat release Q_total of the quantity of heat release Q_hp and the quantity of heat release Q_htr. To be more specific, the following equation is held by: the quantity of heating Q_total; difference in temperature ΔT (degree centigrade) between temperature Tc of the air having been heated in the radiator 15 and temperature Te of the air before being heated in the radiator 15 (temperature Te in the heating and dehumidifying operation and temperature Ti or Te in the heating operation); specific heat of the air Cp (J/kg·K=W·sec/kg·k); density ρ (kg/m3); and flow rate G (m3/sec) of the air subjected to a heat exchange with the water in the radiator 15.

$$Q\_total = \Delta T \times Cp \times \rho \times G$$

Therefore, when the quantity of heating Q_total drops during the power-limited operation, it is possible to maintain the temperature difference ΔT by decreasing the flow rate G of the air. In the step S19, the air quantity of the indoor fan 12 is calculated, which can maintain the temperature difference ΔT in the above-described equation.

(Step S20)

In step S20, the CPU operates the indoor fan 12 based on the air quantity calculated in the step S19. In this case, when the air quantity calculated in the step S19 is smaller than the controllable minimum air quantity, the air quantity of the indoor fan 12 is minimized. On the other hand, when the air quantity is greater than the value not during the power-limited operation, the air quantity is set to a value not during the power-limited operation.

(Step S21)

In step S21, the CPU sets the mode of the outlets to the foot mode by the outlet switching dampers 13b, 13c and 13d.

(Step S22)

In step S22, the CPU determines that the opening degree of the air mix damper 16 is 10%.

(Step S23)

In step S23, the CPU displays that the power-limited operation is being performed on the display part 52.

(Step S24)

When determining that the power-limited operation is not performed in the step 14, or when determining that the required power is lower than the limited power in the step S16, the CPU, in step S24, operates the compressor 21 and the water heater 32 according to the minimum power sharing ratio k calculated in the step S3, and ends the power-limited operation control process. Here, the quantity of heat release Q_hp of the refrigerant in the water-refrigerant heat exchanger 22 and the quantity of heat release Q_htr of the water heater 32 is calculated based on the required quantity of heating Qreq and the minimum power sharing ratio k (0≤k≤1), (Q_hp=k×Qreq, Q_htr=(1−k)×Qreq).

Next, the method of calculating the maximum quantity-of-heating sharing ratio k' in the step S17 will be explained.

The maximum quantity-of-heating sharing ratio k' is the sharing ratio of the operation between the water-refrigerant heat exchanger 22 and the water heater 32 when the total quantity of heating Q_total of the quantity of heating Q_hp of the water-refrigerant heat exchanger 22 and the quantity of heating Q_htr of the water heater 32 is maximized on the condition that the total power consumption of the power consumption W_hp of the compressor 21 and the power consumption W_htr of the water heater 32 is the limited power Wlim_AC.

The maximum quantity-of-heating sharing ratio k' varies according to the limited power Wlim_AC, the outdoor air temperature Tam, and the target air-blowing temperature TAO. The maximum quantity-of-heating sharing ratio k' is determined based on a table in which the maximum quantity-of-heating sharing ratio k' is associated with each of the limited power Wlim_AC, the outdoor air temperature Tam and the target air-blowing temperature TAO. The table in which the maximum quantity-of-heating sharing ratio k' is associated with each item is obtained by, for example, experiments, simulations by a computer and so forth.

As described above, with the vehicle air conditioning apparatus according to the present embodiment, it is possible to acquire the required output of the heating operation with the minimum power consumption, and therefore to reduce the power consumption in the heating operation or the heating and dehumidifying operation in the same way as in Embodiment 1. As a result, it is possible to extend the mileage of the vehicle.

In addition, during the power-limited operation, the maximum quantity-of-heating sharing ratio k' between the power consumption W_hp of the compressor 21 and the power consumption W_htr of the water heater 32 is calculated, which allows the quantity of heat release Q_total to be maximized at the limited power Wlim_AC, and the compressor 21 and the water heater 32 are controlled based on the result of the calculation. By this means, it is possible to achieve the maximum quantity of heat release Q_total within the range of the limited power Wlim_AC, and therefore to prevent the environment of the vehicle interior, such as the temperature and the humidity from deteriorating during the power-limited operation.

Moreover, the air quantity of the indoor fan 12 is controlled such that the temperature of the air blowing into the vehicle interior from the indoor fan 12 during the power-limited operation is the target air-blowing temperature TAO of the air blowing into the vehicle interior from the indoor fan 12 not during the power-limited operation. By this means, it is possible to prevent the air-blowing temperature from changing because the power-limited operation starts, and the passengers in the vehicle do not have an uncomfortable feeling because of the change in air-blowing temperature.

In addition, when the air quantity of the indoor fan 12 calculated in the step S19 is smaller than the controllable minimum air quantity, the air quantity of the indoor fan 12 is minimized. On the other hand, when the air quantity is greater than the air quantity not during the power-limited operation, the air quantity of the indoor fan 12 is set to the value not during the power-limited operation. By this means, it is possible to set the air quantity of the indoor fan 12 within a predetermined range, and therefore to prevent inefficient operation and a failure of the indoor fan 12.

Moreover, the display part 52 displays that the power-limited operation is being performed on the display part 52. By this means, it is possible to notify the passengers in vehicle that the power-limited operation is being performed, and therefore to prevent the passengers from making an error of judgment that a failure has occurred.

Here, with the present embodiment, a configuration has been described where the heat released from the water-refrigerant circuit 20 is absorbed in the water flowing through the water circuit 30 via the water-refrigerant heat exchanger 22. However, heat medium subjected to a heat exchange with refrigerant is not limited to water, but any heat medium is applicable, which enables heat transfer, such as antifreeze solution containing ethyleneglycol and so forth.

In addition, with the present embodiment, a configuration has been described where the three-way valve 25 is used to switch between the refrigerant flow passages 20c and 20d in the refrigerant circuit 20. It is by no means limiting. Two solenoid valves are applicable instead of the three-way valve, and therefore it is possible to switch between the refrigerant flow passages 20c and 20d by opening and closing these solenoid valves.

Moreover, with the present embodiment, a configuration has been described where the display part 52 displays that the power-limited operation is being performed. It is by no means limiting, but another configuration is possible where the voice of a speaker is used to notify that the power-limited operation is being performed.

Moreover, with the present embodiment, a configuration has been described where the water flowing through the water circuit 30, which is subjected to the heat exchange with the refrigerant releasing the heat in the water-refrigerant heat exchanger 22 of the refrigerant circuit 20, is heated by the water heater 32. It is by no means limiting. For example, the vehicle air conditioning apparatus may not have the water circuit 30 but have an indoor radiator. The indoor radiator releases the heat of the refrigerant flowing through the refrigerant circuit 20 directly in the air flow passage 11, and the air flowing through the air flow passage 11 may be directly heated by an electric heater. By this means, it is possible to produce the same effect as in the present embodiment. Moreover, further another configuration is possible where the vehicle air conditioning apparatus includes an indoor radiator configured to release the heat of the refrigerant flowing through the refrigerant circuit 20 directly in the air flow passage 11; a heat medium circuit that allows the heat medium having heated by the electric heater to flow through is provided separately from the refrigerant circuit 20; the heat of the heat medium heated by the electric heater is released in the air flow passage 11. By this means, it is possible to produce the same effect as in the present embodiment.

With the present embodiment, the process including the step S3 and the step S13 to calculate the minimum power sharing ratio k corresponds to a minimum power sharing ratio calculation part of the present invention. The minimum power sharing ratio k is the sharing ratio between the quantity of heat release Q_hp of the water-refrigerant heat exchanger 22 and the quantity of heat release Q_htr of the water heater 32 that allows the power consumption to be minimized when the required quantity of heating Q_req is outputted. In addition, with the present embodiment, the process including the step S17 to calculate the maximum quantity-of-heating sharing ratio k' corresponds to a maximum sharing ratio calculation part of the present invention. The maximum quantity-of-heating sharing ratio k' is the sharing ratio between the power consumption W_hp of the compressor 21 and the power consumption W_htr of the water heater 32 that allows the quantity of heating to be maximized at the limited power Wlim_AC. In addition, with the present embodiment, the process including the step 19 to calculate the air quantity of the indoor fan 12, which can maintain the target air-blowing temperature TAO at the total quantity of heat release Q_total of the quantity of heat release Q_hp and the quantity of heat release Q_htr corresponds to an air quantity calculation part of the present invention. Moreover, with the present embodiment, the process including the step S23 to display that the power-limited operation is being performed on the display part 52 corresponds to an information part of the present invention.

FIG. 10 to FIG. 22 show Embodiment 3 of the present invention.

Figure 10:
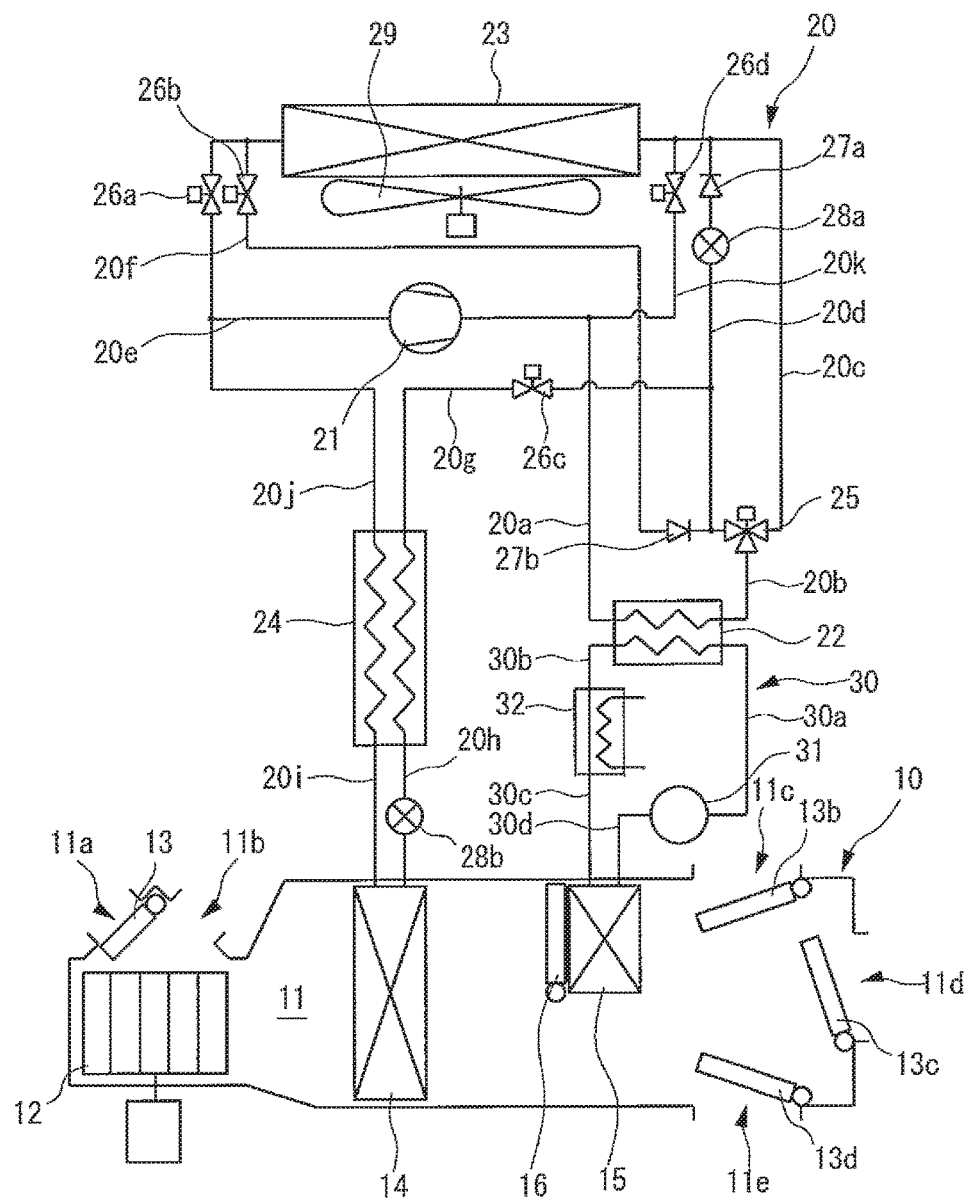
FIG. 10 is a schematic view showing the vehicle air conditioning apparatus according to Embodiment 3 of the present invention.

As shown in FIG. 10, this vehicle air conditioning apparatus includes an air conditioning unit 10 provided in the vehicle interior, and a refrigerant circuit 20 and a water circuit 30 that are formed across the vehicle interior and the outdoor.

The air conditioning unit 10 includes an air flow passage 11 that allows the air to be supplied to the vehicle interior to pass through. An outdoor air inlet 11a and an indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, a foot outlet 11c, a vent outlet 11d and a defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the airflow passage 11 to blow to the interior surface of the front window.

An indoor fan 12 such as a sirocco fan configured to allow the air to flow through the air flow passage 11 from end to end is provided in the first end side of the air flow passage 11. This indoor fan 12 is driven by the electric motor 12a.

Also, in the first end side of the air flow passage 11, an inlet switching damper 13 configured to open one of the outdoor air inlet 11a and the indoor air inlet 11b and to close the other. This inlet switching damper 13 is driven by the electric motor 13a. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

Outlet switching dampers 13*b*, 13*c* and 13*d* configured to open and close the foot outlet 11*c*, the vent outlet 11*d* and the defroster outlet 11*e* are provided in the foot outlet 11*c*, the vent outlet 11*d* and the defroster outlet 11*e*, respectively, in the second side of the air flow passage 11. These outlet switching dampers 13*b*, 13*c* and 13*d* are configured to move together by a linkage and are opened and closed by the electric motor 13*e*. Here, when the outlet switching dampers 13*b*, 13*c* and 13*d* open the foot outlet 1*c*, close the bent outlet 11*d* and slightly open the defroster outlet 11*e*, most of the air flowing through the air flow passage 11 blows out of the foot outlet ilc and the remaining air blows out of the defroster outlet 11*e*. This mode is referred to as "foot mode." Meanwhile, when the outlet switching dampers 13*b*, 13*c* and 13*d* close the foot outlet 11*c* and the defroster outlet 11*e*, and open the vent outlet 11*d*, all the air flowing through the air flow passage 11 blows out of the vent outlet 11*d*. This mode is referred to as "vent mode." In addition, when the outlet switching dampers 13*b*, 13*c* and 13*d* open the foot outlet 11*c* and the vent outlet 11*d*, and close the defroster outlet 11*e*, the air flowing through the air flow passage 11 blows out of the foot outlet 11*c* and the vent outlet 11*d*. This mode is referred to as "bi-level mode." Moreover, when the outlet switching dampers 13*b*, 13*c* and 13*d* close the foot outlet 11*c* and the vent outlet 11*d*, and open the defroster outlet 11*e*, the air flowing through the air flow passage 11 blows out of the defroster outlet 11*e*. This mode is referred to as "defroster mode." Furthermore, when the outlet switching dampers 13*b*, 13*c* and 13*d* close the vent outlet 11*d* and open the foot outlet 11*c* and the defroster outlet 11*e*, the air flowing through the air flow passage 11 blows out of the foot outlet 11*c* and the defroster outlet 11*e*. This mode is referred to as "defroster-foot mode." Here, in the bi-level mode, the air flow passage 11, the foot outlet 11*c*, the vent outlet 11*d*, and a heat exchanger and a radiator which will be described later, are arranged and configured such that the temperature of the air blowing out of the foot outlet 11*c* is higher than the temperature of the air blowing out of the vent outlet 11*d*.

A heat exchanger 14 is provided in the air flow passage 11 in the downstream of the air flow from the indoor fan 12. The heat exchanger 14 is configured to cool and dehumidify the air flowing through the air flow passage 11. In addition, a radiator 15 is provided in the air flow passage 11 in the downstream of the air flow from the heat exchanger 14. The radiator 15 is configured to heat the air flowing through the air flow passage 11. The heat exchanger 14 is a heat exchanger that is constituted by fins and tubes and that is configured to perform heat exchange between the refrigerant flowing through the refrigerant circuit 20 and the air flowing through the air flow passage 11. Meanwhile, the radiator 15 is a heat exchanger that is constituted by fins and tubes and that is configured to perform heat exchange between the water flowing through the water circuit 30 and the air flowing through the air flow circuit 11.

An air mix damper 16 is provided between the heat exchanger 14 and the radiator 15 in the air flow passage 11 and is configured to control the percentage of the air to be heated, which is flowing through the air flow passage 11. The air mix damper 16 is driven by the electric motor 16*a*. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening degree is 0%, and, on the other hand, when the air mix damper 16 opens the upstream side of the radiator 15 and closes the portion other than the radiator 15, the opening degree is 100%.

The refrigerant circuit 20 includes: the heat exchanger 14; a compressor 21 configured to compress refrigerant; a water-refrigerant heat exchanger 22 configured to perform a heat exchange between the refrigerant and the water flowing through the water circuit 30; an outdoor heat exchanger 23 configured to perform a heat exchange between the refrigerant and the outdoor air; an indoor heat exchanger 24 configured to perform a heat exchange between the refrigerant flowing into the heat exchanger 14 and the refrigerant flowing out of the heat exchanger 14; a three-way valve 25 configured to switch the passage of the refrigerant; first to fourth solenoid valves 26*a* to 26*d*; first and second check valves 27*a* and 27*b*; and first and second expansion valves 28*a* and 28*b* configured to decompress the refrigerant. These components are connected to each other by a copper pipe or an aluminum pipe. The compressor 21 and the outdoor heat exchanger 23 are disposed outside the vehicle interior. The compressor 21 is driven by the electric motor 21*a*. The outdoor heat exchanger 23 is provided with an outdoor fan 29 configured to perform heat exchange between the outdoor air and the refrigerant when the vehicle stops. The outdoor fan 29 is driven by the electric motor 29*a*.

To be more specific, one side of the water-refrigerant heat exchanger 22 into which the refrigerant flows is connected to one side of the compressor 21 from which the refrigerant is discharged to form the refrigerant flow passage 20*a*. In addition, the input side of the outdoor heat exchanger 23 into which the refrigerant flows is connected to the output side of the water-refrigerant heat exchanger 22 from which the refrigerant is discharged, thereby to form the refrigerant flow passage 20*b*. The refrigerant flow passage 20*b* is provided with the three-way valve 25. The one side of the three-way valve 25 from which the refrigerant is discharged and another side from which the refrigerant is discharged are parallel to one another and are connected to the input side of the outdoor heat exchanger 23 into which the refrigerant flows and thereby to form the refrigerant flow passages 20*c* and 20*d*. The refrigerant flow passage 20*d* is provided with the first expansion valve 28*a* and the first check valve 27*a* in the order from the upstream of the flow of the refrigerant. The input side of the compressor 21 into which the refrigerant is sucked and the part of the refrigerant flow passage 20*d* between the three-way valve 25 and the first expansion valve 28*a* are connected in parallel to the output side of the outdoor heat exchanger 23 from which the refrigerant is discharged, thereby to form the refrigerant flow passage 20*e* and 20*f*. The refrigerant flow passage 20*e* is provided with the first solenoid valve 26*a*. The refrigerant flow passage 20*f* is provided with the second solenoid valve 26*b* and the second check valve 27*b* in the order from the upstream of the flow of the refrigerant. The input side of the interior heat exchanger 24 into which high-pressure refrigerant flows is connected to the part of the refrigerant flow passage 20*d* between the three-way valve 25 and the first expansion valve 28*a*, thereby to form the refrigerant flow passage 20*g*. The refrigerant passage 20*g* is provided with the third solenoid valve 26*c*. One side of the heat exchanger 14 into which the refrigerant flows is connected to one side of the interior heat exchanger 24 from which the high-pressure refrigerant flows to provide the refrigerant flow passage 20*h*. The refrigerant flow passage 20*h* is provided with the second expansion valve 28*b*. The input side of the indoor heat exchanger 24 into which low-pressure refrigerant flows is connected to the output side of the heat exchanger 14 from which the refrigerant is discharged, thereby to form the refrigerant flow passage 20i. The part of the refrigerant flow passage 20e between the first solenoid valve 26a and the input side of the compressor 21 into which the refrigerant is sucked is connected to the output side of the indoor heat exchanger 24 from which the low-pressure refrigerant is discharged, thereby to provide the refrigerant flow passage 20j. The input side of the outdoor heat exchanger into which the refrigerant flows is connected to the refrigerant flow passage 20a, thereby to provide the refrigerant flow passage 20k. The refrigerant flow passage 20k is provided with the fourth solenoid valve 26d.

The water circuit 30 includes the radiator 15, the water-refrigerant heat exchanger 22, a pump 31 configured to pump the water as heat medium and a water heater 32 as a heat medium heater, such as an electric heater configured to heat water by electric power. These components are connected by a copper pipe or an aluminum pipe. To be more specific, the input side of the water-refrigerant heat exchanger 22 into which water flows is connected to output side of the pump 31 from which the water is discharged, thereby to form a water flow passage 30a. The input side of the water heater 32 into which the water flows is connected to the output side of the water-refrigerant heat exchanger 22 from which the water is discharged, thereby to from a water flow passage 30b. The input side of the radiator 15 into which the water flows is connected to the output side of the water heater 32 from which the water is discharged, thereby to form a water flow passage 30c. The input side of the pump 31 into which the water is sucked is connected to the output side of the radiator 15 from which the water flows, thereby to from a water flow passage 30d. The pump 31 is driven by the electric motor 31a.

The vehicle air conditioning apparatus also includes a controller 40 that controls the temperature and the humidity of the vehicle interior to be the preset temperature and humidity.

The controller 40 includes a CPU, a ROM and a RAM. In the controller, upon receiving an input signal from a device connected to the input side, the CPU reads the program stored in the ROM according to the input signal, stores the state detected by the input signal on the RAM and transmits an output signal to a device connected to the output side.

Figure 11:
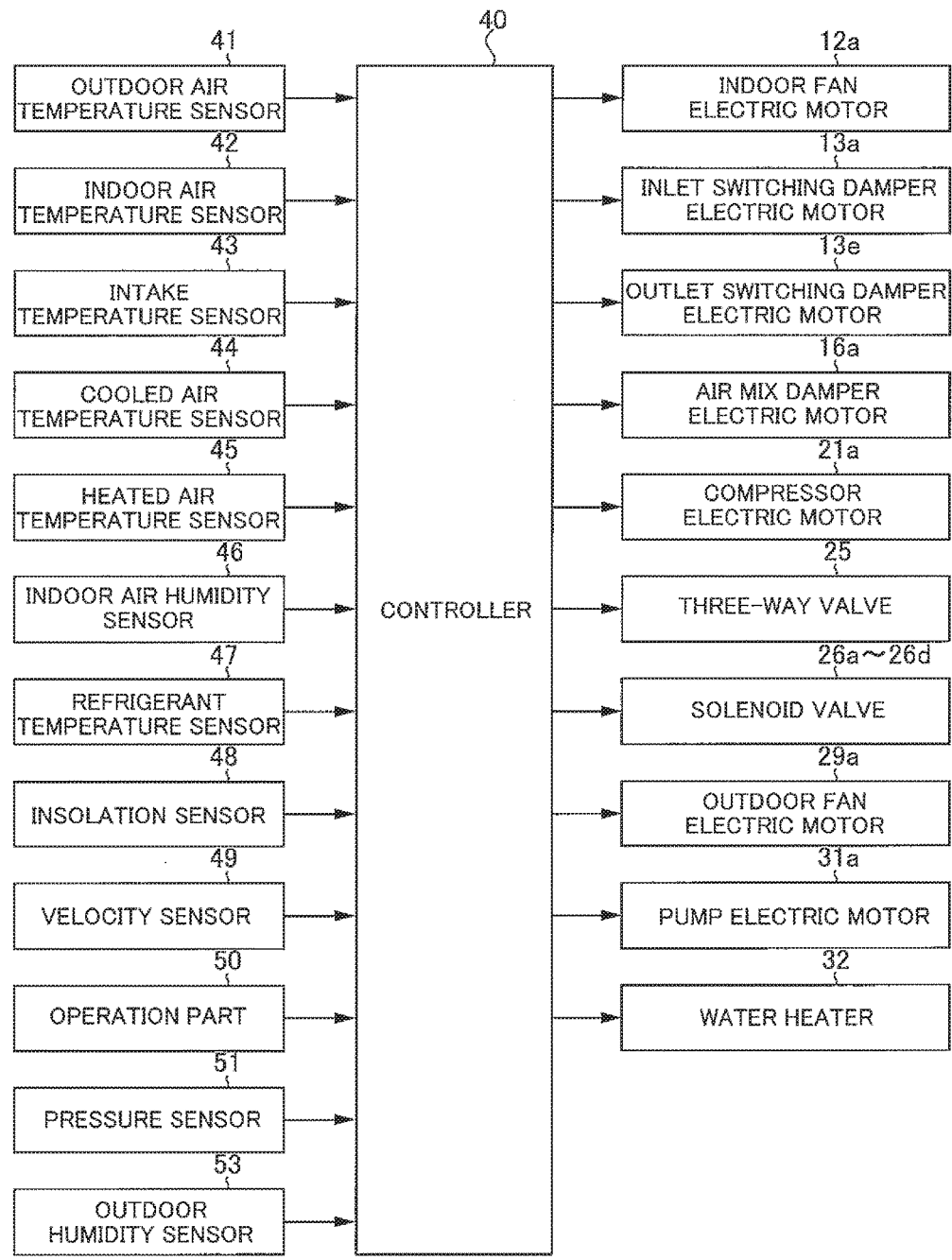
FIG. 11 is a block diagram showing a control system.

As shown in FIG. 11, an electric motor 12a for driving the indoor fan 12; an electric motor 13a for driving the inlet switching damper 13; an electric motor 13e for driving the outlet switching dampers 13b, 13c and 13d; an electric motor 16e for driving the air mix damper 16; an electric motor 21e for driving the compressor 21; the three-way valve 25; the first to fourth solenoid valves 26a, 26b, 26c and 26d; an electric motor 29a for driving the outdoor fan 29; an electric motor 31a for driving the pump 31; and the water heater 32 are connected to the output side of the controller 40.

As shown in FIG. 11, an outdoor air temperature sensor 41 configured to detect temperature Tam outside the vehicle interior; an indoor air temperature sensor 42 configured to detect temperature Tr in the vehicle interior; an intake temperature sensor 43 configured to detect temperature Ti of the air flowing into the air flow passage 11; a cooled air temperature sensor 44 configured to detect temperature Te of the air having been cooled in the heat exchanger 14; a heated air temperature sensor 45 configured to detect temperature Tc of the air having been heated in the radiator 15; an indoor air humidity sensor 46 configured to detect humidity Th in the vehicle interior; a refrigerant temperature sensor 47 configured to detect temperature Thex of the refrigerant after the heat exchange in the outdoor heat exchanger 23; an insolation sensor 48 such as a photo sensor configured to detect amount of insolation Ts; a velocity sensor 49 configured to detect velocity V of the vehicle; an operation part 50 configured to set modes regarding to target setting temperature Tset and the switching of the operation; a pressure sensor 51 configured to detect pressure Pd in the high-pressure side of the refrigerant circuit 20; and an outdoor air humidity sensor 53 configured to detect humidity Rham outside the vehicle interior are connected to the input side of the controller 40.

The vehicle air conditioning apparatus having the above-described configuration performs cooling operation, cooling and dehumidifying operation, heating operation, first heating and dehumidifying operation, second heating and dehumidifying operation and defrost operation. Now, each operation will be explained.

First, the cooling operation will be explained. In the refrigerant circuit 20, the flow passage of three-way valve is set to the refrigerant flow passage 20c side; the second and third solenoid valves 26b and 26c open and the first and fourth solenoid valves 26a and 26d are closed; and the compressor 21 is operated. Meanwhile, the operation of the pump 31 is stopped in the water circuit 30.

Figure 12:
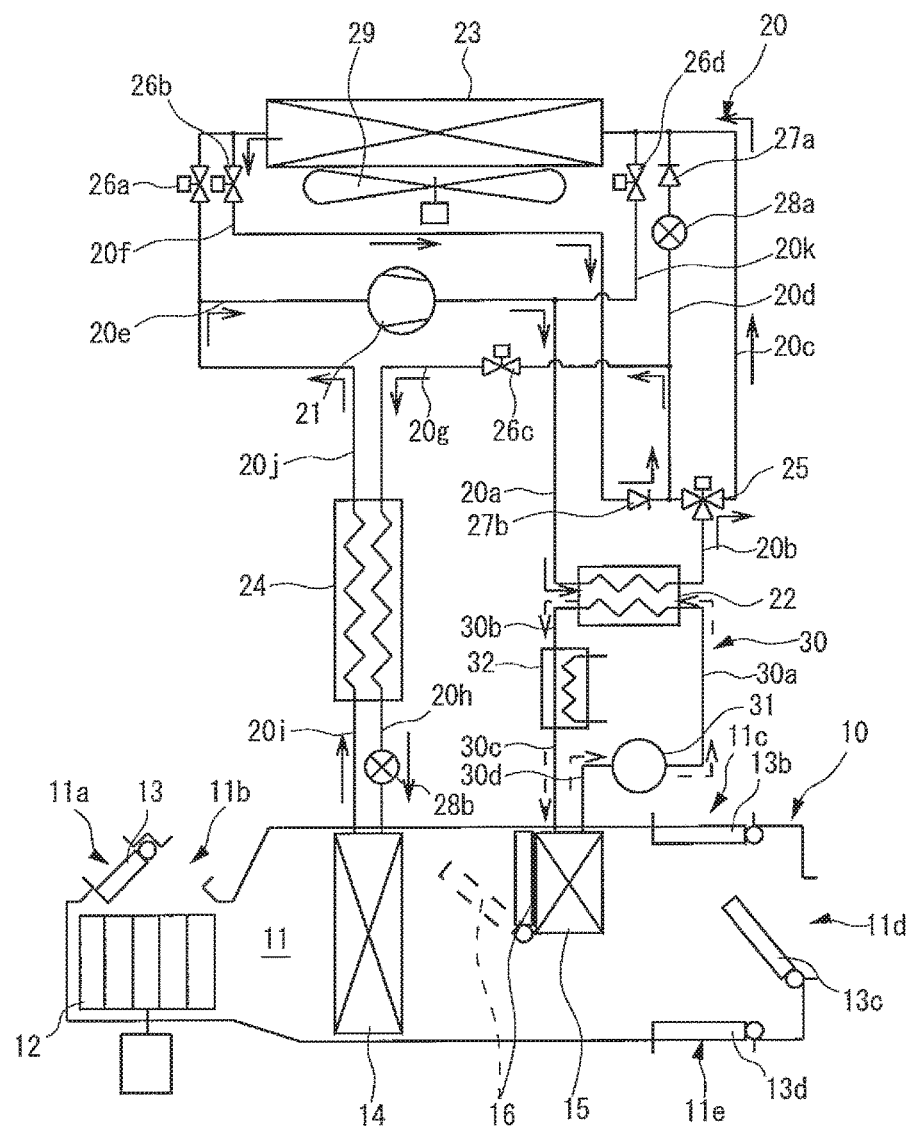
FIG. 12 is a schematic view showing the vehicle air conditioning apparatus performing the cooling operation and the cooling and dehumidifying operation.

By this means, as shown in FIG. 12, the refrigerant discharged from the compressor 21 flows through in this order: the refrigerant flow passage 20a; the water-refrigerant heat exchanger 22; water-refrigerant flow passages 20b and 20c; the outdoor heat exchanger 23, the refrigerant flow passages 20f, 20d and 20g, the high-pressure side of the internal heat exchanger 24; the refrigerant flow passage 20h; the heat exchanger 14; the refrigerant flow passage 20i; the low-pressure side of the internal heat exchanger 24; and the refrigerant flow passages 20j and 20e, and is sucked into the compressor 21. The refrigerant flowing through the refrigerant circuit 20 releases the heat in the outdoor heat exchanger 23 and absorbs the heat in the heat exchanger 14. Since the pump 31 is stopped in the cooling operation, heat is not released from refrigerant in the water-refrigerant heat exchanger 22.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air is the target air-blowing temperature TAO of the air to blow out of the outlets 11c, 11d and 11e in order to set the temperature of the vehicle interior to target setting temperature Tset. Then, the air at temperature Tset blows to the vehicle interior.

Next, the cooling and dehumidifying operation will be explained. In the refrigerant circuit 20, like the cooling operation, the flow passage of the three-way valve 25 is set to the refrigerant flow passage 20c side; the second and third solenoid valves 26b and 26c open and the first and fourth solenoid valves 26a and 26d are closed; and the compressor 21 is operated. In the water circuit 30, the pump 31 is operated.

By this means, as shown in FIG. 3, the refrigerant discharged from the compressor 21 flows through in the same way as in the cooling operation. The refrigerant flowing through the refrigerant circuit 20 releases the heat in the water-refrigerant heat exchanger 22 and the outdoor heat exchanger 23, and absorbs the heat in the heat exchanger 14.

In addition, the water discharged from the pump 31 flows through in this order: the water-refrigerant heat exchanger 22, the water heater 32; and the radiator 15 as indicated by the chain line of FIG. 12, and is sucked into the pump 31. The water flowing through the water circuit 30 absorbs the heat in the water-refrigerant heat exchanger 22 and releases the heat in the radiator 15.

At this time, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subject to heat exchange with the water which releases the heat in the radiator 15, and therefore heated. As a result, the air at the target air-blowing temperature TAO blows to the vehicle interior.

Next, the heating operation will be explained. In the refrigerant circuit 20, the flow passage of the three-way valve 25 is set to the refrigerant flow passage 20d side; the first solenoid valve 26a opens and the second to fourth solenoid valves 26b to 26d are closed: and the compressor 21 is operated. In the water circuit 30, the pump 31 is operated.

Figure 13:
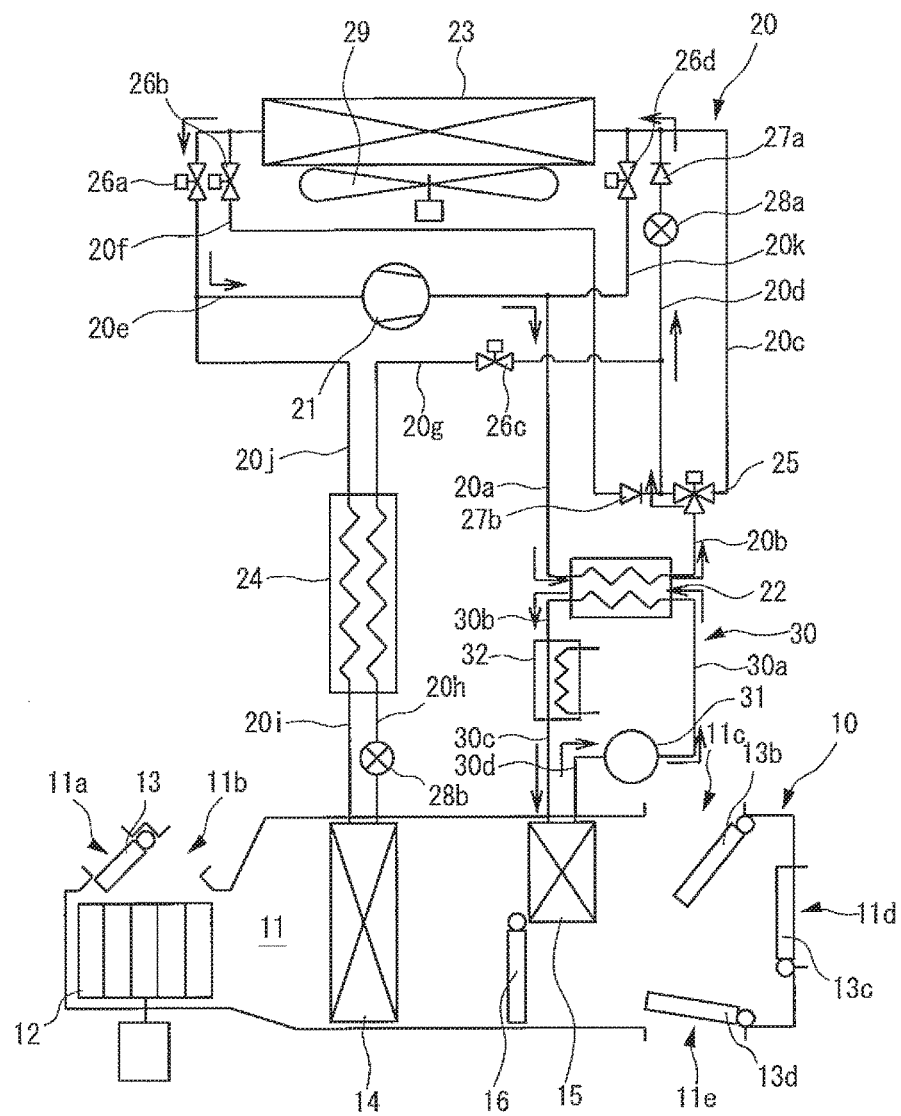
FIG. 13 is a schematic view showing the vehicle air conditioning apparatus performing the heating operation.

By this means, as shown in FIG. 13, the refrigerant discharged from the compressor 21 flows through this order: the refrigerant flow passage 20a; the water-refrigerant heat exchanger 22; the refrigerant flow passages 20b and 20d; the outdoor heat exchanger 23; and the refrigerant flow passage 20e, and is sucked into the compressor 21. The refrigerant flowing through the refrigerant circuit 20 releases the heat in the water-refrigerant heat exchanger 22 and absorbs the heat in the outdoor heat exchanger 23.

Meanwhile, as shown in FIG. 13, the water discharged from the pump 31 flows through in this order: the water-refrigerant heat exchanger 22; the water heater 32; and the radiator 15, and is sucked into the pump 31. The water flowing through the water circuit 30 absorbs the heat in the water-refrigerant heat exchanger 22 and releases the heat in the radiator 15.

In this case, in the air conditioning unit 10, the indoor fan 12 is operated to flow the air through the air flow passage 11, and the flowing air is not subject to a heat exchange with the refrigerant in the heat exchanger 14, but is subjected to a heat exchange with the water in the radiator 15 and therefore is heated. As a result, the air at the target air-blowing temperature TAO blows to the vehicle interior.

Next, the first heating and dehumidifying operation will be explained. In the refrigerant circuit 20, the flow passage of the three-way valve 25 is set to the refrigerant flow passage 20d side; the first and third solenoid valves 26a and 26c open and the second and fourth solenoid valves 26b and 26d are closed; and the compressor 21 is operated. Meanwhile, the pump 31 is operated in the water circuit 30.

Figure 14:
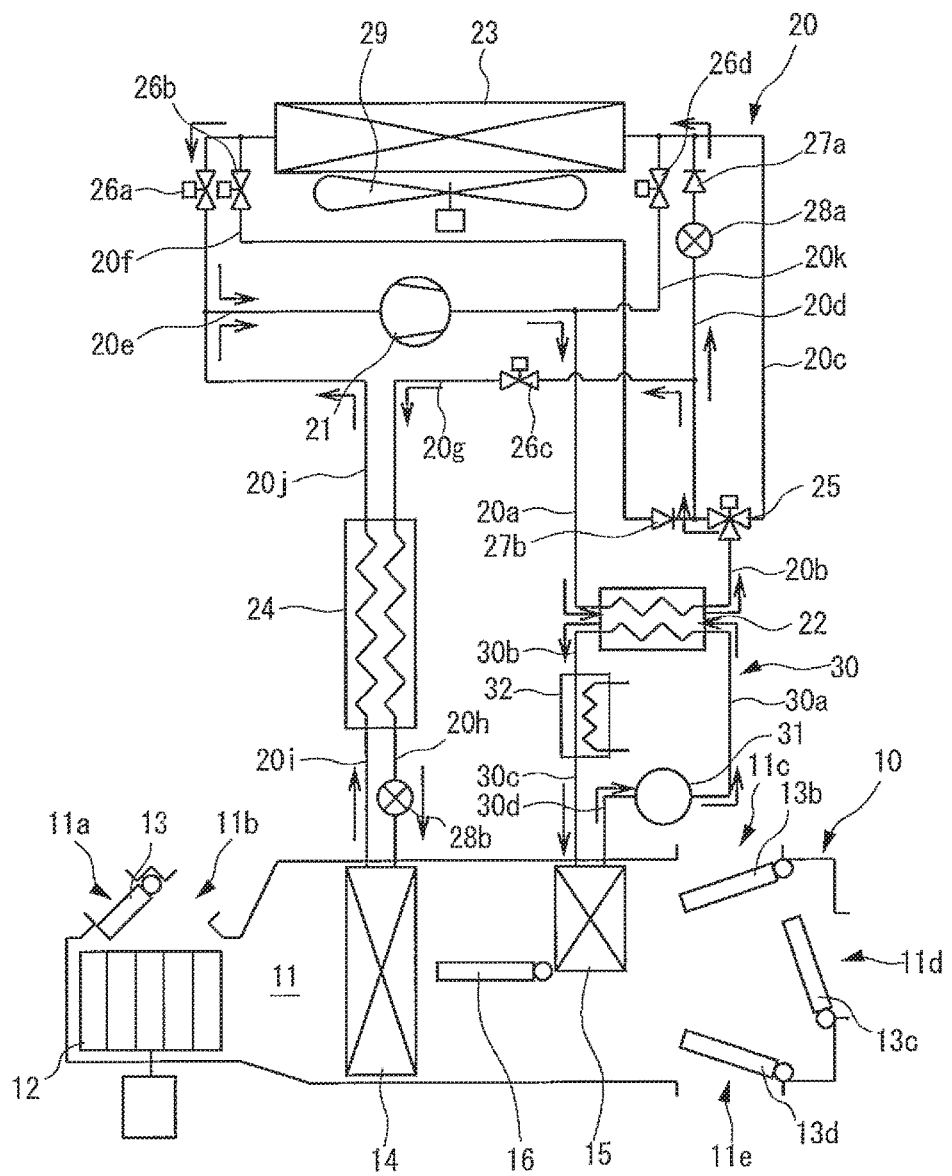
FIG. 14 is a schematic view showing the vehicle air conditioning apparatus performing the first heating and dehumidifying operation.

By this means, as shown in FIG. 14, the refrigerant discharged from the compressor 21 flows through in this order: the refrigerant flow passage 20a; the water-refrigerant heat exchanger 22; and the refrigerant flow passages 20b and 20d. Part of the refrigerant flowing through the refrigerant flow passage 20d flows through in this order: the outdoor heat exchanger 23; and the refrigerant flow passage 20e, and is sucked into the compressor 21. In addition, remaining refrigerant flowing through the refrigerant flow passage 20d flows through in this order: the refrigerant flow passage 20g; the high-pressure side of the interior heat exchanger 24; the refrigerant flow passage 20h; the heat exchanger 14; the refrigerant flow passage 20i; the low-pressure side of the interior heat exchanger 24; and the refrigerant flow passages 20j and 20e, and is sucked into the compressor 21. The refrigerant flowing through the refrigerant circuit 20 releases the heat in the water-refrigerant heat exchanger 22 and absorbs the heat in the heat exchanger 14 and the outdoor heat exchanger 23.

Meanwhile, as shown in FIG. 14, the water discharged from the pump 31 flows through in this order: the water-refrigerant heat exchanger 22; the water heater 32; and the radiator 15, and is sucked into the pump 31. The water flowing through the water circuit 30 absorbs the heat in the water-refrigerant heat exchanger 22 and releases the heat from the radiator 15.

At this time, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the water in the radiator 15 and heated. As a result, the air at the target air-blowing temperature TAO blows into the vehicle interior.

Next, the second heating and dehumidifying operation will be explained. In the refrigerant circuit 20, the flow passage of the three-way valve 25 is set to the refrigerant flow passage side 20d; the third solenoid valve 26c opens and the first, second and fourth solenoid valves 26a, 26b and 26d are closed; and the compressor 21 is operated. Meanwhile, the pump 31 is operated in the water circuit 30.

Figure 15:
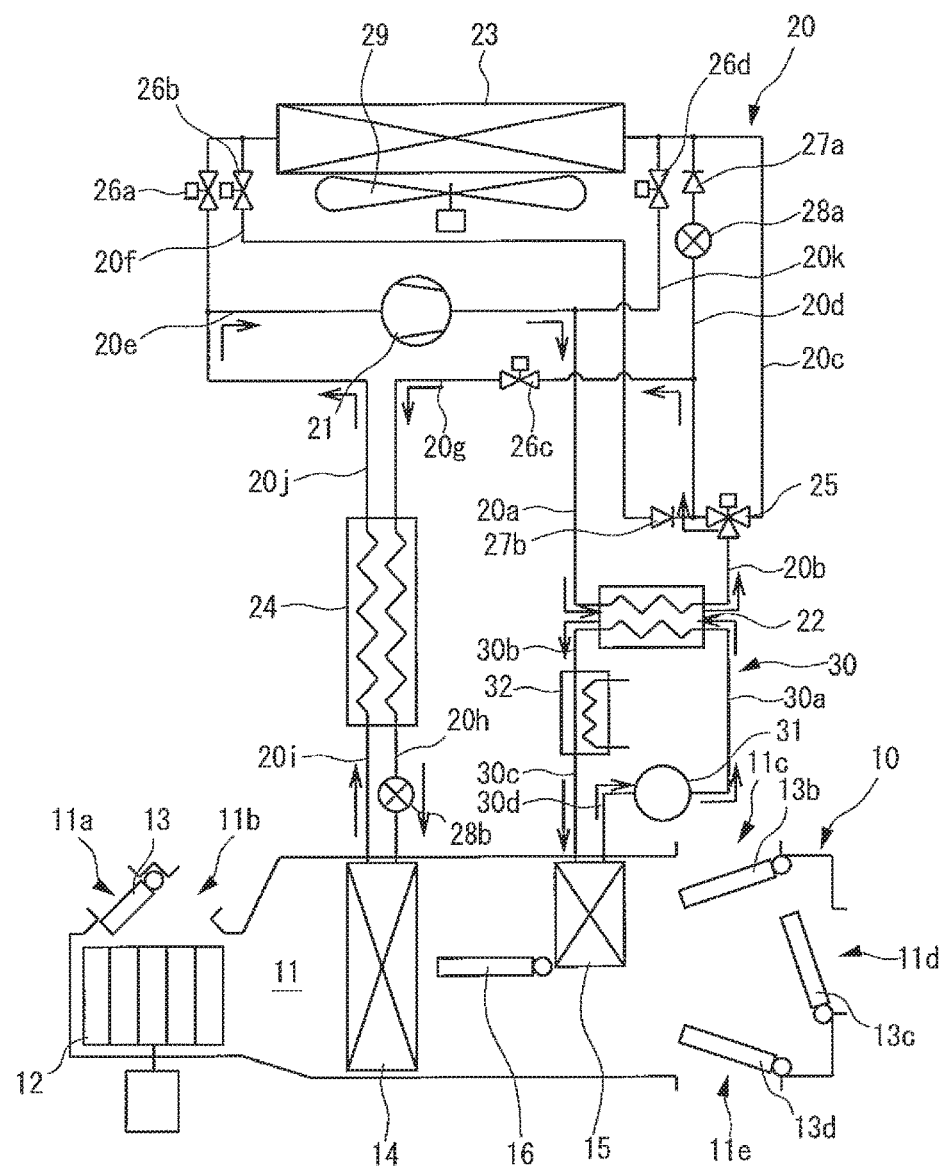
FIG. 15 is a schematic view showing the vehicle air conditioning apparatus performing the second heating and dehumidifying operation.

By this means, as shown in FIG. 15, the refrigerant discharged from the compressor 21 flows through in this order: the refrigerant flow passage 20a; the water-refrigerant heat exchanger 22; the refrigerant flow passages 20b, 20d and 20g; the high-pressure side of the interior heat exchanger 24; the refrigerant flow passage 20h; the heat exchanger 14; the refrigerant flow passage 20i; the low-pressure side of the interior heat exchanger 24; and the refrigerant flow passages 20j and 20e, and is sucked into the compressor 21. The refrigerant flowing through the refrigerant circuit 20 releases the heat in the water-refrigerant heat exchanger 22 and absorbs the heat in the heat exchanger 14.

Meanwhile, as shown in FIG. 15, the water discharged from the pump 31 flows through in this order: the water-refrigerant heat exchanger 22; the water heater 32; and the radiator 15, and is sucked into the pump 31. The water flowing through the water circuit 30 absorbs the heat in the water-refrigerant heat exchanger 22 and releases the heat in the radiator 15.

At this time, in the air conditioning unit 10, the indoor fan 12 is operated to flow the air through the air flow passage 11, and the flowing air is subjected to a heat exchange with the refrigerant in the heat exchanger 14, and therefore is cooled and dehumidified in the same way as in the first heating and dehumidifying operation. Part of the air dehumidified in the heat exchanger 14 is subjected to a heat exchange with the water in the radiator 15, and therefore heated. As a result, the air at the target air-blowing temperature TAO blows to the vehicle interior.

Next, the defrost operation will be explained. In the refrigerant circuit 20, the flow passage of the three-way valve 25 is set to the refrigerant flow passage 20d side; the first and fourth solenoid valves 26a and 26d open and the second and third solenoid valves 26d and 26c are closed; and the compressor 21 is operated. Meanwhile, the pump 31 is operated in the water circuit 30.

Figure 16:
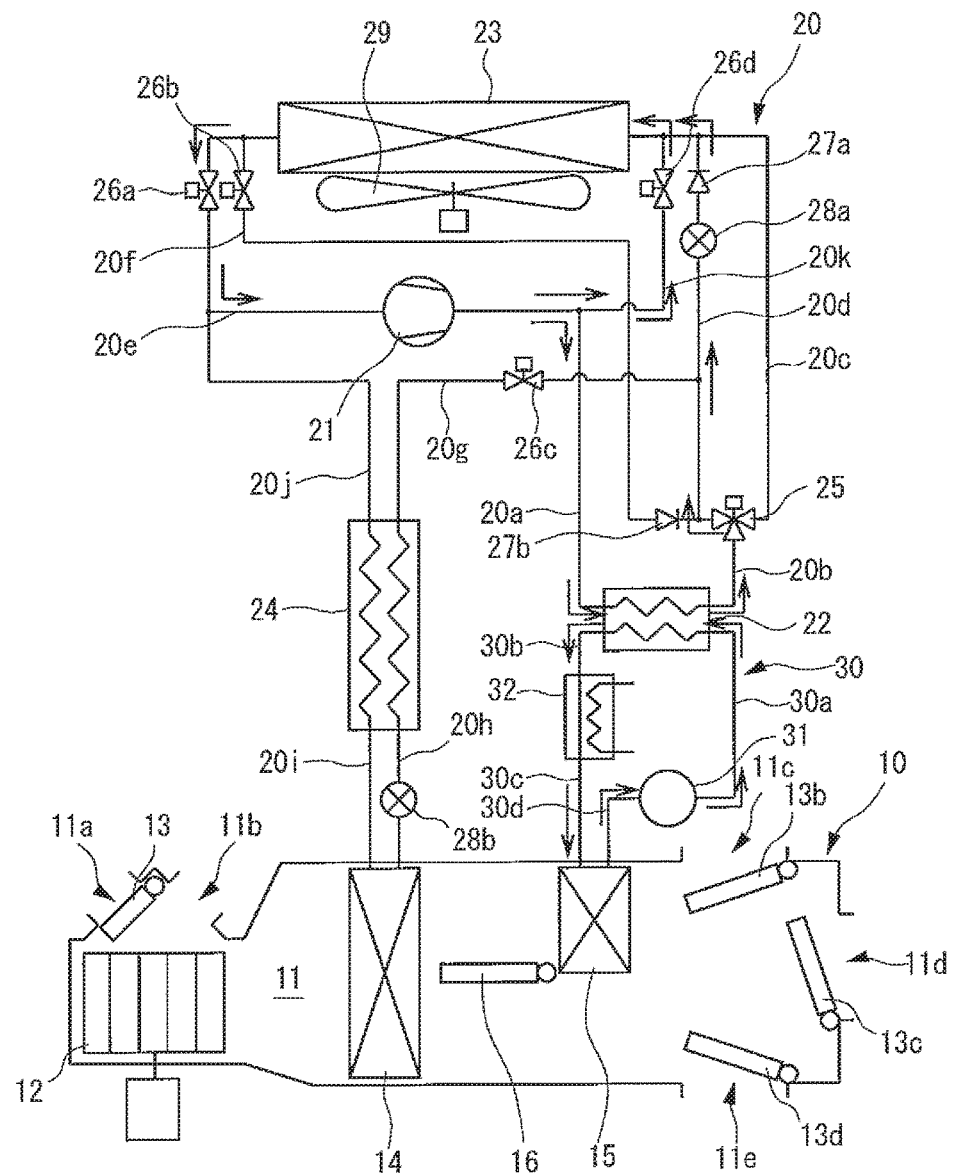
FIG. 16 is a schematic view showing the vehicle air conditioning apparatus performing the defrost operation.
Figure 17:
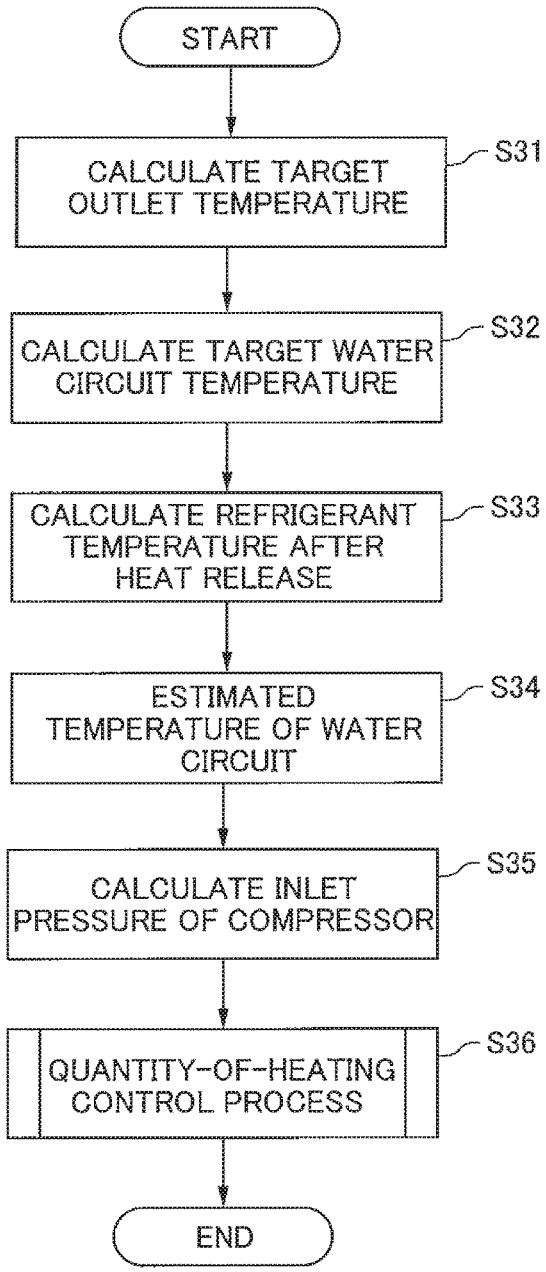
FIG. 17 is a flowchart showing a process to control water temperature.

By this means, as shown in FIG. 16, part of the refrigerant discharged from the compressor 21 flows through in this order: the refrigerant flow passage 20a; the water-refrigerant heat exchanger 22; the refrigerant flow passages 20b and 20, and flows into the outdoor heat exchanger 23. In addition, the remaining refrigerant discharged from the compressor 21 flows through the refrigerant flow passages 20a and 20k and flows into the outdoor heat exchanger 23. The refrigerant flowing out of the outdoor heat exchanger 23 flows through the refrigerant flow passage 20e, and is sucked into the compressor 21. The refrigerant flowing through the refrigerant circuit 20 releases the heat in the radiator 15, and at this time, absorbs the heat in the outdoor heat exchanger 23.

Meanwhile, as shown in FIG. 16, the water discharged from the pump 31 flows through in this order: the water-refrigerant heat exchanger 22, the water heater 32; and the radiator 15, and is sucked into the pump 31. The water flowing through the water circuit 30 absorbs the heat in the water-refrigerant heat exchanger 22, and releases the heat in the radiator 15.

In this case, in the air conditioning unit 10, the indoor fan 12 is operated to flow the air through the air flow passage 11. The flowing air is not subjected to a heat exchange with the refrigerant in the heat exchanger 14, but is subjected to a heat exchange with the water which releases the heat in the radiator 15, and therefore is heated and then blows to the vehicle interior.

While the automatic switch of the operation part 50 is turned on, the controller 40 performs an operation switching control process to switch among the cooling operation, the cooling and dehumidifying operation, the heating operation, the first heating and dehumidifying operation, the second heating and dehumidifying operation, and the defrost operation, based on indoor and outdoor environmental conditions, such as temperature.

In each operation switched by the operation switching control process, the controller 40 switches among the foot mode, the vent mode and the bi-level mode according to the target air-blowing temperature TAO. To be more specific, when the target air-blowing temperature TAO is high, for example, 40 degrees centigrade, the controller 40 sets the foot mode. Meanwhile, when the target air-blowing temperature TAO is low, for example, lower than 25 degrees centigrade, the controller sets the vent mode. Moreover, when the target air-blowing temperature TAO is the temperature between the temperature for the foot mode and the temperature for the vent mode, the controller 40 sets the bi-level mode.

The controller 40 switches the mode of the outlets 11c, 11d and 11e by using the outlet switching dampers 13b, 13c and 13d, and controls the opening degree of the air mix damper 16 in order to set the temperature of the air blowing out of the outlets 11c, 11d, and 11e to the target air-blowing temperature TAO.

In addition, during the heating operation or the heating and dehumidifying operation, the controller 40 performs a water temperature control process to control the temperature of the water flowing through the water circuit 30 to be the temperature that realizes the quantity of heating for the target air-blowing temperature TAO. The operation of the controller 40 for this process will be explained with reference to the flowchart shown in FIG. 17.

(Step S31)

In step S31, the CPU calculates the target air-blowing temperature TAO and moves the step to step S32. The target air-blowing temperature TAO is calculated based on the preset temperature Tset, and environmental conditions such as the outdoor air temperature Tam, the indoor air temperature Tr, and an amount of insolation Ts. The environmental conditions are detected by the outdoor air temperature sensor 41, the indoor air temperature sensor 42, the insolation sensor 44 and so forth.

(Step S32)

In step S32, the CPU calculate target water temperature TG_TW, which is the temperature of the water to be flowed into the radiator 15 to realize the quantity of heating to make the temperature of the air blowing from the outlets 11c, 11d and 11e the target air-blowing temperature TAO, and moves the step to step S33. The target water temperature TG_TW is calculated based on the target air-blowing temperature TAO calculated in the step S31, the temperature Te of the air having been cooled in the heat exchanger 14 (in case of the heating operation, the temperature Ti of the air flowing into the air flow passage 11), and temperature efficiency ratio $\Phi w$ of the air to the water (TG_TW=(TAO−Te)/$\Phi$w+Te).

(Step S33)

In step S33, the CPU calculates temperature Tco of the refrigerant having released the heat in the water-refrigerant heat exchanger 22, and moves the step to step S34. The temperature Tco is calculated based on pressure Pd of the refrigerant circuit 20 in the high-pressure side, heat efficiency $\Phi k$ of the water to the refrigerant in the water-refrigerant heat exchanger 22 (Tco=FuncTco(Pd,$\Phi$k), where FuncTco is a function to calculate the temperature Tco).

(Step S34)

In step S34, the CPU calculates estimated water temperature TWhp of the water in the water circuit 30 having heated by the water-refrigerant heat exchanger 22, and moves the step to step S35. The estimated water temperature TWhp is calculated based on the temperature Tco of the refrigerant having released the heat in the water-refrigerant heat exchanger 22, the temperature efficiency allowing for the flow rate $G_w$ of the water flowing through the water circuit 30 (TWhp=GSw(Tco×$\Phi$(Gw)), where GSw is a function to calculate the estimated water temperature Whp, allowing for the response lag of the temperature of the water flowing through the water circuit).

(Step S35)

In step S35, the CPU calculates estimated pressure Ps of the compressor 21 in the inlet side, and moves the step to step S36. The estimated pressure Ps of the compressor 21 in the inlet side is calculated based on the outdoor air temperature Tam, the number of rotations Nc of the compressor 21 and the pressure Pd of the refrigerant circuit 20 in the high-pressure side (Ps=FuncPs (Tam, Nc, Pd), where FuncPs is a function to calculate the estimated pressure Ps.

(Step S36)

In the step S36, the CPU performs a quantity-of-heating control process to control the quantity of heating of the water flowing through the water circuit 30, based on the estimated water temperature TWhp acquired in the step S4 and the estimated pressure Ps acquired in the step S35, and ends the water temperature control process. This quantity-of-heating control process will be explained later with reference to FIG. 18.

Now, the quantity-of-heating control process will be explained with reference to FIG. 18.

(Step S41)

In step S41, the CPU determines whether or not the estimated pressure Ps of the compressor 21 in the inlet side is predetermined pressure P1 or higher. When determining that the estimated pressure Ps is the predetermined pressure P1 or higher, the CPU moves the step to step S45. On the other hand, when determining that the estimated pressure Ps is lower than the predetermined pressure P1, the CPU moves the step to step S42. Here, the predetermined pressure P1 is set to, for example, 1013.25 hPa as the standard pressure in order to prevent the compressor 21 from being damaged.

(Step S42)

When the estimated pressure Ps is lower than the predetermined pressure P1 in the step S41, the CPU, in the step S42, controls the number of rotations Nc of the compressor 21 to make the estimated pressure Ps at least the predetermined pressure P1 or higher, and moves the step to step S43.

(step S43)

In the step S43, the CPU determines whether the number of rotations of the compressor 21 is predetermined number of rotations N1 or lower. When determining that the number of rotations Nc is the predetermined number of rotations N1 or lower, the CPU moves the step to step S44. On the other hand, when determining that the number of rotations Nc is higher than the predetermined number of rotations N1, the CPU moves the step to step S45.

(Step S44)

When determining that the number of rotations Nc is the predetermined number of rotations N1 or lower in the step S43, the CPU, in the step 44, stops the compressor 21 from driving, and moves the step to step the S45.

(Step S45)

When determining that the estimated pressure Ps is the predetermined pressure P1 or higher in the step S41, when determining that the number of rotations Nc is higher than the predetermined number of rotations N1 in the step S43, or when the compressor 21 is stopped from driving in the step S44, the CPU performs a water heater control process to control the operation of the water heater 32, and ends the quantity-of-heating control process. This water heater control process will be explained with reference to FIG. 19.

Now, the water heater control process will be explained.

(Step S51)

In step S51, the CPU determines whether or not numerical value (TG_TW−TWhp) obtained by subtracting the estimated water temperature TWhp from the target water temperature TG_TW is predetermined value T1 or higher. When the numerical value (TG_TW−TWhp) is the predetermined value T1 or higher, the CPU moves the step to step S52. On the other hand, when the numerical value (TG_TW−TWhp) is lower than the predetermined value T1, the CPU moves the step to step S55.

(Step S52)

When the numerical value (TG_TW−TWhp) is the predetermined value T1 or higher in the step S51, the CPU, in the step S52, calculates target quantity-of-heat generation TG_Qhtr that the water heater 32 should apply to the water in the water circuit 30, and moves the step to step S53. The target quantity-of-heat generation TG_Qhtr is an output value of the proportional control, which is calculated based on the target water temperature TG_TW, the estimated water temperature TWhp, the specific heat Cpw of the water, the water density ρw, and the flow rate Gw of the water flowing through the water heater 32. The flow rate Gw of the water can be estimated based on the current value to drive the pump 31.

(Step S53)

In the step S53, the CPU calculates the target power TG_Whtr that corresponds to the target quality-of heat generation TG_Qhtr in the water heater 32, and moves the step to the step S54. The target power TG_Whtr is calculated based on the target quantity-of-heat generation TG_Qhtr calculated in the step S52 and heat generation efficiency EFF_htr of the water heater 32 (TG_Whtr=TG_Qhtr×(1/EFF_htr)).

(Step S54)

In the step S54, the CPU operates the water heater 32 at the target power TG_Whtr calculated in the step S53, and ends the water heater control process.

(Step S55)

When the numerical value (TG_TW−TWhp) is lower than the predetermined value T1 in the step S51, the CPU stops the water heater 32 in step S5, and ends the water heater control process.

In addition, during the first heating and dehumidifying operation and during the second heating and dehumidifying operation, the controller 40 performs an operation switching control process to switch the operation to the cooling and dehumidifying when the air conditioning apparatus lacks in dehumidifying capability. This operation switching control process will be explained with reference to FIG. 20.

(Step S61)

In step S61, the CPU determines whether the operation is the first heating and dehumidifying operation or the second heating and dehumidifying. When determining that the operation is one of the first heating and dehumidifying operation and the second heating and dehumidifying operation, the CPU moves the step to step S62. On the other hand, when determining that the operation is neither the first heating and dehumidifying operation nor the second heating and dehumidifying operation, the CPU moves the operation to step S66.

When the operation is one of the first heating and dehumidifying operation and the second heating and dehumidifying operation In the step S61, the CPU, in the step S62, calculates the required quantity of dehumidification based on the indoor air temperature Tr and the outdoor humidity Rh, and moves the step to step S63.

(Step S63)

In the step S63, the CPU calculates the dehumidifying capability in the first heating and dehumidifying operation and the second heating and dehumidifying operation, and moves the step to step S64.

(Step S64)

In the step S64, the CPU determines whether or not the dehumidifying capability calculated in the step S63 is the required quantity of dehumidification calculated in the step S62 or higher. When determining that the dehumidifying capability is the required quantity of dehumidification or higher, the CPU moves the step to step S66. On the other hand, when determining that the dehumidifying capability is lower than the required quantity of dehumidification, the CPU moves the step to step S65.

(Step S65)

When determining that the dehumidifying capability is not the required quantity of dehumidification or higher in the step S64, the CPU, in the step S65, switches one of the first heating and dehumidifying operation and the second heating and dehumidifying operation to the cooling and dehumidifying operation, and moves the step to step S66.

(Step S66)

Figure 18:
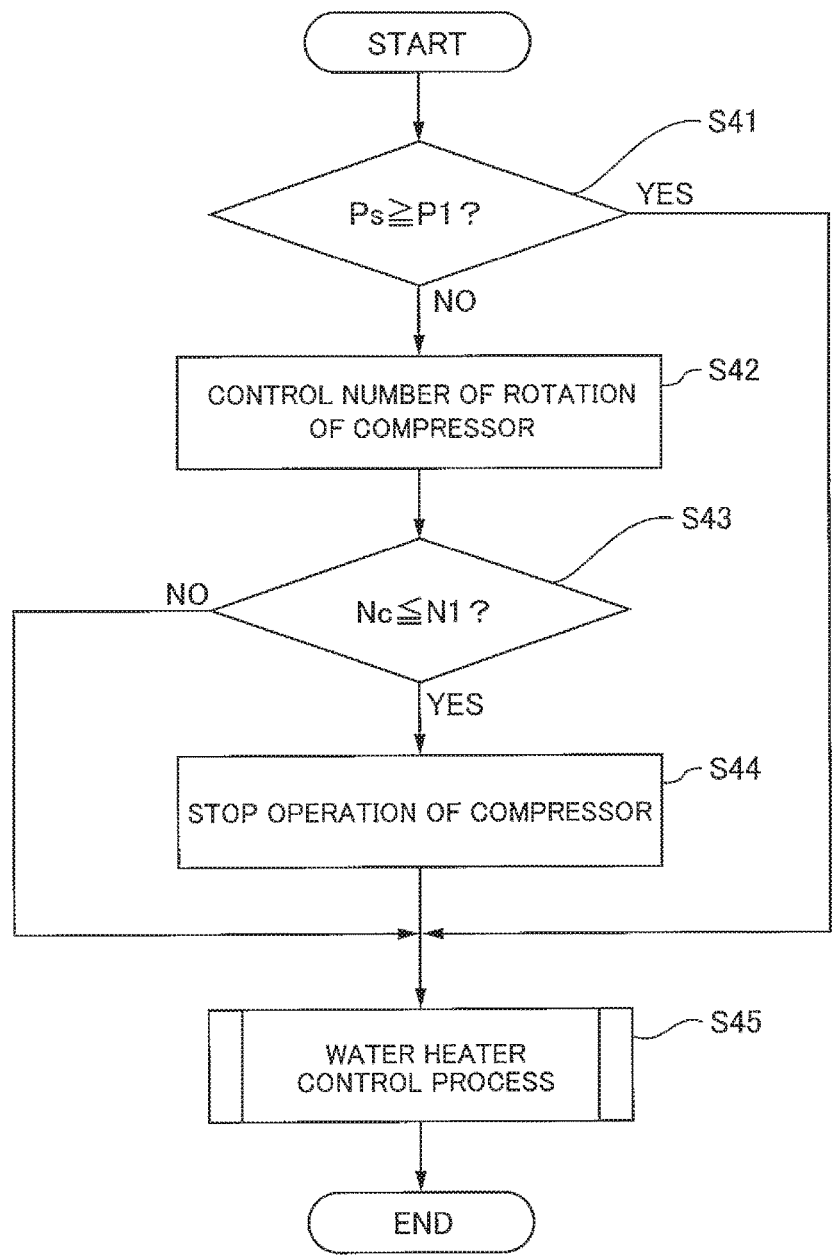
FIG. 18 is a flowchart showing a process to control quantity of heating.
Figure 19:
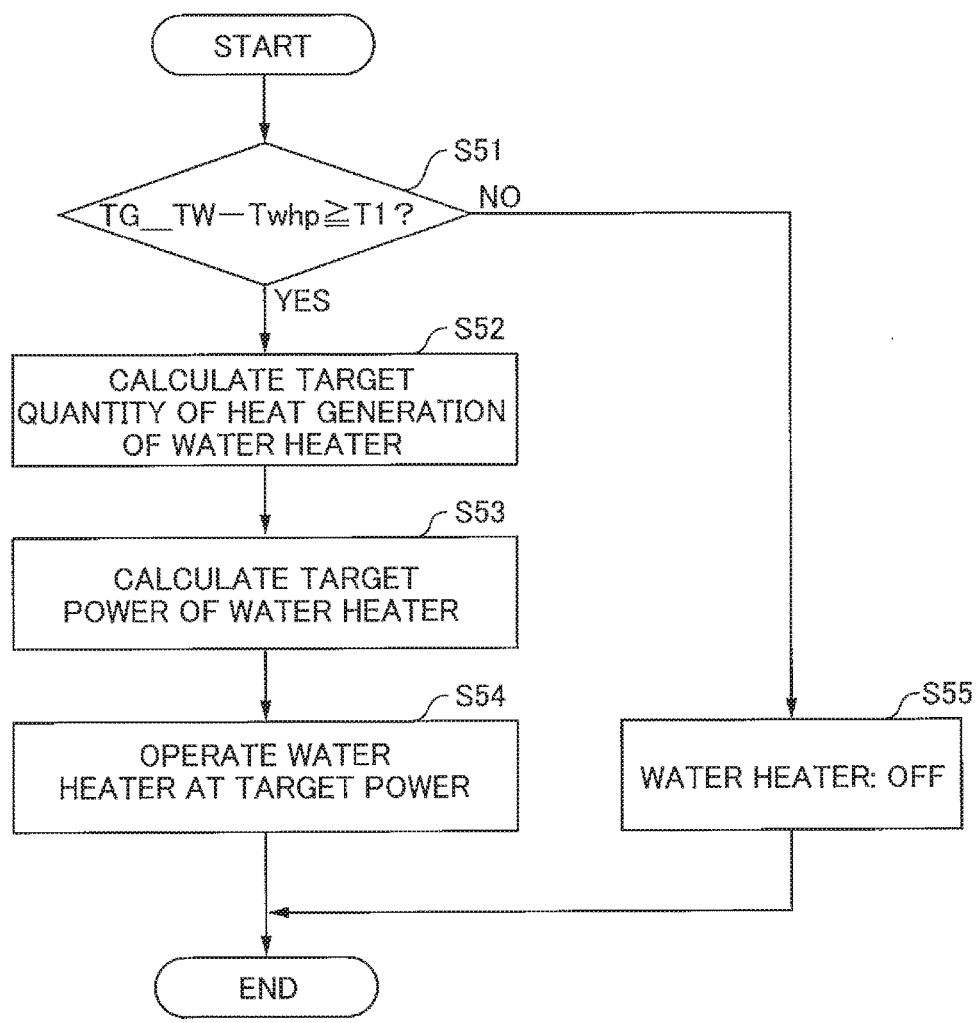
FIG. 19 is a flowchart showing a process to control a water heater.
Figure 20:
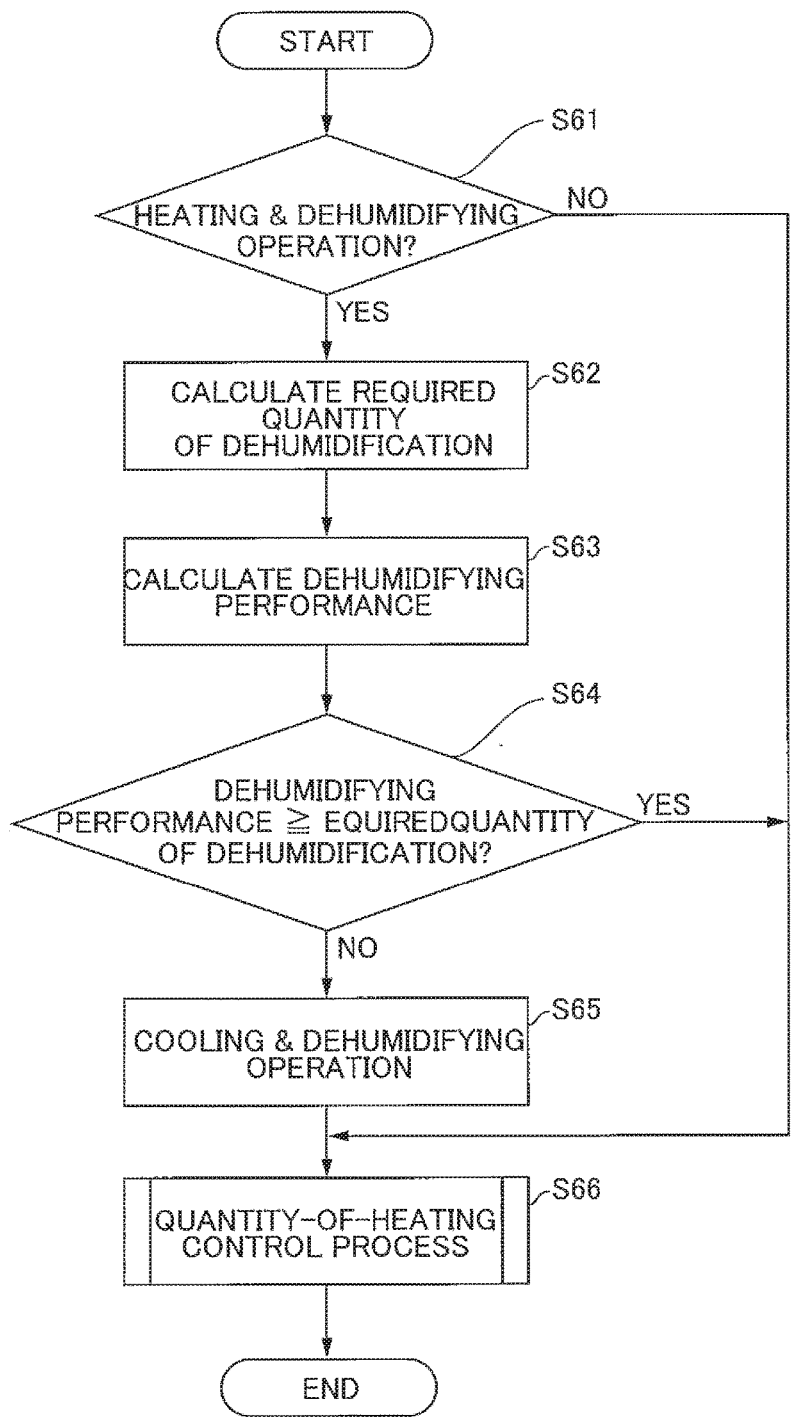
FIG. 20 is a flowchart showing a process to control operation switching.
Figure 21:
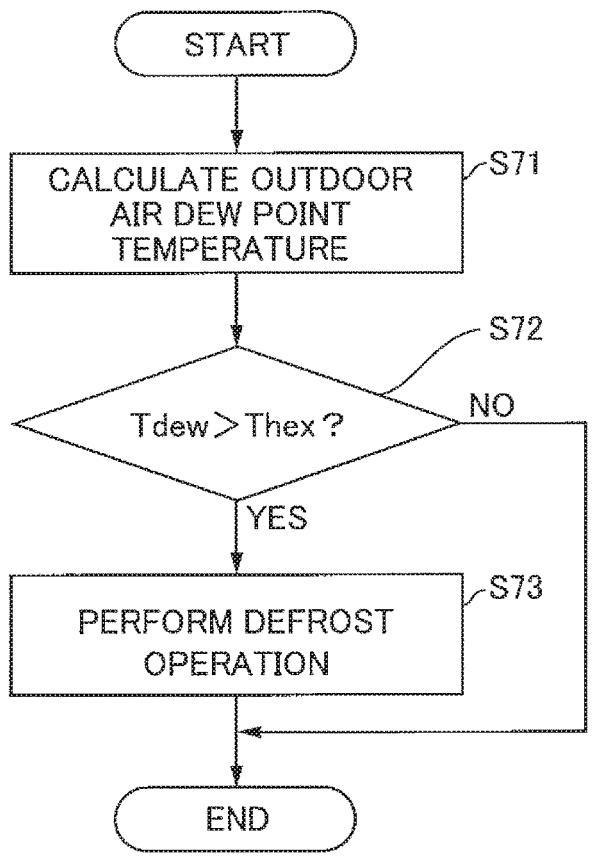
FIG. 21 is a flowchart showing a process to control the defrost operation.
Figure 22:
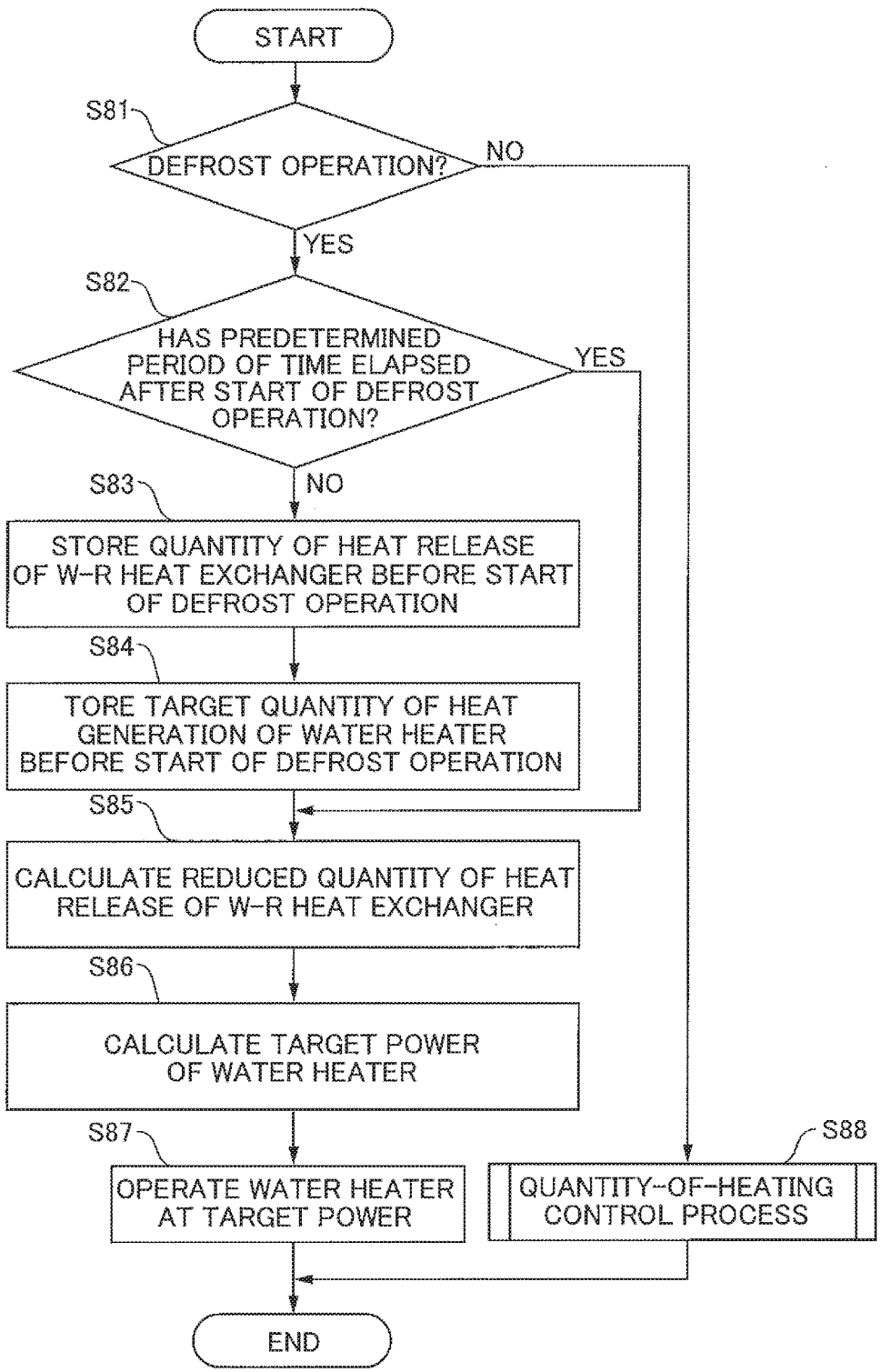
FIG. 22 is a flowchart showing a process to control compensation for quantity of heating.

When determining that the operation is neither the first heating and dehumidifying operation nor the second heating and dehumidifying operation in the step S61, or when the operation is switched to the cooling and dehumidifying operation in the step S65, the CPU, in the step S66, performs the above-described quantity-of-heating control process shown in FIG. 18, and ends the operation switching control process.

In addition, the controller 40 determines whether or not a frost is formed on the outdoor heat exchanger 23, and performs a defrost operation control process when a frost is formed on the outdoor heat exchanger 23. Now, the defrost operation control process will be explained with reference to FIG. 21.

(Step S71)

In step S71, the CPU calculates outdoor air dew point temperature Tdew based on the outdoor air temperature Tam detected by the outdoor air temperature sensor 41 and outdoor humidity Rham detected by the outdoor humidity sensor 53.

(Step S72)

In step S72, the CPU determines whether or not the temperature Thex of the refrigerant flowing out of the outdoor heat exchanger 23, which is detected by the refrigerant temperature sensor 47, is lower than the outdoor air dew point temperature Tdew. When determining that the temperature Thex of the refrigerant is lower than the outdoor air dew point temperature Tdew, the CPU moves the step to step S73. On the other hand, when determining that the temperature Thex of the refrigerant is not lower than the outdoor air dew point temperature Tdew, the CPU ends the defrost operation control process.

(Step S73)

In the step S73, when determining that the outdoor air dew point temperature Tdew is lower than the temperature Thex of the refrigerant, the CPU performs the above-described defrost operation for a predetermined period of time, and ends the defrost operation control process.

Next, when the heat exchanger 15 does not release sufficient heat in the defrost operation, the CPU performs a heat release compensation control process to compensate for a lack in the quantity of heat release. Now, the heat release compensation control process will be explained with reference to FIG. 22.

(Step S81)

In step S81, the CPU determines whether or not the operation is the defrost operation. When determining that the operation is the defrost operation, the CPU moves the step to step S82. On the other hand, when determining that the operation is not the defrost operation, the CPU moves the step to step S88.

(Step S82)

When determining that the operation is the defrost operation in the step S81, the CPU determines whether or not the elapsed period of time after the operation is switched to the defrost operation falls within a predetermined period of time in the step S82. When determining that the elapsed period of time after the operation is switched to the defrost operation falls within the predetermined period of time, the CPU moves the step to step S85.

(Step S83)

When determining that the elapsed period of time after the operation is switched to the defrost operation falls within the present period of time in the step S82, the CPU, in the step S83, stores the quantity of heat release Qhp_htrof the water-refrigerant heat exchanger 22 just before the operation is switched to the defrost operation on the RAM, and moves the step to step S84 (the quantity of heat release stored in the RAM is represented as "Qhp_htr_mem").

(Step S84)

In the step S84, the CPU stores the target quantity-of-heat generation TG_Qhtr of the water heater 32 just before the operation is switched to the defrost operation on the RAM, and moves the operation to step S85 (the quantity of heat release stored in the RAM is represented as "TG_Qhtr_mem").

(Step S85)

When determining that the elapsed period of time after the operation is switched to the defrost operation does not fall within the predetermined period of time in the step S82, or when determining that the target quantity-of-heat generation TG_Qhtr of the water heater 32 is stored on the RAM in the step S84, the CPU, in the step S85, calculates decreased quantity of heat release Qhp_dec of the water-refrigerant heat exchanger 22, and moves the step to step S86. The decreased quantity of heat release Qhp_dec is calculated by subtracting the current quantity of heat release Qhp_htr of the water-refrigerant heat exchanger 22 from the quantity of heat release Qhp_htr_memof the water-refrigerant heat exchanger 22 just before the operation is switched to the defrost operation, which is stored in the step S83 (Qhp dec=Qhp htr mem-Qhp htr).

(Step S86)

In step S86, the CPU calculates the target power TG_Whtr of the water heater 32, and moves the step to step S87. The target power TG_Whtr is calculated based on the quantity of heat release Qhp_htr_mem stored on the RAM in the step S83, the decreased quantity of heat release Qhp_dec calculated in the step S85, and the heat generation efficiency EFF_htrof the water heater 32 (TG Whtr=(Qhtr mem-Qhp dec)x(1/EFF htr)).

(Step S87)

In step S87, the CPU operates the water heater 32 at the target power TG_Whtr calculated in the step S86, and ends the quantity of heat release compensation control process.

(Step S88)

When determining that the operation is not the defrost operation in the step S81, the CPU performs the quantity-of-heating control process shown in FIG. 18 in step S88, and ends the quantity-of-heating compensation control process.

As described above, the vehicle air conditioning apparatus according to the present embodiment estimates the temperature of the water flowing through the water circuit 30, which has been heated in the water-refrigerant heat exchanger 22; calculates the insufficient quantity of heat during the heating operation or during the heating and dehumidifying operation, based on the estimated water temperature TWhp of the water flowing through the water circuit 30; and controls the water heater 32 based on the calculated insufficient quantity of heat TG_Qhtr. By this means, only the insufficient quantity of heat release in the water-refrigerant heat exchanger 22 is compensated by operating the water heater 32. Therefore, it is possible to minimize the operation of the water heater 32, and consequently reduce the power consumption for driving the vehicle. As a result, it is possible to prevent the mileage of the vehicle from dropping.

In addition, the operation of the compressor 21 is controlled such that the estimated pressure Ps of the compressor 21 in the inlet side is at least the predetermined pressure P1 or higher. By this means, it is possible to prevent the pressure of the compressor 21 in the inlet side from being lower than the predetermined pressure P1. Therefore, it is possible to prevent the compressor 21 from failing.

In addition, when the number of rotations Nc of the compressor 21 is the predetermined number of rotations N1, the operation of the compressor 21 is stopped. By this means, it is possible to prevent the inefficient operation due to a decrease in the number of rotations Nc of the compressor 21.

In addition, the target water temperature TG_TW flowing through the water circuit 30; The operation of the water heater 32 is resumed when the difference between the calculated target temperature TG_TW and the estimated water temperature TWhp of the water flowing through the water circuit 30 is the predetermined value T1 or higher; and the operation of the water heater 32 is stopped when the difference between the calculated target temperature TG_TW and the estimated water temperature TWhp of the water flowing through the water circuit 30 is lower than the predetermined value T1. By this means, when the water flowing through the water circuit 30 has a predetermined quantity of heat, the operation of the water heater 32 is stopped. Therefore, it is possible to prevent the unnecessary operation of the water heater 32.

Moreover, the required quantity of dehumidification based on the temperature and the humidity of the vehicle interior; the possible quantity of dehumidification that can be realized during the heating and dehumidifying operation; when the calculated possible quantity of dehumidification is lower than the required quantity of dehumidification, the operation is switched from the heating and dehumidifying operation to the cooling and dehumidifying operation; although the quantity of heat released from the water-refrigerant heat exchanger becomes insufficient due to the operation is switched from the heating and dehumidifying operation to the cooling and dehumidifying operation, the insufficient quantity of heat is compensated by the water heater 32. By this means, even if the required quantity of dehumidification is beyond the dehumidifying capability of the heating and dehumidifying operation, it is possible to secure the required quantity of dehumidification and also to keep the temperature Tr of the vehicle interior at the indoor air temperature Tset. Therefore, it is possible to maintain the environment of the vehicle interior in a good condition.

Moreover, during the defrost operation, the water heater 32 is operated to heat the water flowing through the water circuit 30, and therefore to continue to heat the vehicle interior. By this means, it is possible to keep the temperature Tr in the vehicle interior at the temperature Tset during the defrost operation, and therefore to maintain the environment of the vehicle interior in a good condition.

When the temperature Thex of the refrigerant flowing out of the outdoor heat exchanger 23, which has been detected by the refrigerant temperature sensor 47 is lower than the outdoor air dew point temperature Tdew, the defrost operation is performed. By this means, it is possible to reliably perform the defrost operation when a condition in which a frost is formed on the outdoor heat exchanger 23 occurs, and therefore to prevent the outdoor heat exchanger 23 from frosting.

Figure 23:
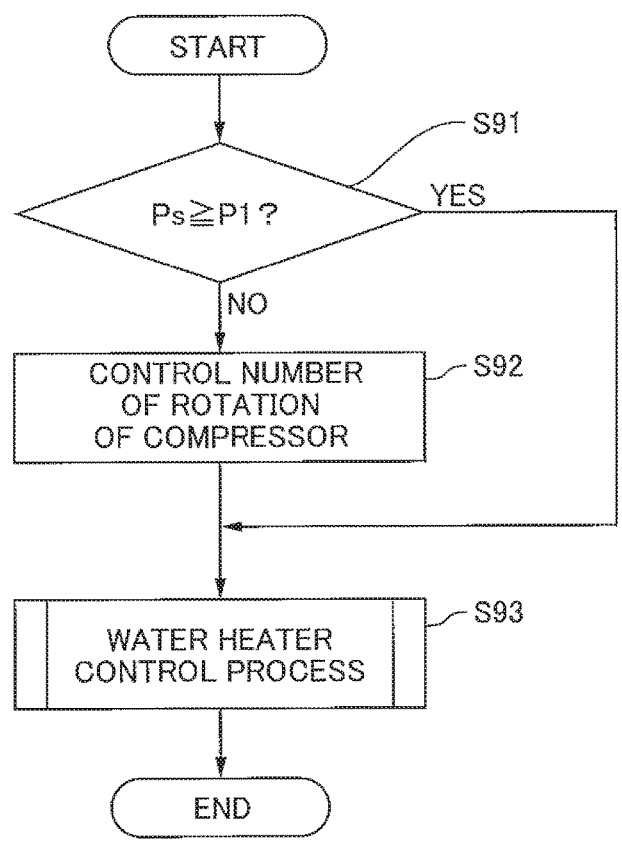
FIG. 23 is a flowchart showing a process to control quantity of heating according to Embodiment 4 of the present invention.

FIG. 23 shows Embodiment 4 of the present invention. Here, the same components are assigned the same reference numerals as in Embodiment 3.

In the vehicle air conditioning apparatus according to the present embodiment, the controller 40 performs the quantity-of-heating control process shown by the flowchart in FIG. 23 with the same configuration as in Embodiment 3.

(Step S91)
In step S91, the CPU determines whether or not the estimated pressure Ps of the compressor 21 in the inlet side is predetermined pressure P1 or higher. When determining that the estimated pressure Ps is the predetermined pressure P1 or higher, the CPU moves the step to step S93. On the other hand, when determining that the estimated pressure Ps is lower than the predetermined pressure P1, the CPU moves the step to step S92. Here, like the above-described embodiment, the predetermined pressure P1 is set to, for example, 1013.25 hPa as the standard pressure in order to prevent the compressor 21 from being damaged.

(Step S92)
When determining that the estimated pressure Ps is lower than the predetermined pressure P1 in the step S91, the CPU, in step S92, controls the number of rotations Nc of the compressor 21 such that the estimated pressure Ps is not lower than predetermined pressure P2 (P2<P1) in the step S92, and moves the step to step S93.

(Step S93)
When determining that the estimated pressure Ps is the predetermined pressure P1 or higher in the step S91, or when controlling the number of rotations Nc of the compressor 21 in the step S92, the CPU performs the water heater control process in the same way as in the quantity-of-heating control process in Embodiment 3, and ends the quantity-of-heating control process.

As described above, with the vehicle air conditioning apparatus according to the present embodiment, the operation of the compressor 21 is controlled such that the estimated pressure Ps of the compressor 21 in the inlet side is at least the predetermined pressure P1 or higher. By this means, it is possible to prevent the estimated pressure Ps of the compressor 21 in the inlet side from being lower than the predetermined pressure P1, and therefore to prevent the compressor 21 from failing, like Embodiment 3.

Figure 24:
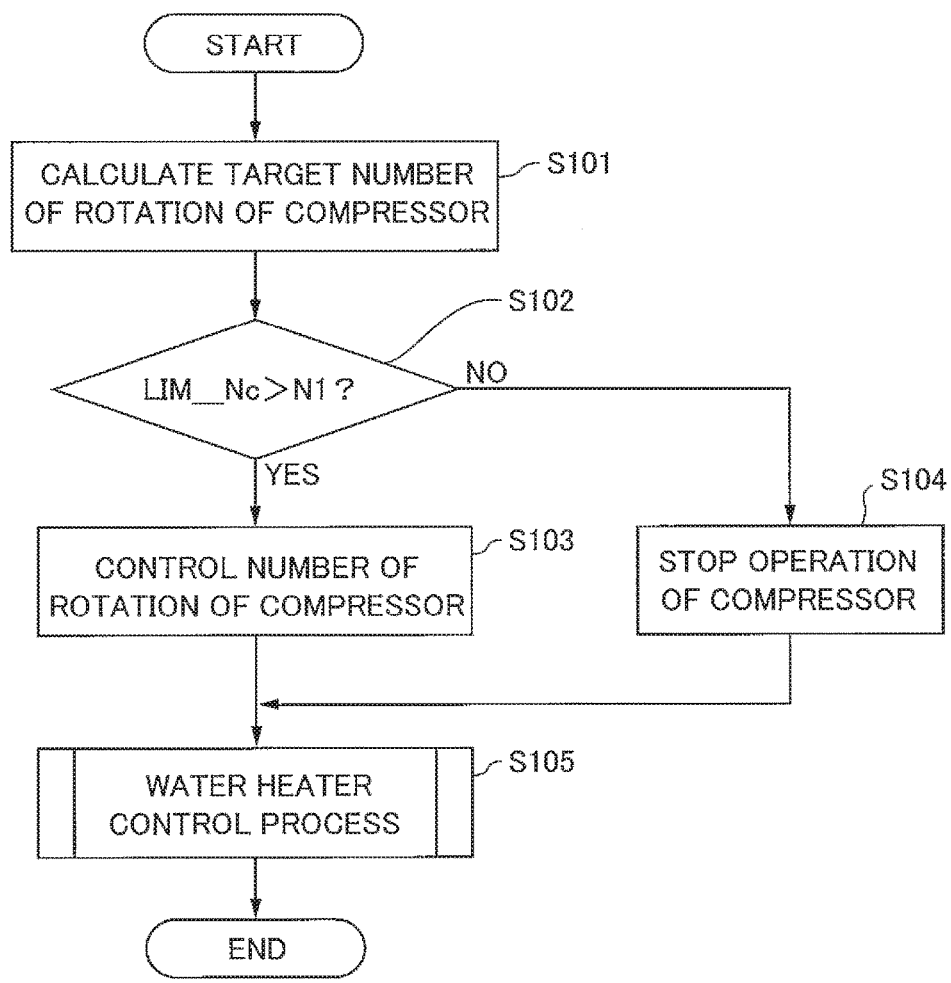
FIG. 24 is a flowchart showing a process to control quantity of heating according to Embodiment 5 of the present invention.

FIG. 24 shows Embodiment 5 of the present invention. Here, the same components are assigned the same reference numerals as in Embodiment 4.

In the vehicle air conditioning apparatus according to the present embodiment, the controller 40 performs the quantity-of-heating control process shown by the flowchart in FIG. 24 with the same configuration as in Embodiment 3.

(Step S101)
In step S101, the CPU calculates number of rotations LIM_NC of the compressor 21 such that the estimated pressure Ps of the compressor 21 in the inlet side is the predetermined pressure P2, based on the outdoor air temperature Tam, and moves the step to step S102.

(Step S102)
In the step S102, the CPU determines whether or not the number of rotations LIM_Nc of the compressor 21 is higher than the predetermined number of rotations N2N1. When the number of rotations LIM_Nc is higher than the predetermined number of rotations N1, the CPU moves the step to step S103. On the other hand, when the number of rotations LIM_Nc is the predetermined number of rotations N1 or lower, the CPU moves the step to step S104.

(Step S103)
When determining that the number of rotations LIM_Nc is higher than the predetermined number of rotations N1 in the step S102, the CPU, in the step S103, controls the number of rotations of the compressor 21 to be the number of rotations LIM_Nc, and moves the step to step S105.

(Step S104)
When determining that the number of rotations LIM_Nc is the predetermined number of rotations N1 or lower in the step S102, the CPU, in step 104, stops the operation of the compressor 21 and moves the step to step S105.

(Step S105)
When controlling the number of rotations of the compressor 21 in the step S103, or when stopping the operation of the compressor 21 in the step S104, the CPU performs the water heater control process in the same way as in the quantity-of-heating control process in Embodiment 3, and ends the quantity-of-heating control process.

As described above, with the vehicle air conditioning apparatus according to the present embodiment, the number of rotations LIM_Nc of the compressor 21 is calculated such that the estimated pressure Ps of the compressor 21 in the inlet side is the predetermined pressure P2, and the operation of the compressor 21 is controlled such that the compressor 21 is operated at the calculated number of rotations LIM_Nc. By this means, it is possible to prevent the compressor 21 from failing because of a decrease in pressure of the compressor 21 in the inlet side.

In addition, when the calculated number of rotations LIM_Nc is the predetermined number of rotations N1 or lower, the operation of the compressor 21 is stopped. By this means, it is possible to prevent the inefficient operation due to a decrease in the number of rotations Nc of the compressor 21.

Figure 25:
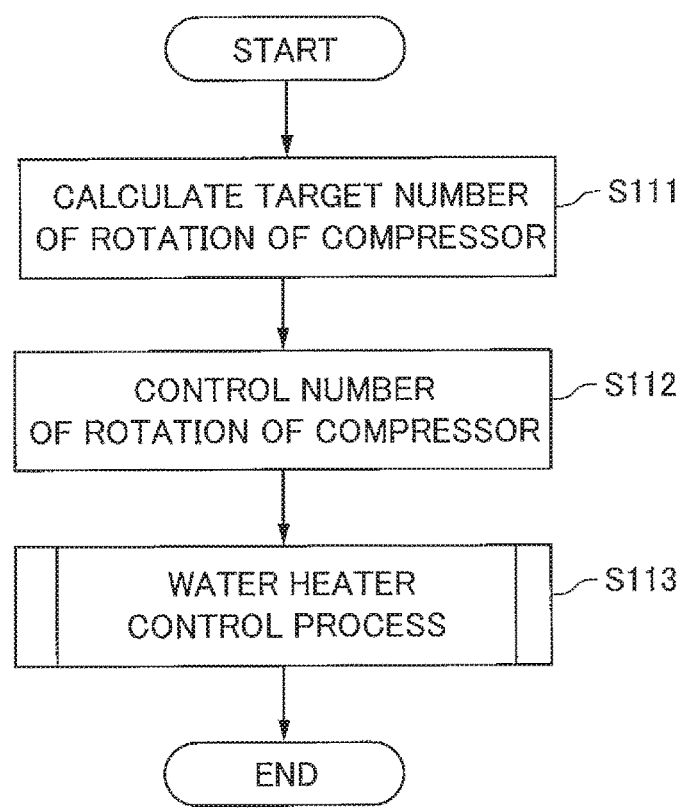
FIG. 25 is a flowchart showing a process to control quantity of heating according to Embodiment 6 of the present invention.

FIG. 25 shows Embodiment 6 of the present invention. Here, the same components are assigned the same reference numerals as in Embodiment 5.

In the vehicle air conditioning apparatus according to the present embodiment, the controller 40 performs the quantity-of-heating control process shown by the flowchart in FIG. 25 with the same configuration as in Embodiment 3.

(Step S111)

In step S111, the CPU calculates number of rotations LIM_Nc of the compressor 21 such that the estimated pressure Ps of the compressor 21 in the inlet side is the predetermined pressure P2, based on the outdoor air temperature Tam, and moves the step to step S112.

(Step S112)

In step S112, the CPU controls the number of rotations of the compressor 21 to be the number of rotations LIM_Nc, and moves the step to step S113.

(Step S113)

In step S113, the CPU performs the water heater control process in the same way as in the quantity-of-heating control process according to Embodiment 3, and ends the quantity-of-heating control process.

As described above, with the vehicle air conditioning apparatus according to the present embodiment, the number of rotations LIM_Nc of the compressor 21 is calculated such that the estimated pressure Ps of the compressor 21 in the inlet side is the predetermined pressure P2, and the operation of the compressor 21 is controlled such that the compressor 21 is operated at the calculated number of rotations LIM_Nc. By this means, it is possible to prevent the compressor 21 from failing due to a decrease in pressure of the compressor 21 in the inlet side, like Embodiment 3.

Figure 26:
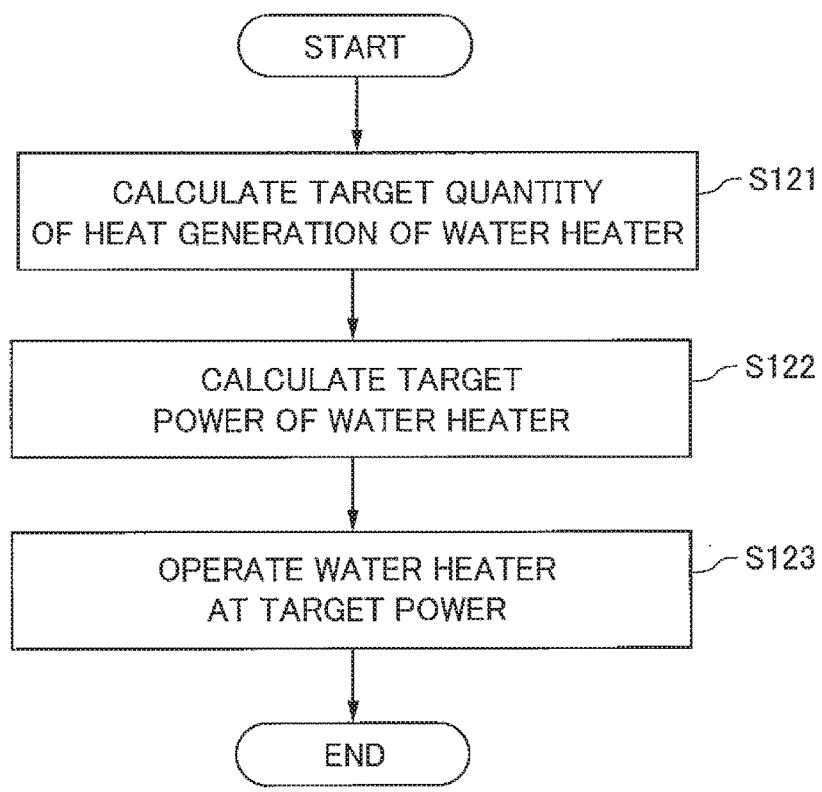
FIG. 26 is a flowchart showing a process to control the water heater according to Embodiment 7 of the present invention.

FIG. 26 shows Embodiment 7 of the present invention. Here, the same components are assigned the same reference numerals as in Embodiment 6.

In the vehicle air conditioning apparatus according to the present embodiment, the controller 40 performs the water heater control process shown by the flowchart in FIG. 26 with the same configuration as in Embodiment 3.

(Step S121)

In step S121, the CPU calculates the target quantity-of-heat generation TG_Qhtr that the water heater 32 should apply to the water in the water circuit 30, and moves the step to step S122. The target quantity-of-heat generation TG_Qhtr is an output value of proportional-plus-integral control, which is calculated based on the target water temperature TG_TW, the estimated water temperature TWhp, the specific heat Cpw of the water, the water density ρw, and the flow rate Gw of the water flowing through the water heater 32 (TG_Qhtr=(P_GAIN×(TG_TW−TWhp)+I_GAIN×(TG_TW−TWhp)+I_Qhtrz)×Cpw×ρw×Gw, where P_GAIN is a constant value as proportional gain; I_GAIN is a constant value as integral gain; and I_Qhtrz is the previous value of I_Qhtr, I_Qhtr=I_GAIN×(TG_TW−TWhp)+I_Qhtrz).

(Step S122)

In step S122, the CPU calculates the target heat power TG_Qhtr that corresponds to the target quantity-of-heat generation TG_Qhtr of the water heater 32, and moves the step to step S123. The target power TG_Whtr is calculated based on the target quantity-of-heat generation TG_Qhtr calculated in the step S121 and the heat generation efficiency EFF_htr of the water heater 32 (TG_Whtr=TG_Qhtr×(1/EFF_htr)).

(Step S123)

In step S123, the CPU operates the water heater 32 at the target power TG_Whtr calculated in the step S122, and ends the water heater control process.

As described above, with the vehicle air conditioning apparatus according to the present embodiment, it is possible to calculate the target quantity-of-heat generation TG_Qhtr of the water heater 32 in the same way as in Embodiment 3.

Figure 27:
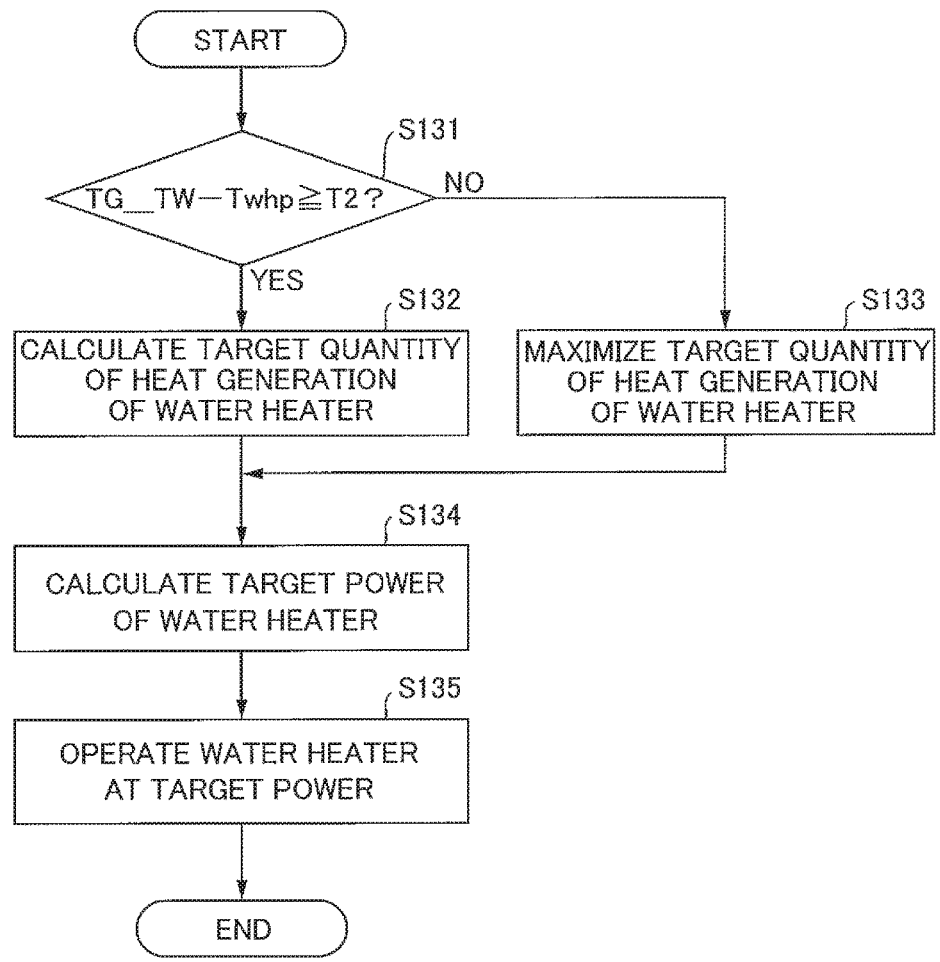
FIG. 27 is a flowchart showing a process to control the water heater according to Embodiment 8 of the present invention.

FIG. 27 shows Embodiment 8 of the present invention. Here, the same components are assigned the same reference numerals as in Embodiment 7.

In the vehicle air conditioning apparatus according to the present embodiment, the controller 40 performs the water heater control process shown by the flowchart in FIG. 27 with the same configuration as in Embodiment 3.

(Step S131)

In step S131, the CPU determines whether or not the numerical value (TG_TW−TWhp) obtained by subtracting the estimated water temperature TWhp from the target water temperature TG_TW is lower than the predetermined value T2. When the numerical value (TG_TW−TWhp) is lower than the predetermined value T2, the CPU moves the step to step S132. On the other hand, when the numerical value (TG_TW−TWhp) is the predetermined value T2 or higher, the CPU moves the step to step S133.

(Step S132)

When determining that the numerical value (TG_TW−TWhp) is lower than the predetermined value T2 in the step S131, the CPU, in the step S132, calculates the target quantity-of-heat generation TG_Qhtr that the water heater 32 should apply to the water in the water circuit 30, and moves the step to step S134. The target quantity-of-heat generation TG_Qhtr is an output value of proportional-plus-integral control, which is calculated based on the target water temperature TG_TW, the estimated water temperature TWhp, the specific heat Cpw of the water, the water density ρw, and the flow rate $G_w$ of the water flowing through the water heater 32 (TG_Qhtr=(PGAIN×(TG_TW−TWhp)+I_GAIN×(TG_TW−TWhp)+I_Qhtrz)×Cpw×ρw×Gw, where P_GAIN is a constant value as proportional gain; I_GAIN is a constant value as integral gain; and I_Qhtrz is the previous value of I_Qhtr, I_Qhtr=I_GAIN×(TG_TW−TWhp)+I_Qhtrz).

(Step S133)

When determining the numerical value (TG_TW−TWhp) is the predetermined value T2 or higher in the step S131, the CPU sets the target quantity-of-heat generation TG_Qhtr to maximum quantity of heating Q_max in the step S133.

(Step S134)

When calculating the target quantity-of-heat generation TG_Qhtr in the step S132, or when determining the target quantity-of-heat generation TG_Qhtr in the step S133, the CPU, in step S134, calculates the target power TG_Whtr that corresponds to the target quantity-of-heat generation TG_Qhtr of the water heater 32, and moves the step to step S135. The target power TG_Whtr is calculated based on the target quantity-of-heat generation calculated in the step S132 and the heat generation efficiency EFF_htr of the water heater 32 (TG_Whtr=TG_Qhtr×(1/EFF_htr)).

(Step S135)

In step S135, the CPU operates the water heater 32 at the target power TG_Whtr calculated in the step S134, and ends the water heater control process.

As described above, with the vehicle air conditioning apparatus according to the present embodiment, when the numerical value (TG_TW−TWhp) obtained by subtracting the estimated water temperature TWhp from the target water temperature TG_TW is the predetermined value T2 or higher water, the target quantity-of-heat generation TG_Qhtr is set to the maximum quantity of heating Q_max to operate the water heater 32. By this means, it is possible to operate the water heater 32 at the maximum output just after the heating operation or the heating and dehumidifying operation is stated. Therefore, it is possible to rapidly heat the vehicle interior to a comfortable temperature.

Here, with the present embodiment, a configuration has been described where the heat released from the water-refrigerant circuit 20 is absorbed in the water flowing through the water circuit 30 via the water-refrigerant heat exchanger 22. However, heat medium subjected to a heat exchange with refrigerant is not limited to water, but any heat medium is applicable, which enables heat transfer, such as antifreeze solution containing ethyleneglycol and so forth.

In addition, with the present embodiment, a configuration has been described where the compressor 21 is driven by the electric motor 21a. However, it is by no means limiting. A compressor 21 may be driven by the power of an engine.

Moreover, the vehicle air conditioning apparatus is applicable not only to an electric car or a hybrid car, but applicable to other vehicles as long as the vehicle air conditioning apparatus can compensate for an insufficient quantity of heating for the heating or the heating and dehumidifying operation by electric power.

In addition, with the present embodiment, a configuration has been described where the three-way valve 25 is used to switch between the refrigerant flow passages 20c and 20d in the refrigerant circuit 20. It is by no means limiting. Two solenoid valves are applicable instead of the three-way valve, and therefore it is possible to switch between the refrigerant flow passages 20c and 20d by opening and closing these solenoid valves.

Moreover, with the present embodiment, as the temperature of the water having been heated in the water-refrigerant heat exchanger 22, the estimated water temperature TWhp is used, which is calculated based on the temperature Tco of the refrigerant having released the heat in the water-refrigerant heat exchanger 22 and the temperature efficiency allowing for the flow rate GW flowing through the water circuit 30. However, another configuration is possible where the temperature of the water having been heated in the water-refrigerant heat exchanger 22 is actually detected and the result of the detection is used.

FIG. 28 to FIG. 35 show Embodiment 9 of the present invention.

Figure 28:
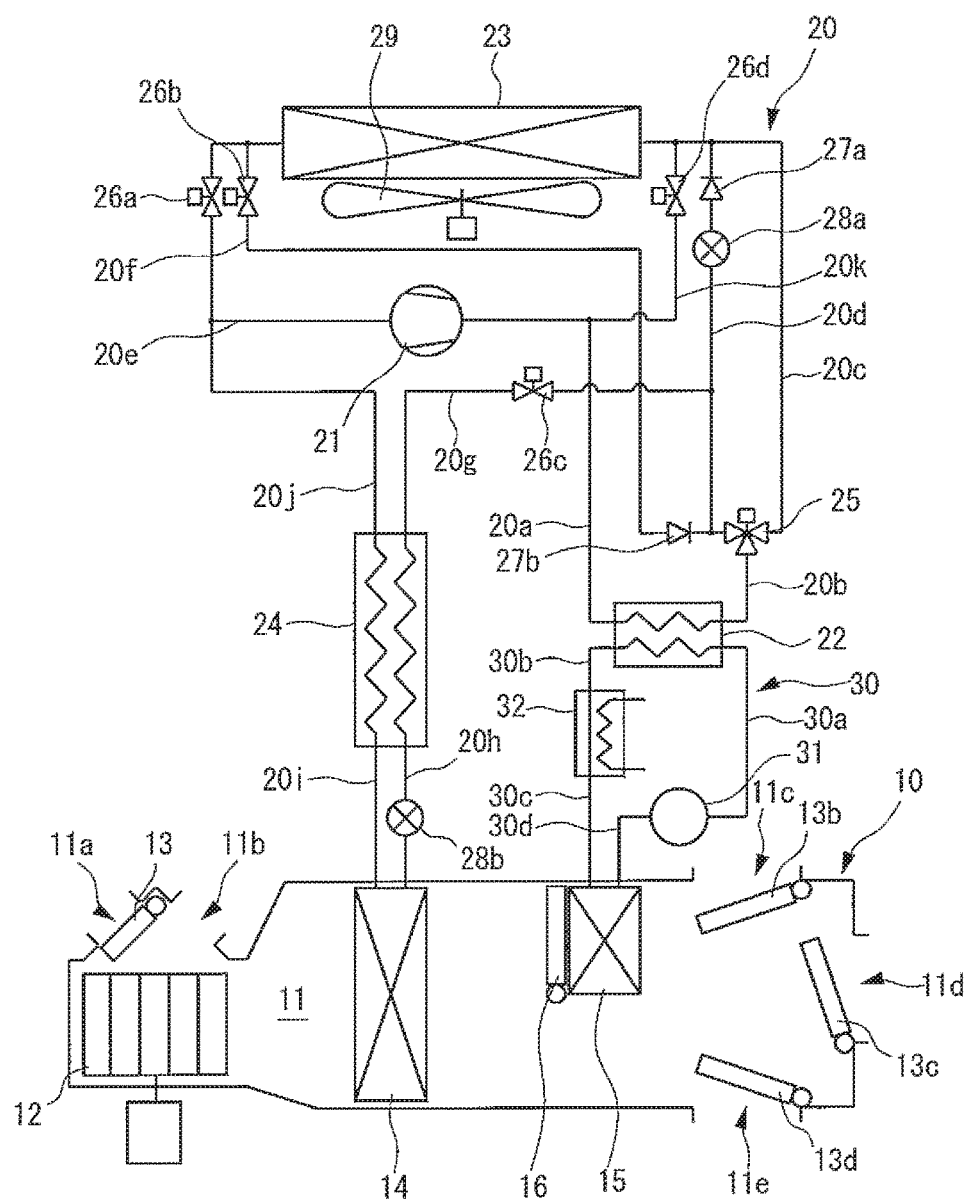
FIG. 28 is a schematic view showing the vehicle air conditioning apparatus according to Embodiment 9 of the present invention.

The vehicle air conditioning apparatus according to the present invention is applicable to an electric car that is run by electric power and that is driven by the electric power of a battery to be used to run the electric car. As shown in FIG. 28, this vehicle air conditioning apparatus includes an air conditioning unit 10 provided in the vehicle interior, and a refrigerant circuit 20 and a water circuit 30 that are formed across the vehicle interior and the outdoor.

The air conditioning unit 10 includes an air flow passage 11 that allows the air to be supplied to the vehicle interior to pass through. An outdoor air inlet 11a and an indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, a foot outlet 11c, a vent outlet 11d and a defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

An indoor fan 12 such as a sirocco fan configured to allow the air to flow through the air flow passage 11 from end to end is provided in the first end side of the air flow passage 11. This indoor fan 12 is driven by the electric motor 12a.

Also, in the first end side of the air flow passage 11, an inlet switching damper 13 configured to open one of the outdoor air inlet 11a and the indoor air inlet 11b and to close the other. This inlet switching damper 13 is driven by the electric motor 13a. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

Outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage and are opened and closed by the electric motor 13e. Here, when the outlet switching dampers 13b, 13c and 13d open the foot outlet 1c, close the bent outlet 11d and slightly open the defroster outlet 11e, most of the air flowing through the air flow passage 11 blows out of the foot outlet 11c and the remaining air blows out of the defroster outlet 11e. This mode is referred to as "foot mode." Meanwhile, when the outlet switching dampers 13b, 13c and 13d close the foot outlet 11 and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode." Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and a heat exchanger and a radiator which will be described later, are arranged and configured such that the temperature of the air blowing out of the foot outlet 11c is higher than the temperature of the air blowing out of the vent outlet 11d.

A heat exchanger 14 is provided in the air flow passage 11 in the downstream of the air flow from the indoor fan 12. The heat exchanger 14 is configured to cool and dehumidify the air flowing through the air flow passage 11. In addition, a radiator 15 is provided in the air flow passage 11 in the downstream of the air flow from the heat exchanger 14. The radiator 15 is configured to heat the air flowing through the air flow passage 11. The heat exchanger 14 is a heat exchanger that is constituted by fins and tubes and that is configured to perform heat exchange between the refrigerant flowing through the refrigerant circuit 20 and the air flowing through the air flow passage 11. Meanwhile, the radiator 15 is a heat exchanger that is constituted by fins and tubes and that is configured to perform heat exchange between the water flowing through the water circuit 30 and the air flowing through the air flow circuit 11.

An air mix damper 16 is provided between the heat exchanger 14 and the radiator 15 in the air flow passage 11 and is configured to control the percentage of the air to be heated, which is flowing through the air flow passage 11. The air mix damper 16 is driven by the electric motor 16a. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening degree is 0%, and, on the other hand, when the air mix damper 16 opens the upstream side of the radiator 15 and closes the portion other than the radiator 15, the opening degree is 100%.

The refrigerant circuit 20 includes: the heat exchanger 14; a compressor 21 configured to compress refrigerant; a water-refrigerant heat exchanger 22 configured to perform a heat exchange between the refrigerant and the water flowing through the water circuit 30; an outdoor heat exchanger 23 configured to perform a heat exchange between the refrigerant and the outdoor air; an indoor heat exchanger 24 configured to perform a heat exchange between the refrigerant flowing into heat exchanger 14 and the refrigerant flowing out of the heat exchanger 14; a three-way valve 25 configured to switch the passage of the refrigerant; first to fourth solenoid valves 26a to 26d; first and second check valves 27a and 27b; and first and second expansion valves 28a and 28b configured to decompress the refrigerant. These components are connected to each other by a copper pipe or an aluminum pipe. The compressor 21 and the outdoor heat exchanger 23 are disposed outside the vehicle interior. The compressor 21 is driven by the electric motor 21a. The outdoor heat exchanger 23 is provided with an outdoor fan 29 configured to perform heat exchange between the outdoor air and the refrigerant when the vehicle stops. The outdoor fan 29 is driven by the electric motor 29a.

To be more specific, one side of the water-refrigerant heat exchanger 22 into which the refrigerant flows is connected to one side of the compressor 21 from which the refrigerant is discharged to form the refrigerant flow passage 20a. In addition, the input side of the outdoor heat exchanger 23 into which the refrigerant flows is connected to the output side of the water-refrigerant heat exchanger 22 from which the refrigerant is discharged, thereby to form the refrigerant flow passage 20b. The refrigerant flow passage 20b is provided with the three-way valve 25. The one side of the three-way valve 25 from which the refrigerant is discharged and another side from which the refrigerant is discharged are parallel to one another and are connected to the input side of the outdoor heat exchanger 23 into which the refrigerant flows and thereby to form the refrigerant flow passages 20c and 20d. The refrigerant flow passage 20d is provided with the first expansion valve 28a and the first check valve 27a in the order from the upstream of the flow of the refrigerant. The input side of the compressor 21 into which the refrigerant is sucked and the part of the refrigerant flow passage 20d between the three-way valve 25 and the first expansion valve 28a are connected in parallel to the output side of the outdoor heat exchanger 23 from which the refrigerant is discharged, thereby to form the refrigerant flow passage 20e and 20f. The refrigerant flow passage 20e is provided with the first solenoid valve 26a. The refrigerant flow passage 20f is provided with the second solenoid valve 26b and the second check valve 27b in the order from the upstream of the flow of the refrigerant. The input side of the interior heat exchanger 24 into which high-pressure refrigerant flows 1b is connected to the part of the refrigerant flow passage 20d between the three-way valve 25 and the first expansion valve 28a, thereby to form the refrigerant flow passage 20g. The refrigerant passage 20g is provided with the third solenoid valve 26c. The input side of the heat exchanger 14 into which the refrigerant flow is connected to the output side of the indoor heat exchanger 24 from which the high-pressure refrigerant is discharged, thereby to provide the refrigerant flow passage 20h. The refrigerant flow passage 20h is provided with the second expansion valve 28b. The input side of the indoor heat exchanger 24 into which low-pressure refrigerant flows is connected to the output side of the heat exchanger 14 from which the refrigerant is discharged, thereby to form the refrigerant flow passage 20i. The part of the refrigerant flow passage 20e between the first solenoid valve 26a and the input side of the compressor 21 into which the refrigerant is sucked is connected to the output side of the indoor heat exchanger 24 from which the low-pressure refrigerant is discharged, thereby to provide the refrigerant flow passage 20j. The input side of the outdoor heat exchanger 23 into which the refrigerant flows is connected to the refrigerant flow passage 20a, thereby to provide the refrigerant flow passage 20k. The refrigerant flow passage 20k is provided with the fourth solenoid valve 26d.

The water circuit 30 includes the radiator 15, the water-refrigerant heat exchanger 22, a pump 31 configured to pump the water as heat medium and a water heater 32 such as an electric heater configured to heat water by electric power. These components are connected by a copper pipe or an aluminum pipe. To be more specific, the input side of the water-refrigerant heat exchanger 22 into which water flows is connected to output side of the pump 31 from which the water is discharged, thereby to form a water flow passage 30a. The input side of the water heater 32 into which the water flows is connected to the output side of the water-refrigerant heat exchanger 22 from which the water is discharged, thereby to from a water flow passage 30b. The input side of the radiator 15 into which the water flows is connected to the output side of the water heater 32 from which the water is discharged, thereby to form a water flow passage 30c. The input side of the pump 31 into which the water is sucked is connected to the output side of the radiator 15 from which the water flows, thereby to from a water flow passage 30d. The pump 31 is driven by the electric motor 31a.

The vehicle air conditioning apparatus also includes a controller 40 that controls the temperature and the humidity of the vehicle interior to be the preset temperature and humidity.

The controller 40 includes a CPU, a ROM and a RAM. In the controller, upon receiving an input signal from a device connected to the input side, the CPU reads the program stored in the ROM according to the input signal, stores the state detected by the input signal on the RAM and transmits an output signal to a device connected to the output side.

Figure 29:
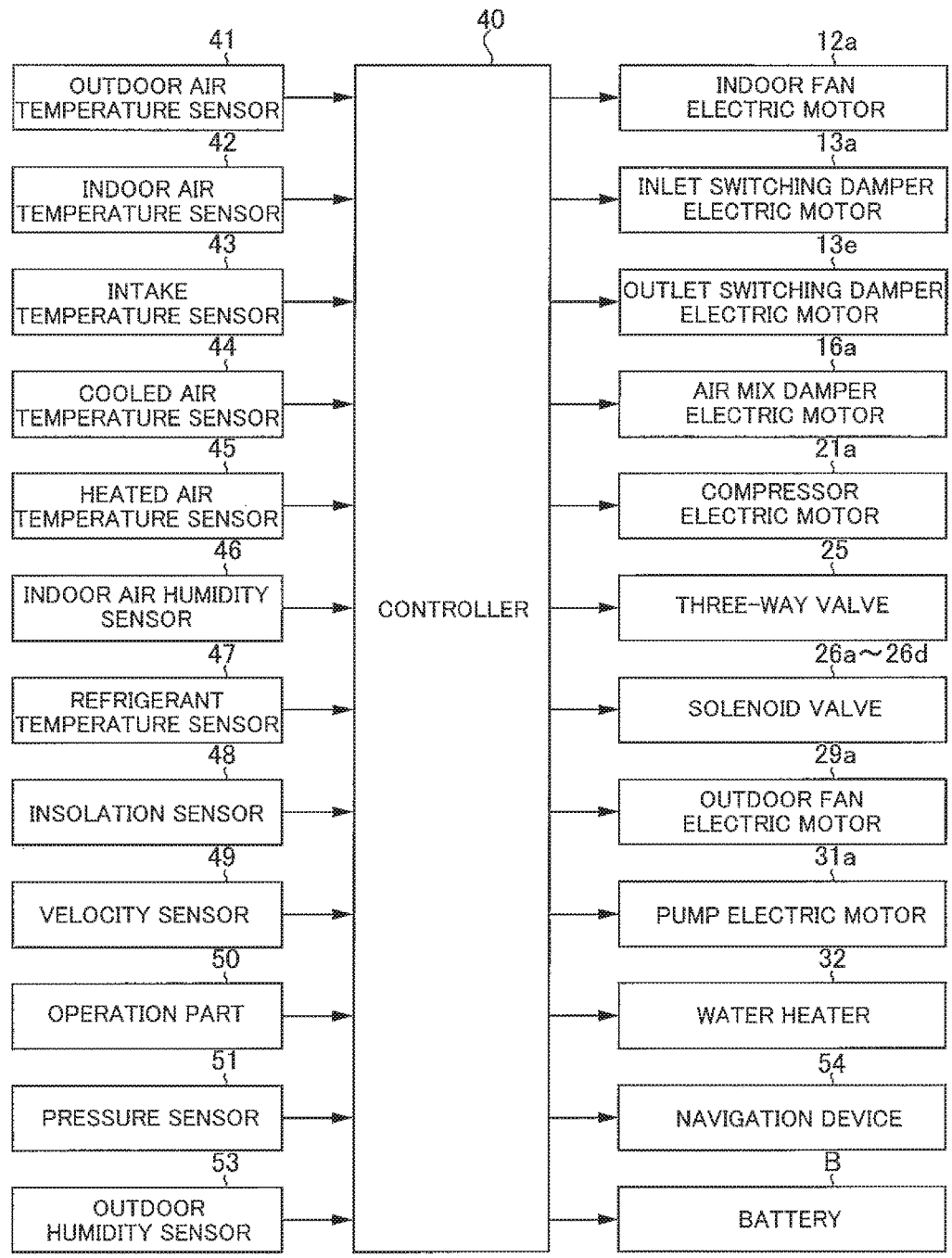
FIG. 29 is a block diagram showing a control system.

As shown in FIG. 29, an outdoor air temperature sensor 41 configured to detect temperature Tam outside the vehicle interior; an indoor air temperature sensor 42 configured to detect temperature Tr in the vehicle interior; an intake temperature sensor 43 configured to detect temperature Ti of the air flowing into the air flow passage 11; a cooled air temperature sensor 44 configured to detect temperature Te of the air having been cooled in the heat exchanger 14; a heated air temperature sensor 45 configured to detect temperature Tc of the air having been heated in the radiator 15; an indoor air humidity sensor 46 configured to detect humidity Th in the vehicle interior; a refrigerant temperature sensor 47 configured to detect temperature Thex of the refrigerant after the heat exchange in the outdoor heat exchanger 23; an insolation sensor 48 such as a photo sensor configured to detect amount of insolation Ts; a velocity sensor 49 configured to detect velocity V of the vehicle; an operation part 50 configured to set modes regarding to target setting temperature Tset and the switching of the operation; a pressure sensor 51 configured to detect pressure Pd in the high-pressure side of the refrigerant circuit 20; and an outdoor air humidity sensor 53 configured to detect humidity Rham outside the vehicle interior are connected to the input side of the controller 40.

As shown in FIG. 29, an electric motor 12a for driving the indoor fan 12; an electric motor 13a for driving the inlet switching damper 13; an electric motor 13e for driving the outlet switching dampers 13b, 13c and 13d; an electric motor 16e for driving the air mix damper 16; an electric motor 21e for driving the compressor 21; the three-way valve 25; the first to fourth solenoid valves 26a, 26b, 26c and 26d; an electric motor 29a for driving the outdoor fan 29; an electric motor 31a for driving the pump 31; the water heater 32; and a navigation device 54 configured to measure the present location of the vehicle and to guide the route to the destination are connected to the output side of the controller 40. The navigation device 54 is configured to be able to acquire traffic information, for example, whether or not traffic jam occurs in the route to the destination.

The vehicle air conditioning apparatus having the above-described configuration performs cooling operation, cooling and dehumidifying operation, heating operation, first heating and dehumidifying operation, second heating and dehumidifying operation and defrost operation. Now, each operation will be explained.

First, the cooling operation will be explained. In the refrigerant circuit 20, the flow passage of three-way valve is set to the refrigerant flow passage 20c side; the second and third solenoid valves 26b and 26c open and the first and fourth solenoid valves 26a and 26d are Closed; and the compressor 21 is operated. Meanwhile, the operation of the pump 31 is stopped in the water circuit 30.

Figure 30:
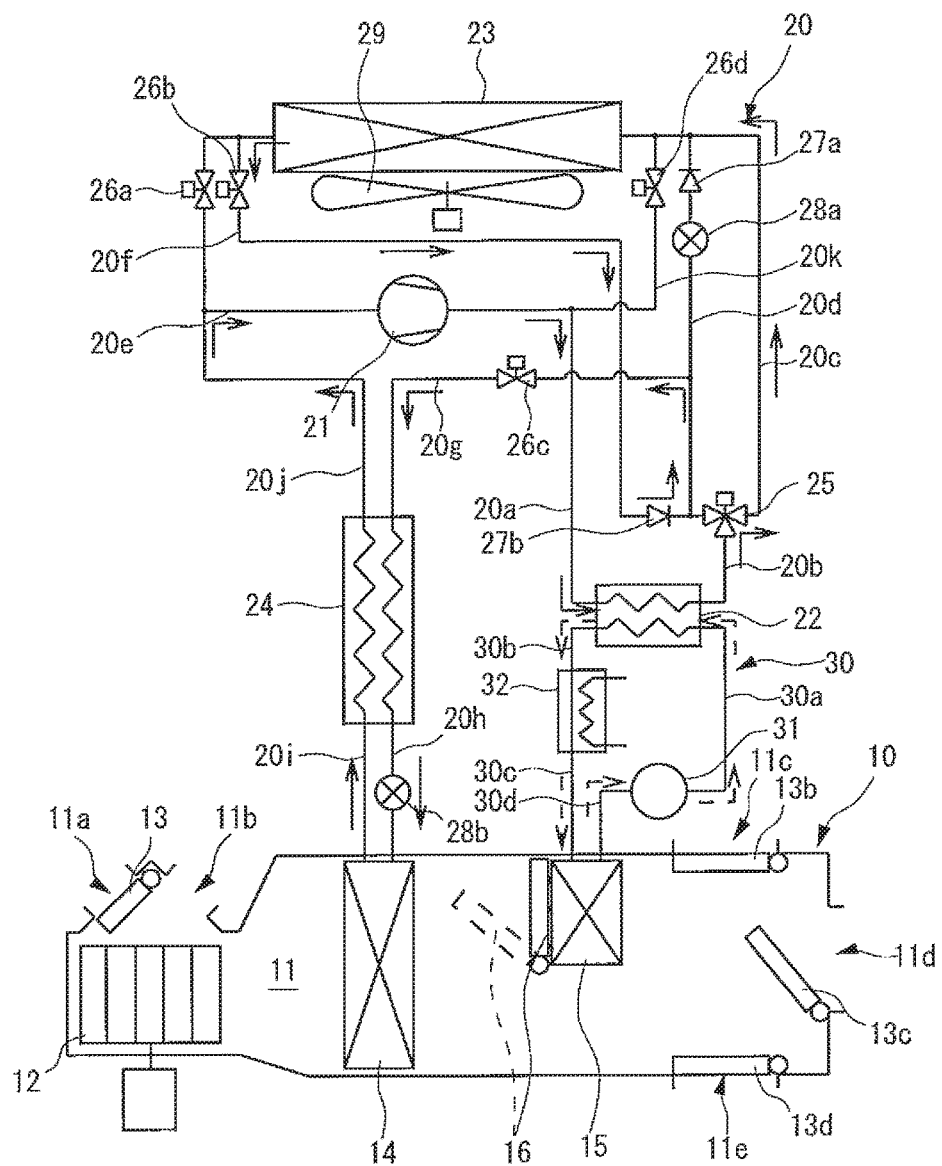
FIG. 30 is a schematic view showing the vehicle air conditioning apparatus performing the cooling operation and the cooling and dehumidifying operation.

By this means, as shown in FIG. 30, the refrigerant discharged from the compressor 21 flows through in this order: the refrigerant flow passage 20a; the water-refrigerant heat exchanger 22; water-refrigerant flow passages 20b and 20c; the outdoor heat exchanger 23, the refrigerant flow passages 20f, 20d and 20g, the high-pressure side of the internal heat exchanger 24; the refrigerant flow passage 20h; the heat exchanger 14; the refrigerant flow passage 20i; the low-pressure side of the internal heat exchanger 24; and the refrigerant flow passages 20j and 20e, and is sucked into the compressor 21. The refrigerant flowing through the refrigerant circuit 20 releases the heat in the outdoor heat exchanger 23 and absorbs the heat in the heat exchanger 14. Since the pump 31 is stopped in the cooling operation, heat is not released from refrigerant in the water-refrigerant heat exchanger 22.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air is the target air-blowing temperature TAO of the air to blow out of the outlets 11c, 11d and 11e in order to set the temperature of the vehicle interior to target setting temperature Tset. Then, the air at temperature Tset blows to the vehicle interior.

Next, the cooling and dehumidifying operation will be explained. In the refrigerant circuit 20, like the cooling operation, the flow passage of the three-way valve 25 is set to the refrigerant flow passage 20c side; the second and third solenoid valves 26b and 26c open and the first and fourth solenoid valves 26a and 26d are closed; and the compressor 21 is operated. In the water circuit 30, the pump 31 is operated.

By this means, as shown in FIG. 30, the refrigerant discharged from the compressor 21 flows through in the same way as in the cooling operation. The refrigerant flowing through the refrigerant circuit 20 releases the heat in the water-refrigerant heat exchanger 22 and the outdoor heat exchanger 23, and absorbs the heat in the heat exchanger 14.

In addition, the water discharged from the pump 31 flows through in this order: the water-refrigerant heat exchanger 22, the water heater 32; and the radiator 15 as indicated by the chain line of FIG. 30, and is sucked into the pump 31. The water flowing through the water circuit 30 absorbs the heat in the water-refrigerant heat exchanger 22 and releases the heat in the radiator 15.

In this case, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subject to heat exchange with the water which releases the heat in the radiator 15, and therefore heated. As a result, the air at the target air-blowing temperature TAO blows to the vehicle interior.

Next, the heating operation will be explained. In the refrigerant circuit 20, the flow passage of the three-way valve 25 is set to the refrigerant flow passage 20d side; the first solenoid valve 26a opens and the second to fourth solenoid valves 26b to 26d are closed: and the compressor 21 is operated. In the water circuit 30, the pump 31 is operated.

Figure 31:
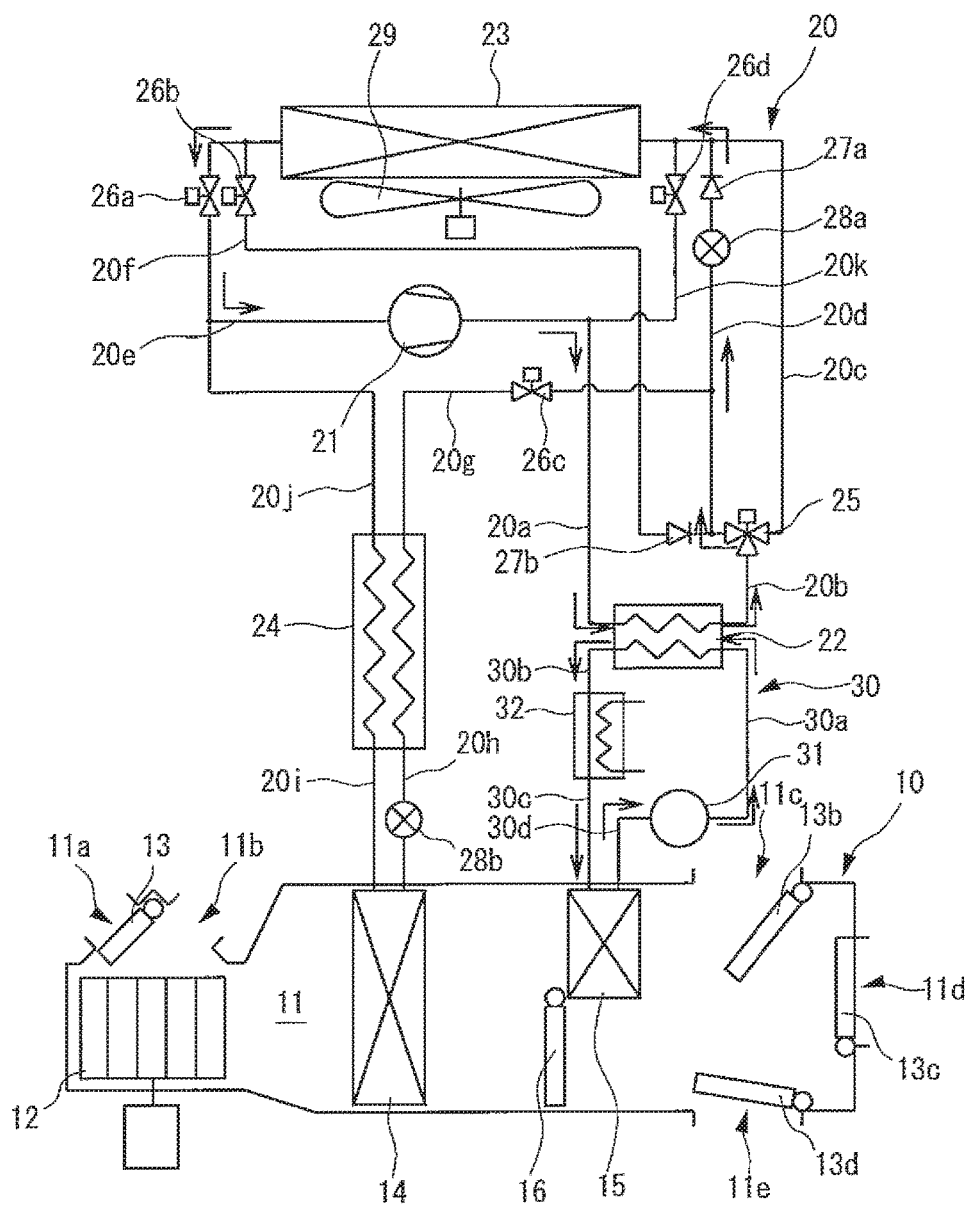
FIG. 31 is a schematic view showing the vehicle air conditioning apparatus performing the heating operation.

By this means, as shown in FIG. 31, the refrigerant discharged from the compressor 21 flows through this order: the refrigerant flow passage 20a; the water-refrigerant heat exchanger 22; the refrigerant flow passages 20b and 20d; the outdoor heat exchanger 23; and the refrigerant flow passage 20e, and is sucked into the compressor 21. The refrigerant flowing through the refrigerant circuit 20 releases the heat in the water-refrigerant heat exchanger 22 and absorbs the heat in the outdoor heat exchanger 23.

Meanwhile, as shown in FIG. 31, the water discharged from the pump 31 flows through in this order: the water-refrigerant heat exchanger 22; the water heater 32; and the radiator 15, and is sucked into the pump 31. The water flowing through the water circuit 30 absorbs the heat in the water-refrigerant heat exchanger 22 and releases the heat in the radiator 15.

In this case, in the air conditioning unit 10, the indoor fan 12 is operated to flow the air through the air flow passage 11, and the flowing air is not subject to a heat exchange with the refrigerant in the heat exchanger 14, but is subjected to a heat exchange with the water in the radiator 15 and therefore is heated. As a result, the air at the target air-blowing temperature TAO blows to the vehicle interior.

Next, the first heating and dehumidifying operation will be explained. In the refrigerant circuit 20, the flow passage of the three-way valve 25 is set to the refrigerant flow passage 20d side; the first and third solenoid valves 26a and 26c open and the second and fourth solenoid valves 26b and 26d are closed; and the compressor 21 is operated. Meanwhile, the pump 31 is operated in the water circuit 30.

Figure 32:
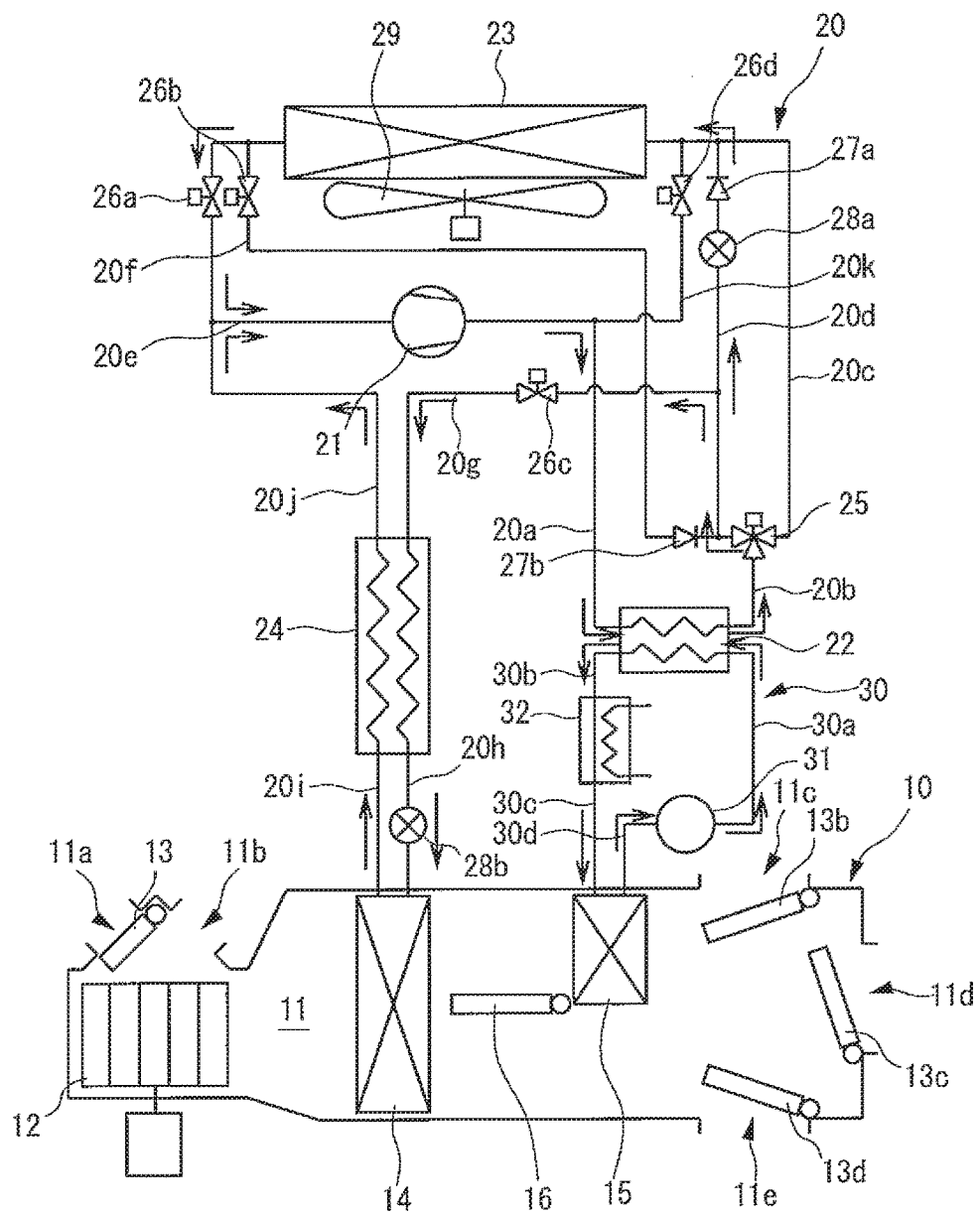
FIG. 32 is a schematic view showing the vehicle air conditioning apparatus performing the first heating and dehumidifying operation.

By this means, as shown in FIG. 32, the refrigerant discharged from the compressor 21 flows through in this order: the refrigerant flow passage 20a; the water-refrigerant heat exchanger 22; and the refrigerant flow passages 20b and 20d. Part of the refrigerant flowing through the refrigerant flow passage 20d flows through in this order: the outdoor heat exchanger 23; and the refrigerant flow passage 20e, and is sucked into the compressor 21. In addition, remaining refrigerant flowing through the refrigerant flow passage 20d flows through in this order: the refrigerant flow passage 20g; the high-pressure side of the interior heat exchanger 24; the refrigerant flow passage 20h; the heat exchanger 14; the refrigerant flow passage 20i; the low-pressure side of the interior heat exchanger 24; and the refrigerant flow passages 20j and 20e, and is sucked into the compressor 21. The refrigerant flowing through the refrigerant circuit 20 releases the heat in the water-refrigerant heat exchanger 22 and absorbs the heat in the heat exchanger 14 and the outdoor heat exchanger 23.

Meanwhile, as shown in FIG. 32, the water discharged from the pump 31 flows through in this order: the water-refrigerant heat exchanger 22; the water heater 32; and the radiator 15, and is sucked into the pump 31. The water flowing through the water circuit 30 absorbs the heat in the water-refrigerant heat exchanger 22 and releases the heat from the radiator 15.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the water in the radiator 15 and heated. As a result, the air at the target air-blowing temperature TAO blows into the vehicle interior.

Next, the second heating and dehumidifying operation will be explained. In the refrigerant circuit 20, the flow passage of the three-way valve 25 is set to the refrigerant flow passage side 20d; the third solenoid valve 26c opens and the first, second and fourth solenoid valves 26a, 26b and 26d are closed; and the compressor 21 is operated. Meanwhile, the pump 31 is operated in the water circuit 30.

Figure 33:
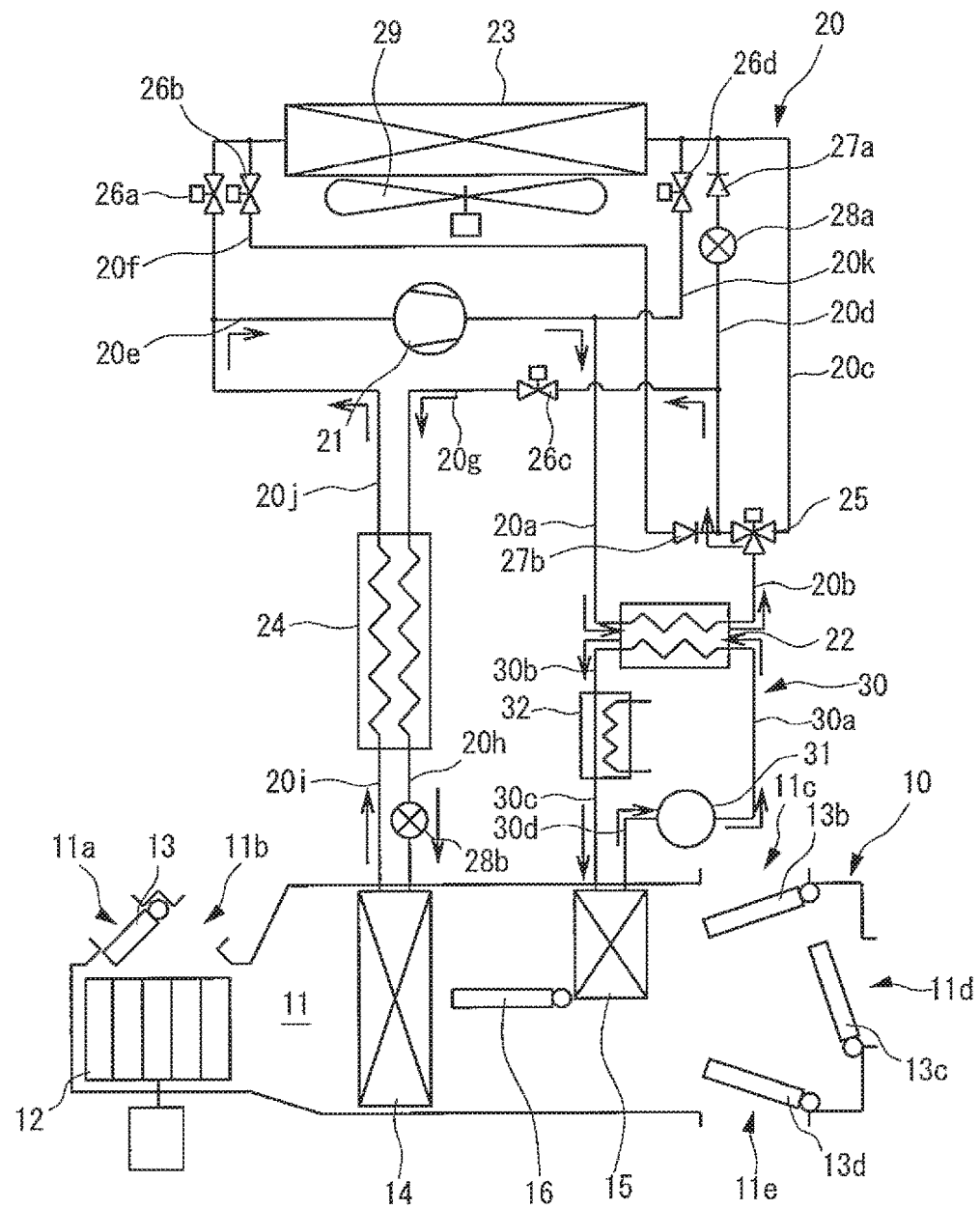
FIG. 33 is a schematic view showing the vehicle air conditioning apparatus performing the second heating and dehumidifying operation.

By this means, as shown in FIG. 33, the refrigerant discharged from the compressor 21 flows through in this order: the refrigerant flow passage 20a; the water-refrigerant heat exchanger 22; the refrigerant flow passages 20b, 20d and 20g; the high-pressure side of the interior heat exchanger 24; the refrigerant flow passage 20h; the heat exchanger 14; the refrigerant flow passage 20i; the low-pressure side of the interior heat exchanger 24; and the refrigerant flow passages 20j and 20e, and is sucked into the compressor 21. The refrigerant flowing through the refrigerant circuit 20 releases the heat in the water-refrigerant heat exchanger 22 and absorbs the heat in the heat exchanger 14.

Meanwhile, as shown in FIG. 33, the water discharged from the pump 31 flows through in this order: the water-refrigerant heat exchanger 22; the water heater 32; and the radiator 15, and is sucked into the pump 31. The water flowing through the water circuit 30 absorbs the heat in the water-refrigerant heat exchanger 22 and releases the heat in the radiator 15.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified in the same way as in the first heating and dehumidifying operation. Part of the air dehumidified in the heat exchanger 14 is subjected to a heat exchange with the water in the radiator 15, and therefore heated. As a result, the air at the target air-blowing temperature TAO blows to the vehicle interior.

Next, the defrost operation will be explained. In the refrigerant circuit 20, the flow passage of the three-way valve 25 is set to the refrigerant flow passage 20d side; the first and fourth solenoid valves 26a and 26d open and the second and third solenoid valves 26d and 26c are closed; and the compressor 21 is operated. Meanwhile, the pump 31 is operated in the water circuit 30.

Figure 34:
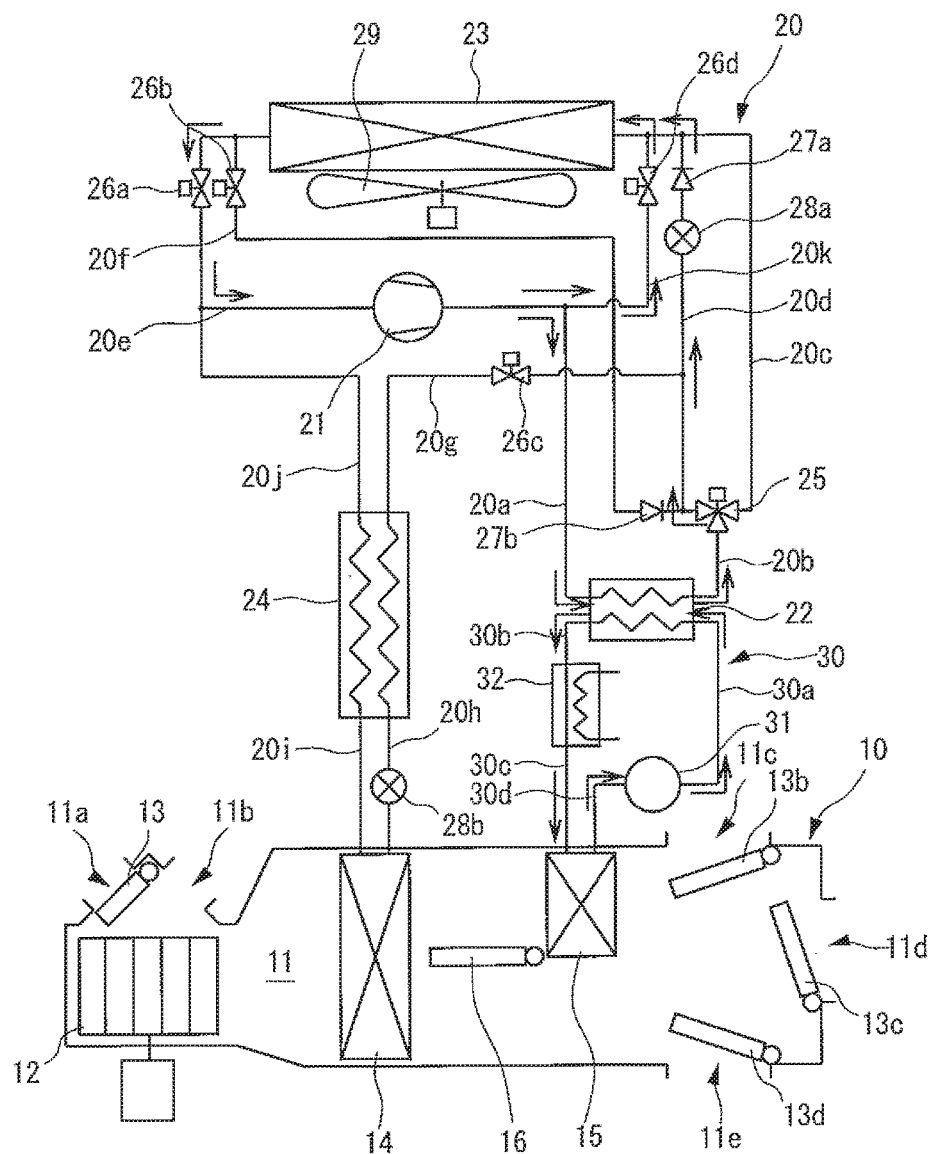
FIG. 34 is a schematic view showing the vehicle air conditioning apparatus performing the defrost operation.
Figure 35:
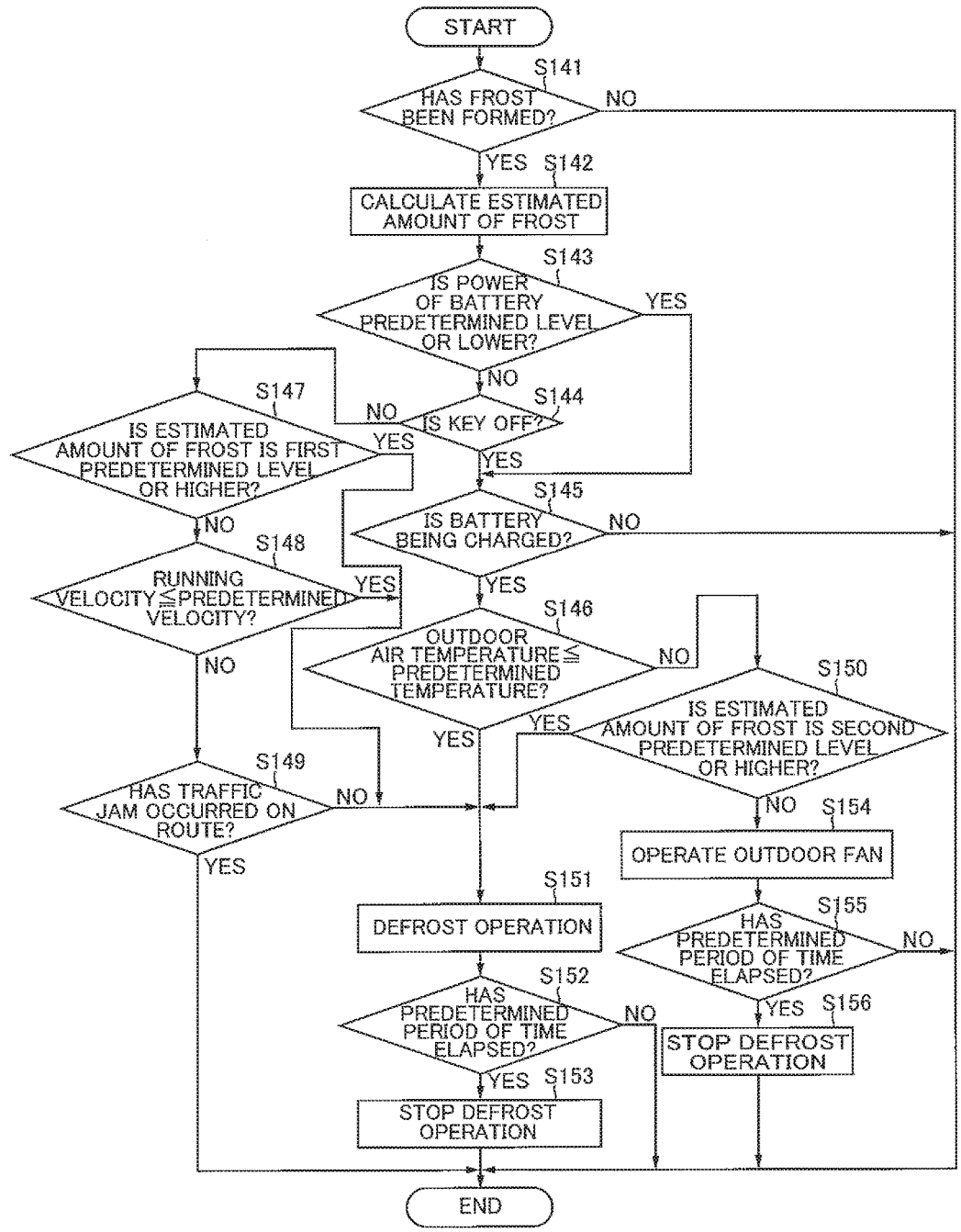
FIG. 35 is a flowchart showing a process to control the defrost operation.

By this means, as shown in FIG. 34, part of the refrigerant discharged from the compressor 21 flows through in this order: the refrigerant flow passage 20a; the water-refrigerant heat exchanger 22; the refrigerant flow passages 20b and 20, and flows into the outdoor heat exchanger 23. In addition, the remaining refrigerant discharged from the compressor 21 flows through the refrigerant flow passages 20a and 20k and flows into the outdoor heat exchanger 23. The refrigerant flowing out of the outdoor heat exchanger 23 flows through the refrigerant flow passage 20e, and is sucked into the compressor 21. The refrigerant flowing through the refrigerant circuit 20 releases the heat in the water-refrigerant heat exchanger 22, and at this time, absorbs the heat in the outdoor heat exchanger 23.

Meanwhile, as shown in FIG. 34, the water discharged from the pump 31 flows through in this order: the water-refrigerant heat exchanger 22; the water heater 32; and the radiator 15, and is sucked into the pump 31. The water flowing through the water circuit 30 absorbs the heat in the water-refrigerant heat exchanger 22, and releases the heat in the radiator 15.

In this case, in the air conditioning unit 10, the indoor fan 12 is operated to flow the air through the air flow passage 11. The flowing air is not subjected to a heat exchange with the refrigerant in the heat exchanger 14, but is subjected to a heat exchange with the water which releases the heat in the radiator 15, and therefore is heated and then blows to the vehicle interior.

While the automatic switch of the operation part 50 is turned on, the controller 40 performs an operation switching control process to switch among the cooling operation, the cooling and dehumidifying operation, the heating operation, the first heating and dehumidifying operation, the second heating and dehumidifying operation, and the defrost operation, based on indoor and outdoor environmental conditions, such as temperature.

In each operation switched by the operation switching control process, the controller 40 switches among the foot mode, the vent mode and the bi-level mode according to the target air-blowing temperature TAO. To be more specific, when the target air-blowing temperature TAO is high, for example, 40 degrees centigrade, the controller 40 sets the foot mode. Meanwhile, when the target air-blowing temperature TAO is low, for example, lower than 25 degrees centigrade, the controller sets the vent mode. Moreover, when the target air-blowing temperature TAO is the temperature between the temperature for the foot mode and the temperature for the vent mode, the controller 40 sets the bi-level mode.

The controller 40 switches the mode of the outlets 11*c*, 11*d* and 1ie by using the outlet switching dampers 13*b*, 13*c* and 13*d*, and controls the opening degree of the air mix damper 16 in order to set the temperature of the air blowing out of the outlets 11*c*, 11*d*, and 11*e* to the target air-blowing temperature TAO.

In addition, when the outdoor air temperature is low, for example, in winter, the controller 40 determines whether or not a frost is formed on the outdoor heat exchanger 23, and performs a defrost operation control process to control the time of the start of the defrost operation, based on the driving state of the vehicle and the power of the battery B to drive the vehicle. Now, the operation of the controller 40 in this process will be explained with reference to the flowchart shown in FIG. 35.

(Step 141)

In step S141, the CPU determines whether or not a frost is formed on the outdoor heat exchanger 23. When determining that a frost is formed on the outdoor heat exchanger 23, the CPU moves the step to step S142. On the other hand, when determining that a frost is not formed on the outdoor heat exchanger 23, the CPU ends the defrost operation control process. Here, a method of determining whether or not a frost is formed on the outdoor heat exchanger 23 will be explained. First, the CPU calculates outdoor air dew point temperature Tdew, which is the dew point temperature of the outdoor air, based on the outdoor air temperature Tam detected by the outdoor air temperature sensor 41 and the outdoor humidity Rham detected by the outdoor humidity sensor 53. Next, the CPU determines whether or not the temperature Thex of the refrigerant flowing out of the outdoor heat exchanger 23, which has been detected by the refrigerant temperature sensor 47, is lower than the outdoor air dew point temperature Tdew. When the temperature Thex of the refrigerant is lower than the outdoor air dew point temperature Tdew, the CPU determines that a frost is formed on the outdoor heat exchanger 23. This determination of whether or not a frost is formed on the outdoor heat exchanger 23 is performed regardless of whether or not the vehicle is running.

(Step S142)

When determining that a frost is formed on the outdoor heat exchanger 23 in the step S141, the CPU calculates an estimated amount of frost. Here, the estimated amount of frost is calculated by detecting, for example, the outdoor air temperature Tam, the temperature Thex and the pressure of the refrigerant after the heat exchange in the outdoor heat exchanger 23, the velocity V of the vehicle, and the durations of the temperature Tam and the temperature Thex.

(Step S143)

In step S143, the CPU determines whether or not the power of the battery B is a predetermined level or lower. When determining that the power of the battery B is a predetermined level or lower, the CPU moves the step to step S145. On the other hand, when determining that the power of the battery B is not a predetermined level or lower, the CPU moves the step to step S144.

(Step S144)

When determining that the power of the battery B is not a predetermined level or lower in the step S143, the CPU determines whether or not the vehicle is not running because the key is off in the step 144. When determining that the key is off, the CPU moves the step to step S145. On the other hand, determining that the key is not off, that is, the vehicle is running, the CPU moves the step to step S147.

(Step S145)

When determining that the power of the battery B is a predetermined level or lower in the step 143, or when determining that the vehicle is not running because the key is off, the CPU determines whether or not the battery is being charged in step the S145. When determining that the battery B is being charged, the CPU moves the step to step S146. On the other hand, when determining that the battery B is not being charged, the CPU ends the defrost operation control process.

(Step S146)

When determining that the battery B is being charged in the step S145, the CPU determines whether or not the outdoor air temperature Tam is a predetermined temperature (e.g. 0 degree centigrade) or lower. When determining that the temperature Tam is a predetermined temperature or lower, the CPU moves the step to step S151. On the other hand, when determining that the outdoor air temperature Tam is not a predetermined temperature or lower, the CPU moves the step to step S150.

(Step S147)

When determining that the key is on, and therefore the vehicle can run in the step S144, the CPU determines whether the estimated amount of the frost on the outdoor heat exchanger 23 is a first predetermined level or higher in step S147. When determining that the estimated amount of the frost is the first predetermined amount or higher, the CPU moves the step to the step S151. On the other hand, determining that the estimated amount of the frost is not the first predetermined level or higher, the CPU moves the step to step S148.

(Step S148) When determining that the estimated amount of the frost is not the first predetermined level or higher in the step S147, the CPU determines whether or not the average velocity of the vehicle for a predetermined period of time is a predetermined velocity (e.g. 30 km per hour) or lower in the step S148. When determining that the average velocity of the vehicle is a predetermined velocity or lower, the CPU moves the step to the step S151. On the other hand, when determining that the average velocity of the vehicle is not a predetermined velocity or lower, the CPU moves the step to step S149. Here, the CPU determines whether or not a traffic jam has occurred on the road based on the average velocity of the vehicle for a predetermined period of time. Whether or not a traffic jam has occurred in the road can be determined by acquiring traffic information by using the navigation device 54.

(Step S149)

When determining that the average velocity of the vehicle for a predetermined period of time is not a predetermined velocity or lower in the step S148, the CPU determines whether or not a traffic jam has occurred in the route to the destination based on the traffic information acquired by the navigation device 54. When determining that a traffic jam has occurred in the route to the destination, the CPU ends the defrost operation control process. On the other hand, when determining that a traffic jam has not occurred in the route to the destination, the CPU moves the step to the step S151.

(Step S150)

When determining that the outdoor air temperature Tam is not a predetermined temperature or lower in the step S146, the CPU determines whether or not the estimated amount of the frost on the outdoor heat exchanger 23 is a second predetermined level or higher in the step S150. When determining that the estimated amount of the frost is the second predetermined level or higher, the CPU moves the step to the step S151. On the other hand, when determining that the estimated amount of the frost is not the second predetermined level or higher, the CPU moves the step to the step S154.

(Step S151)

The CPU performs the defrost operation in the step S151 on the following conditions: it is determined in the step S146 that the outdoor air temperature Tam is a predetermined temperature or lower; it is determined in the step S147 that the estimated amount of the frost is the first predetermined level or higher; it is determined in the step S148 that the average velocity of the vehicle is a predetermined velocity or lower; it is determined in the step S149 that a traffic jam has not occurred in the route to the destination; or it is determined in the step S150 that the estimated amount of the frost is the second predetermined level or higher.

(Step S152)

In step S152, the CPU determines whether or not a predetermined period of time has elapsed after the defrost operation starts in the step S151. When determining that a predetermined period of time has elapsed after the defrost operation starts, the CPU moves the step to step S153. On the other hand, when determining that a predetermined period of time has not elapsed after the defrost operation starts, the CPU ends the defrost operation control process. Here, a predetermined period of time having elapsed after the defrost operation starts is set based on the estimated amount of frost, the velocity V of the vehicle, the outdoor humidity Rham, the air quantity of the outdoor fan 29 and so forth.

(Step S153)

When determining that a predetermined period of time has elapsed after the defrost operation starts in the step S152, the CPU stops the defrost operation in the step S153 and ends the defrost operation control process.

(Step S154)

When determining that the estimated amount of frost is not the second predetermined level or higher in the step S150, the CPU operates the outdoor fan 29 in the step S154.

(Step S155)

In step S155, the CPU determines whether or not a predetermined period of time has elapsed after the operation of the outdoor fan 29 is started in the step S154. When determining that a predetermined period of time has elapsed after the operation of the outdoor fan 29 is started, the CPU moves the step to step S156. On the other hand, when determining that a predetermined period of time has not elapsed after the operation of the outdoor fan 29 is started, the CPU ends the defrost operation control process. Here, a predetermined time having elapsed after the operation of the outdoor fan 29 is started is set based on the estimated amount of frost, the velocity V of the vehicle, the outdoor humidity Rham, the air quantity of the outdoor fan 29 and so forth.

(Step S156)

When determining that a predetermined period of time has elapsed after the operation of the outdoor fan 29 is started in the step S155, the CPU stops the operation of the outdoor fan 29 in the step S156 and ends the defrost operation control process.

As described above, with the vehicle air conditioning apparatus according to the present embodiment, in a case in which a frost is formed on the outdoor heat exchanger 23, the defrost operation is not performed when the power of the battery B is a predetermined level or lower, but the defrost operation is started when the battery B is being charged. By this means, when the power of the battery B becomes insufficient while the vehicle is running, it is possible to efficiently use the power of the battery B as the power to drive the vehicle. Therefore, it is possible to extend the mileage of the vehicle.

In addition, in a case in which a frost is formed on the outdoor heat exchanger 23, the defrost operation is not performed when the power of the battery B is a predetermined level or lower, but the outdoor fan 29 is operated when the battery is being charged and the outdoor air temperature Tam is 0 degree centigrade or higher. By this means it is possible to help the frost to melt and also possible to blow off the water resulting from the melting of the frost by using the outdoor fan 29. Therefore, the defrost operation with high power consumption is not required.

In addition, the outdoor fan 29 is stopped after a predetermined period of time has elapsed after the operation of the outdoor fan 29 is started. By this means, it is possible to prevent the outdoor fan 29 from being operated more than necessary, and therefore to prevent an increase in power consumption.

Moreover, the amount of the frost formed on the outdoor heat exchanger 23 is calculated, and then the defrost operation is performed at the start time that is determined based on the calculated amount of the frost. By this means, it is possible to promptly perform the defrost operation when the amount of the frost is large, and therefore to reliably prevent a problem: for example, that the amount of the frost on the outdoor heat exchanger 23 is too large to perform the defrost operation.

In addition, when the velocity of the vehicle is a predetermined level or lower, the defrost operation is performed. By this means, it is possible to perform the defrost operation when the vehicle is running at a low velocity with low power consumption, and therefore to prevent the mileage of the vehicle from significantly dropping due to the defrost operation.

In addition, the defrost operation is performed at the start time that is determined based on the information acquired by the navigation device 54. By this means, when the vehicle is running in the vicinity of the destination, or when a traffic jam has occurred on the route to the destination, it is possible to perform the defrost operation when the vehicle is stopped or when the velocity of the vehicle is a predetermined level or lower. Therefore, it is possible to prevent the defrost operation from being performed when the vehicle is running at a high velocity with high power consumption.

Moreover, the defrost operation is stopped after a predetermined period of time has elapsed from the defrost operation is started. By this means, it is possible to prevent the defrost operation from being performed more than necessary, and therefore to prevent an increase in power consumption.

Furthermore, the outdoor air dew point temperature Tdew, which is the dew point temperature of the outdoor air, is calculated, and, when the temperature Thex of the refrigerant flowing out of the outdoor heat exchanger 23 is lower than the outdoor air dew point temperature Tdew, it is determined that a frost is formed on the outdoor heat exchanger 23. By this means, the defrost operation is performed when the outdoor heat exchanger 23 is a subjected to the conditions in which a frost is formed, and therefore to reliably prevent a frost from being formed on the outdoor heat exchanger 23.

Figure 36:
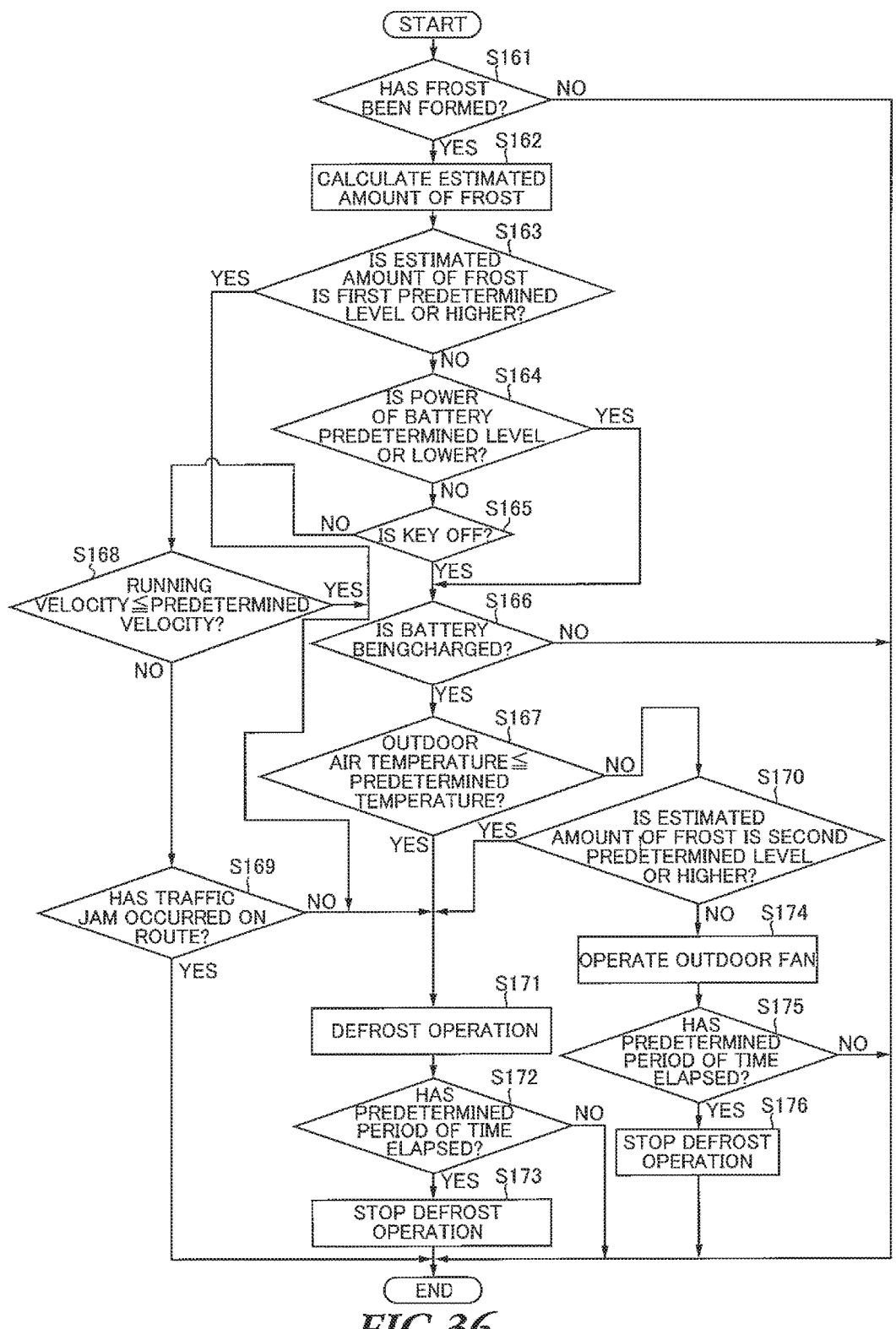
FIG. 36 is a flowchart showing a process to control the defrost operation according to Embodiment 10 of the present invention.

FIG. 36 shows Embodiment 10 of the present invention. Here, the same components are assigned the same reference numerals as in Embodiment 9.

The controller 40 of this vehicle air conditioning apparatus performs a defrost operation control process shown by the flowchart in FIG. 36. The defrost operation control process is different between Embodiment 9 and Embodiment 10 in that Embodiment 9 has a preference to secure the mileage of the vehicle, but Embodiment 10 has a preference to reliably prevent a frost from being formed on the outdoor heat exchanger 23.

(Step S161)
In step S161, the CPU determines whether or not a frost is formed on the outdoor heat exchanger 23. When determining that a frost is formed on the outdoor heat exchanger 23, the CPU moves the step to step S162. On the other hand, when determining that a frost is not formed on the outdoor heat exchanger 23, the CPU ends the defrost operation control process.

(Step S162)
When determining that a frost is formed on the outdoor heat exchanger 23 in the step S161, the CPU calculates an estimated amount of frost.

(Step S163)
In step S163, the CPU determines whether or not the estimated amount of the frost of the outdoor heat exchanger 23 is a first predetermined level or higher. When determining that the estimated amount of the frost is the first predetermined level or higher, the CPU moves the step to step S171. On the other hand, when determining that the estimated amount of the frost is not the first predetermined level or higher, the CPU moves the step to step S164.

(Step S164)
When determining that the estimated amount of the frost is not the first predetermined level or higher in the step S163, the CPU determines whether or not the power of the battery B is a predetermined level or lower in the step S164. When determining that the power of the battery B is a predetermined level or lower, the CPU moves the step to step S166. On the other hand, when determining that the power of the battery B is not a predetermined level or lower, the CPU moves the step to step S165.

(Step S165)
When determining that the power of the battery B is not a predetermined level or lower in the step S164, the CPU determines whether or not the vehicle is not running because the key is off in the step S165. When determining that the key is off, the CPU moves the step to step S166. On the other hand, when determining that the key is not off, that is, the vehicle is running, the CPU moves the step to step S168.

(Step S166)
When determining that the power of the battery B is a predetermined level or lower in the step S164, or when determining that the vehicle is not running because the key is off, the CPU determines whether or not the battery B is being charged in the step S166. When determining that the battery B is being charged, the CPU moves the step to step S167. On the other hand, when determining that the battery B is not being charged, the CPU ends the defrost operation control process.

(Step S167)
When determining that the battery B is being charged in the step S166, the CPU determines whether or not outdoor air temperature Tam is a predetermined temperature (e.g. 0 degree centigrade) or lower in the step S167. When determining that the temperature Tam is a predetermined temperature or lower, the CPU moves the step to step S171. On the other hand, when determining that the outdoor air temperature Tam is not a predetermined temperature or lower, the CPU moves the step to step S170.

(Step S147)
When determining that the key is not off in the step S165, the CPU determines whether or not the average velocity of the vehicle for a predetermined period of time is a predetermined velocity or lower in step S168. When determining that the average velocity is a predetermined velocity or lower, the CPU moves the step to the step S171. On the other hand, when the average velocity is not a predetermined velocity or lower, the CPU moves the step to step S169.

(Step S169)
When determining that the average velocity of the vehicle for a predetermined period of time is not a predetermined velocity or lower in the step S169, the CPU determines whether or not a traffic jam has occurred in the route to the destination based on the traffic information acquired by the navigation device 54. When determining that a traffic jam has occurred in the route to the destination, the CPU ends the defrost operation control process. On the other hand, when determining that a traffic jam has not occurred in the route to the destination, the CPU moves the step to the step S171.

(Step S150)
When determining that the outdoor air temperature Tam is not a predetermined temperature or lower in the step S167, the CPU determines whether or not the estimated amount of the frost on the outdoor heat exchanger 23 is a second predetermined level or higher in the step S170. When determining that the estimated amount of the frost is the second predetermined level or higher, the CPU moves the step to the step S171. On the other hand, when determining that the estimated amount of the frost is not the second predetermined level or higher, the CPU moves the step to the step S174.

(Step S171)
The CPU performs the defrost operation in the step S171 on the following conditions: it is determined in the step S167 that the outdoor air temperature Tam is a predetermined temperature or lower; it is determined in the step S163 that the estimated amount of the frost is the first predetermined level or higher; it is determined in the step S168 that the average velocity of the vehicle is a predetermined velocity or lower; it is determined in the step S169 that a traffic jam has not occurred in the route to the destination; or it is determined in the step S170 that the estimated amount of the frost is the second predetermined level or higher.

(Step S172)

In step S172, the CPU determines whether or not a predetermined period of time has elapsed after the defrost operation starts in the step S151. When determining that a predetermined period of time has elapsed after the defrost operation starts, the CPU moves the step to step S173. On the other hand, when determining that a predetermined period of time has not elapsed after the defrost operation starts, the CPU ends the defrost operation control process.

(Step S173)

When determining that a predetermined period of time has elapsed after the defrost operation starts in the step S172, the CPU stops the defrost operation in the step S173 and ends the defrost operation control process.

(Step S174)

When determining that the estimated amount of frost is not the second predetermined level or higher in the step S170, the CPU operates the outdoor fan 29 in the step S174.

(Step S175)

In step S175, the CPU determines whether or not a predetermined period of time has elapsed after the operation of the outdoor fan 29 is started in the step S174. When determining that a predetermined period of time has elapsed after the operation of the outdoor fan 29 is started, the CPU moves the step to step S176. On the other hand, when determining that a predetermined period of time has not elapsed after the operation of the outdoor fan 29 is started, the CPU ends the defrost operation control process.

(Step S176)

When determining that a predetermined period of time has elapsed after the operation of the outdoor fan 29 is started in the step S174, the CPU stops the operation of the outdoor fan 29 in the step S176 and ends the defrost operation control process.

As described above, with the vehicle air conditioning apparatus according to the present embodiment, in the same way as in Embodiment 9, when the power of the battery B becomes insufficient while the vehicle is running, it is possible to efficiently use the power of battery as the power to drive the vehicle. Therefore, it is possible to extend the mileage of the vehicle.

Figure 37:
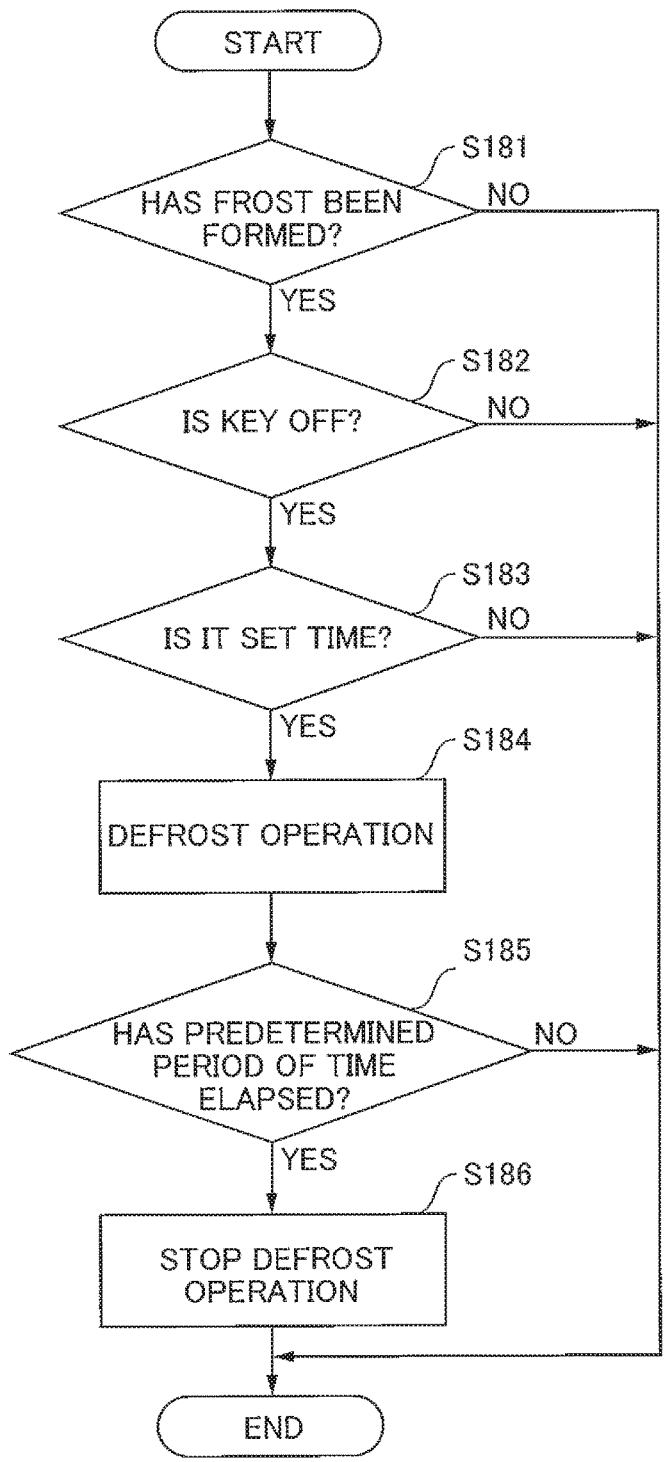
FIG. 37 is a flowchart showing a process to control the defrost operation according to Embodiment 11 of the present invention.

FIG. 37 shows Embodiment 11 of the present invention. Here, the same components are assigned the same reference numerals as in Embodiment 10.

This vehicle air conditioning apparatus is configured to be able to set the start time of the defrost operation. The controller 40 performs a defrost operation control process shown by the flowchart in FIG. 37.

(Step S181)

In step S181, the CPU determines whether or not a frost is formed on the outdoor heat exchanger 23. When determining that a frost is formed on the outdoor heat exchanger 23, the CPU moves the step to step S182. On the other hand, when determining that a frost is not formed on the outdoor heat exchanger 23, the CPU ends the defrost operation control process.

(Step S182)

When determining that a frost is formed on the outdoor heat exchanger 23 in the step S181, the CPU determines whether or not the vehicle is not running because the key is off. When determining that the key is off, the CPU moves the step to step S183. On the other hand, when determining that the key is not off, the CPU ends the defrost operation control process.

(Step S183)

When determining that the key is off in the step S182, the CPU determines whether or not it is the set time to start the defrost operation in the step S183. When determining that it is the set time to start the defrost operation, the CPU moves the step to step S184. On the other hand, when determining that it is not the set time to start the defrost operation, the CPU ends the defrost operation control process.

(Step S184)

When determining that it is the set time to start the defrost operation in the step S183, the CPU performs the defrost operation in the step S184.

(Step S185)

In step S185, the CPU determines whether or not a predetermined period of time has elapsed after the defrost operation is started in the step S184. When determining that a predetermined period of time has elapsed after the defrost operation is started, the CPU moves the step to step S186. On the other hand, when determining that a predetermined period of time has not elapsed after the defrost operation is started, the CPU ends the defrost operation control process.

(Step S186)

When determining that a predetermined period of time has elapsed after the defrost operation is started in the step S185, the CPU stops the defrost operation in the step S186 and ends the defrost operation control process.

As described above, with the vehicle air conditioning apparatus according to the present embodiment, the defrost operation is performed at the set time. By this means, it is possible to perform the defrost operation just before the vehicle starts to run, so that there is no need to perform the defrost operation several times while the vehicle does not run. Therefore, it is possible to reduce the power consumption for the defrost operation.

Figure 38:
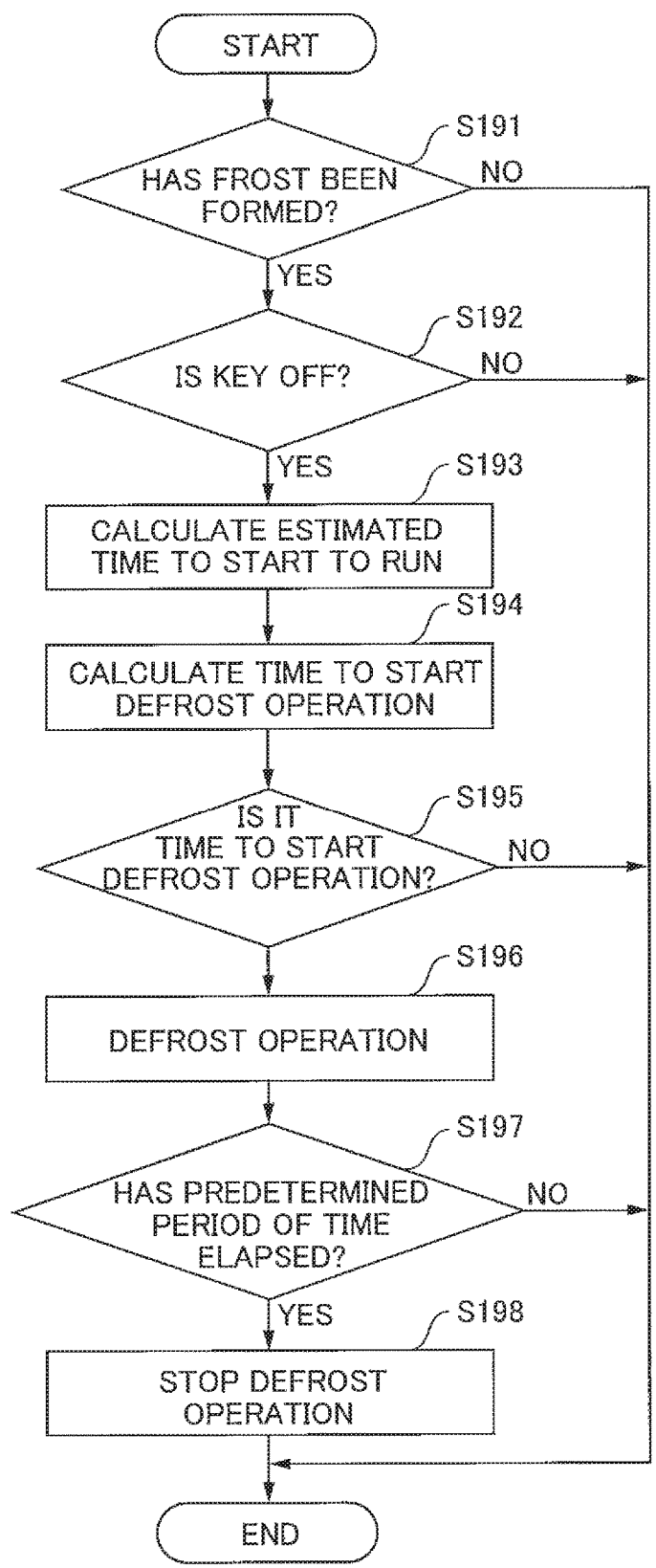
FIG. 38 is a flowchart showing a process to control the defrost operation according to Embodiment 12 of the present invention.

FIG. 38 shows Embodiment 12 of the present invention. Here, the same components are assigned the same reference numerals as in Embodiment 11.

This vehicle air conditioning apparatus is configured to store the times to start to run the vehicle for a predetermined period of time of the past, and to be able to calculate an estimated time to start to run the vehicle based on the stored times. The controller performs a defrost operation control process shown by the flowchart in FIG. 38.

(Step S191)

In step S191, the CPU determines whether or not a frost is formed on the outdoor heat exchanger 23. When determining that a frost is formed on the outdoor heat exchanger 23, the CPU moves the step to step S192. On the other hand, when determining that a frost is not formed on the outdoor heat exchanger 23, the CPU ends the defrost operation control process.

(Step S192)

When determining that a frost is formed on the outdoor heat exchanger 23 in the step S191, the CPU determines whether or not the vehicle is not running because the key is off. When determining that the key is off, the CPU moves the step to step S193. On the other hand, when determining that the key is not off, the CPU ends the defrost operation control process.

(Step S193)

When determining that the key is off in the step S192, the CPU calculates the estimated time to start to run the vehicle based on the times to start to run the vehicle in a predetermined period of time of the past in step S193. Here, the estimated time to start to run the vehicle is calculated based on, for example, the average of the actual times to start to run the vehicle for a predetermined period of time of the past.

(Step 194)

In step S194, the CPU calculates the start time of the defrost operation based on the estimated time to start to run the vehicle calculated in the step S193. Here, the start time of the defrost operation is calculated by going back the period of time required for the defrost operation from the time to start to run the vehicle.

(Step S195)

In step S195, the CPU determines whether or not it is the time to start the defrost operation calculated in the step S194. When determining that it is the time to start the defrost operation, the CPU moves the step to step S196. On the other hand, when determining that it is not the time to start the defrost operation, the CPU ends the defrost operation control process.

(Step S196)

When determining that it is the time to start the defrost operation, which is set in the step 195, the CPU performs the defrost operation in the step S196.

(Step S197)

In step S197, the CPU determines whether or not a predetermined period of time has elapsed after the defrost operation is started in the step S196. When determining that a predetermined period of time has elapsed after the defrost operation is started, the CPU moves the step to step S198. On the other hand, when determining that a predetermined period of time has elapsed after the defrost operation is started, the CPU ends the defrost operation control process.

(Step S198)

When determining that a predetermined period of time has elapsed after the defrost operation is started in the step S197, the CPU stops the defrost operation in the step S198 and ends the defrost operation control process.

As described above, with the vehicle air conditioning apparatus according to the present embodiment, the defrost operation is stopped at the estimated time to start to run the vehicle. By this means, it is possible to perform the defrost operation just before the vehicle starts to run, so that there is no need to perform the defrost operation several times while the vehicle does not run. Therefore, it is possible to reduce the power consumption for the defrost operation.

Figure 39:
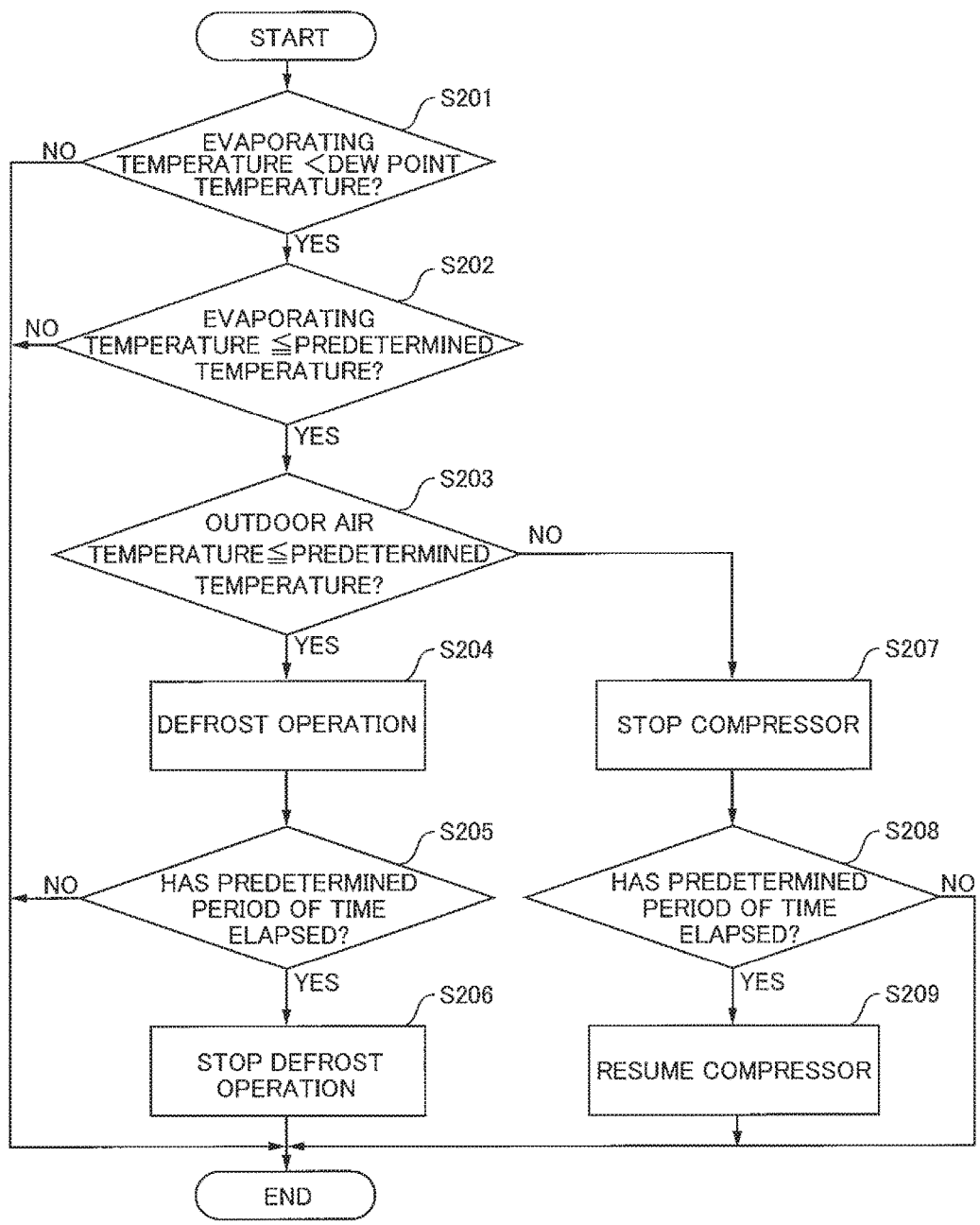
FIG. 39 is a flowchart showing a process to control the defrost operation according to Embodiment 13 of the present invention.

FIG. 39 is Embodiment 13 of the present invention. Here, the same components are assigned the same reference numerals as in Embodiment 12.

This vehicle air conditioning apparatus is configured to determine whether or not a frost is formed on the outdoor heat exchanger 23 and also determine whether or not to start the defrost operation based on the outdoor air temperature Tam. In addition, when determining that a frost is formed on the outdoor heat exchanger 23 but determining not to start the defrost operation, the CPU stops the compressor 21 to remove the frost on the outdoor heat exchanger 23. In this case, the controller 40 performs a defrost operation control process shown by the flowchart in FIG. 39.

(Step S201)

In step S201, the CPU determines whether or not the temperature Thex of the refrigerant flowing out of the outdoor heat exchanger 23 is lower than the calculated outdoor air dew point temperature Tdew. When determining that the temperature Thex of the refrigerant flowing out of the outdoor heat exchanger 23 is lower than the calculated outdoor air dew point temperature Tdew, the CPU moves the step to step S202. On the other hand, when determining that the temperature Thex of the refrigerant flowing out of the outdoor heat exchanger 23 is not lower than the calculated outdoor air dew point temperature Tdew, the CPU ends the defrost operation control process.

(Step S202)

When determining that the temperature Thex of the refrigerant flowing out of the outdoor heat exchanger 23 is lower than the calculated outdoor air dew point temperature Tdew in the step S201, the CPU determines whether or not the temperature Thex of the refrigerant flowing out of the outdoor heat exchanger 23 is a predetermined temperature (e.g. 0 degree centigrade) or lower in the step S202. When determining that the temperature Thex of the refrigerant flowing out of the outdoor heat exchanger 23 is a predetermined temperature or lower, the CPU moves the step to step S203. On the other hand, when determining that the temperature Thex of the refrigerant flowing out of the outdoor heat exchanger 23 is not a predetermined temperature or lower, the CPU ends the defrost operation control process.

(Step S203)

When determining that that the temperature Thex of the refrigerant flowing out of the outdoor heat exchanger 23 is a predetermined temperature or lower in the step 202, the CPU determines whether or not the outdoor air temperature Tam, which is detected by the outdoor air temperature sensor 41, is a predetermined temperature (e.g. 0 degree centigrade) or lower in the step S203. When determining that the outdoor air temperature Tam is a predetermined temperature or lower, the CPU moves the step to step S204. On the other hand, when determining that the outdoor air temperature Tam is not a predetermined temperature or lower, the CPU moves the step to step S207.

(Step S204)

When determining that the outdoor air temperature Tam is a predetermined temperature (e.g. 0 degree centigrade) or lower in the step S203, the CPU starts the defrost operation in step S204.

(Step S205)

In step S205, the CPU determines whether or not a predetermined period of time has elapsed after the defrost operation is started. When determining that a predetermined period of time has elapsed after the defrost operation is started, the CPU moves the step to step S206. On the other hand, when determining that a predetermined period of time has not elapsed after the defrost operation is started, the CPU ends the defrost operation control process.

(Step S206)

When determining that a predetermined period of time has elapsed after the defrost operation is started in the step S205, the CPU stops the defrost operation in the step S206 and ends the defrost operation control process.

(Step S207)

When determining that the outdoor air temperature Tam is not a predetermined temperature (e.g. 0 degree centigrade) or lower, the CPU stops the compressor 21 in step S207.

(Step S208)

In step 5208, the CPU determines whether or not a predetermined period of time has elapsed after the compressor 21 is stopped. When determining that a predetermined period of time has elapsed after the compressor 21 is stopped, the CPU moves the step to step S209. On the other hand, when determining that a predetermined period of time has not elapsed after the compressor 21 is stopped, the CPU ends the defrost operation control process. Here, a predetermined period of time after the compressor 21 is stopped may be changed according to the velocity of the vehicle.

(Step S209)

When determining that a predetermined period of time has elapsed after the compressor 21 is stopped in the step S208, the CPU resumes the operation of the compressor 21 in step 209, and ends the defrost operation control process.

As described above, with the vehicle air conditioning apparatus according to the present embodiment, the outdoor air dew point temperature Tdew is calculated. Then, when the temperature Thex of the refrigerant flowing out of the outdoor heat exchanger 23 is lower than the outdoor air dew point temperature Tdew and also lower than a predetermined temperature, it is determined that a frost is formed on the outdoor heat exchanger 23. By this means, the defrost operation is performed when the outdoor heat exchanger 23 is subjected to the conditions in which a frost is formed on the outdoor heat exchanger 23, and therefore to reliably prevent a frost from being formed on the outdoor heat exchanger 23.

In addition, when determining that a frost is formed on the outdoor heat exchanger 23, the CPU determines whether or not to start the defrost operation based on outdoor air temperature Tam, and, when determining that the defrost operation is not performed, the CPU stops the compressor 21. By this means, it is possible to remove the frost on the outdoor heat exchanger 23 by stopping the compressor 21 when the outdoor air temperature Tam is higher than a predetermined temperature. Therefore, it is possible to reduce the energy consumption. There is an advantage over hot gas defrost in that the temperature drop of the air blowing to the vehicle interior is low during the defrost operation.

Here, with the embodiments, an exemplary configuration of the defrost operation as shown in FIG. 34 has been described where part of the refrigerant discharged from the compressor 21 flows into the outdoor heat exchanger 23 to melt the frost on the outdoor heat exchanger 23. The defrost operation is not limited to his as long as it is possible to remove the frost on the outdoor heat exchanger 23. Another configuration is possible where all the refrigerant discharged from the compressor 21 flows into the outdoor heat exchanger 23 to melt the frost. In addition, another configuration is possible where an electric heater 23 is provided in the outdoor heat exchanger 23 to melt the frost. Moreover, further another configuration is possible where when a frost is formed on the outdoor heat exchanger 23, the operation is switched to the second heating and dehumidifying operation shown in FIG. 33 to stop the refrigerant from flowing into the outdoor heat exchanger 23, and the frost is melted by using the outdoor fan 29 and so forth.

In addition, the defrost operation according to the embodiments is not only when a frost is formed on the outdoor heat exchanger 23 during the heating operation, but also when a frost is formed on the outdoor heat exchanger 23 during the first and second heating and dehumidifying operations.

In addition, with Embodiment 9 and Embodiment 10, a configuration has been described where the determination to perform the defrost operation is based on the determination of whether or not the power of the battery is a predetermined level or lower. It is by no means limiting. Another configuration is possible where the determination to perform the defrost operation is based on, for example, the mileage of the vehicle that is calculated based on the power of the battery, or calculated by another method.

In addition, with the embodiments, an exemplary configuration has been described where information indicating that, for example, the vehicle is running in the vicinity of the destination, or a traffic jam has occurred in the running route, is acquired by the navigation device 54. It is by no means limiting as long as it is possible to determine that the velocity of the vehicle is a predetermined level or lower.

Moreover, with the embodiments, an exemplary configuration has been described where the heat released from the refrigerant circuit 20 is absorbed in the water flowing through the water circuit 30 through the water-refrigerant heat exchanger 22. The heat medium subjected to the heat exchange with the refrigerant is not limited to the water.

In addition, with the present embodiment, a configuration has been described where the three-way valve 25 is used to switch between the refrigerant flow passages 20c and 20d in the refrigerant circuit 20. It is by no means limiting. Two solenoid valves are applicable instead of the three-way valve, and therefore it is possible to switch between the refrigerant flow passages 20c and 20d by opening and closing these solenoid valves.

Moreover, with the present embodiment, a configuration has been described where the water flowing through the water circuit 30, which is subjected to the heat exchange with the refrigerant releasing the heat in the water-refrigerant heat exchanger 22 of the refrigerant circuit 20, is heated by the water heater 32. It is by no means limiting. For example, the vehicle air conditioning apparatus may not have the water circuit 30 but have an indoor radiator. The indoor radiator releases the heat of the refrigerant flowing through the refrigerant circuit 20 directly in the air flow passage 11, and the air flowing through the air flow passage 11 may be directly heated by an electric heater. By this means, it is possible to produce the same effect as in the present embodiment. Moreover, further another configuration is possible where the vehicle air conditioning apparatus includes an indoor radiator configured to release the heat of the refrigerant flowing through the refrigerant circuit 20 directly in the air flow passage 11; a heat medium circuit that allows the heat medium having heated by the electric heater to flow through is provided separately from the refrigerant circuit 20; the heat of the heat medium heated by the electric heater is released in the air flow passage 11. By this means, it is possible to produce the same effect as in the present embodiment.

With Embodiment 9, the process including the step S141 and so forth to determine whether or not a frost is formed on the outdoor heat exchanger 23 corresponds to a frost formation determination part of the present invention. In addition, with Embodiment 9, the process including the step S151 and so forth to perform the defrost operation correspond to a defrost part of the present invention. With Embodiment 9, the process including the step S143 and so forth to detect the power of the battery B corresponds to a battery power detection part of the present invention. In addition, with Embodiment 9, the process including the step S143, S145 and so forth to determine that the power of the battery B is a predetermined level or lower and to end the defrost operation control process when it is determined that the battery B is not being charged corresponds to a defrost operation limiting part of the present invention. Moreover, with Embodiment 9, the process including the step S145 and so forth to determine whether or not the battery B is being charged corresponds to a charge determination part of the present invention. Moreover, with Embodiment 9, the process including the step S143, S145, S151 and so forth to determine that the power of the battery B is a predetermined level or lower and to perform the defrost operation when the battery B is being charged, corresponds to a cancellation part of the present invention. Moreover, with Embodiment 9, the process including the step S146 and so forth to operate the outdoor fan 29 without performing the defrost operation when the outdoor air temperature Tam is a predetermined temperature or higher corresponds to a fan control part of the present invention. Moreover, with Embodiment 9, the process including the step S142 to calculate the amount of the frost formed on the outdoor heat exchanger 23 corresponds to a frost calculation part of the present invention. Furthermore, with Embodiment 9, the navigation device 54 corresponds to a route setting part and a traffic information acquisition part of the present invention.

REFERENCE SIGNS LIST 10 air conditioning unit; 14 heat exchanger; 15 radiator; 20 refrigerant circuit; 20a to 20j refrigerant flow passage; 21 compressor; 22 water-refrigerant heat exchanger; 23 outdoor heat exchanger; 25 three-way valve; 26a to 26d first to fourth solenoid valve; 27a and 27b first and second check valve; 28a and 28b first and second expansion valve; 30 water circuit; 32 water heater; 40 controller; 41 outdoor air temperature sensor; 42 indoor air temperature sensor; 43 intake temperature sensor; 44 cooling air temperature sensor; 45 heated air temperature sensor; 46 indoor air humidity sensor; 47 refrigerant temperature sensor; 48 insolation sensor; 49 velocity sensor; 50 operation part; 51 pressure sensor; 52 display part; 53 outdoor humidity sensor; 54 navigation device; and B battery

The invention claimed is:

1. A vehicle air conditioning apparatus comprising:
a refrigerant circuit including an electric compressor, an indoor heat exchanger and an outdoor heat exchanger, the indoor heat exchanger being configured to release heat by operating the compressor; and
an electric heater configured to release heat,
wherein a vehicle interior can be heated by at least one of the heat released from the indoor heat exchanger and the heat released from the electric heater,
the vehicle air conditioning apparatus further comprising a controller, the controller being configured to:
calculate a minimum power sharing ratio of operation between the compressor and the electric heater, the minimum power sharing ratio allowing power consumption to be minimized when a required quantity of heating for a heating operation is acquired; and
control the compressor and the electric heater based on the calculated minimum power sharing ratio, and
wherein the controller calculates the minimum power sharing ratio of the operation between the compressor and the electric heater based on a target air-blowing temperature of air to be blown into the vehicle interior, the required quantity of heating of the air blowing into the vehicle interior, and an outdoor air temperature.

2. The vehicle air conditioning apparatus according to claim 1, further comprising:
a fan configured to allow air to be subjected to a heat exchange with refrigerant flowing through the indoor heat exchanger to flow through, and configured to blow the air after the heat exchange out to the vehicle interior, the controller being further configured to:
limit power supply for the heating operation to a predetermined level or lower;
calculate a maximum power sharing ratio of operation between the compressor and the electric heater that can maximize quantity of heating for the heating operation with the power supply when the controller limits the power supply for the heating operation; and
control the compressor and the electric heater based on the calculated maximum power sharing ratio.

3. The vehicle air conditioning apparatus according to claim 2, wherein the controller being further configured to:
calculate an air quantity of the fan such that a temperature of air blowing from the fan to the vehicle interior when the controller limits the power supply is the same as a temperature of air blowing from the fan to the vehicle interior when the controller does not limit the power supply; and
control the air quantity of the fan based on the calculated air quantity of the fan.

4. The vehicle air conditioning apparatus according to claim 3, wherein the controller controls the air quantity of the fan to be minimized when the calculated air quantity is smaller than a minimum air quantity to be able to operate the fan, and controls the air quantity of the fan to be a value for a case in which the power supply is not limited when the calculated air quantity is greater than the value for the case in which the power supply is not limited.

5. The vehicle air conditioning apparatus according to claim 2, wherein the controller being further configured to inform that the power supply for the heating operation has been limited.

* * * * *